US008948159B2

(12) United States Patent
Tanno et al.

(10) Patent No.: US 8,948,159 B2
(45) Date of Patent: *Feb. 3, 2015

(54) TRANSMITTER, RECEIVER, MOBILE COMMUNICATION SYSTEM AND SYNCHRONIZATION CHANNEL

(71) Applicant: NTT DOCOMO, INC., Tokyo (JP)

(72) Inventors: Motohiro Tanno, Yokohama (JP); Kenichi Higuchi, Saitama (JP); Mamoru Sawahashi, Yokohama (JP); Yoshihisa Kishiyama, Yokosuka (JP)

(73) Assignee: NTT DOCOMO, INC., Tokyo (JP)

( * ) Notice: Subject to any disclaimer, the term of this patent is extended or adjusted under 35 U.S.C. 154(b) by 180 days.

This patent is subject to a terminal disclaimer.

(21) Appl. No.: 13/742,105

(22) Filed: Jan. 15, 2013

(65) Prior Publication Data

US 2013/0142101 A1  Jun. 6, 2013

Related U.S. Application Data

(63) Continuation of application No. 11/917,338, filed as application No. PCT/JP2006/311543 on Jun. 8, 2006, now Pat. No. 8,385,318.

(30) Foreign Application Priority Data

Jun. 14, 2005 (JP) ................................. 2005-174391
Aug. 23, 2005 (JP) ................................. 2005-241901
Jan. 18, 2006 (JP) ................................. 2006-010500
Mar. 20, 2006 (JP) ................................. 2006-077821

(51) Int. Cl.
*H04J 3/06* (2006.01)
*H04L 7/04* (2006.01)

(52) U.S. Cl.
USPC .......................................... 370/350; 375/362

(58) Field of Classification Search
CPC ...... H04W 56/00; H04J 3/0682; H04L 7/033; H04L 7/04; H04L 7/042; H04L 7/10; H04L 3/0608; H04L 7/043
USPC ........................... 370/350; 375/362, 364–367
See application file for complete search history.

(56) References Cited

U.S. PATENT DOCUMENTS

| 7,489,737 B2 | 2/2009 | Uesugi |
| 2002/0054585 A1 | 5/2002 | Hanada et al. |
| 2004/0066802 A1 | 4/2004 | Ro et al. |
| 2005/0213639 A1 | 9/2005 | Uesugi |

FOREIGN PATENT DOCUMENTS

| JP | 07-177126 | 7/1995 |
| JP | 2003-152681 | 5/2003 |
| JP | 2003-218788 | 7/2003 |

OTHER PUBLICATIONS

Extended European Search Report for 06766505.9 dated Jan. 24, 2014 (11 pages).

(Continued)

*Primary Examiner* — Ronald Abelson
(74) *Attorney, Agent, or Firm* — Osha Liang LLP

(57) ABSTRACT

A transmitter includes an amplitude adjustment unit multiplying an amplitude adjustment sequence value for adjusting amplitude with a synchronization channel transmitted from a base station for establishing synchronization with a mobile station.

4 Claims, 57 Drawing Sheets

(56) References Cited

OTHER PUBLICATIONS

Sung Oh Bae et al., "Fast Cell Search Algorithm using Polarization Code Modulation for WCDMA Systems", VTC Spring 2002, IEEE 55th, Vehicular Technology Conference, XP-001214383; New York, NY, May 6, 2002; pp. 709-712 (4 pages).

Office Action issued in counterpart Indian Patent Application No. 4818/kolnp/2007 dated Feb. 26, 2014 (2 pages).

International Search Report for International Application No. PCT/JP2006/311543 mailed Sep. 12, 2006, with English translation thereof (2 pages).

Written Opinion of International Searching Authority for International Application No. PCT/JP2006/311543 mailed Sep. 12, 2006, with English translation thereof (6 pages).

R.L. Frank and S.A. Zadoff. "Phase Shift Pulse Codes With Good Periodic Correlation Properties" IRE Transactions on Information Theory, vol. IT-8, No. 6, Oct. 1962, 4 pages.

David C. Chu, "Polyphase Codes With Periodic Correlation Properties," IEEE Transactions on Information Theory, vol. 38, Jul. 1972, 2 pages.

A. Milewski, "Periodic Sequences with Optimal Properties for Channel Estimation and Fast Start-Up Equalization" IBM Journal of Research and Development, vol. 27, No. 5, Sep. 1983, 8 pages.

B.M. Popovic, "Generalized Chirp-Like Polyphase Sequences with Optimum Correlation Properties" IEEE Transactions on Information Theory, vol. 38, No. 4, Jul. 1992, 4 pages.

N. Suehiro and M. Hatori, "Modulatable Orthogonal Sequences and Their Application to SMMA Systems" IEEE Transactions on Information Theory, vol. 34, No. 1, Jan. 1988, 8 pages.

3GPP TS 25.213 V6.2.0, "3rd Generation Partnership Project; Technical Specification Group Radio Access Network; Spreading and modulation (FDD) (Release 6)"; Mar. 2005 (34 pages).

Japanese Office Action for Application No. 2006-077821, mailed on Aug. 11, 2009 (7 pages).

NTT DoCoMo, Physical Channels and Mutiplexing in Evolved UTRA Downlink, 3GPP TSG RAN WG1 Ad Hoc on LTE R1-050590, Jun. 21, 2005, p. 12-15, URL http://www.3gpp.org/ftp/tsg_ran/WG1_RL1/TSGR1_AH/LTE_AH_June-05/Docs/R1-050590.zip (5 pages).

NTT DoCoMo, NEC, Toshiba Corporation, Comparison of SCH Structures for Timing Detection in E-UTRA, 3GPP TSG RAN WG1 Meeting #44 R1-060436, Feb. 17, 2006, URL, http://www.3gpp.org/ftp/tsg_ran/WG1_RL1/TSGR1_44/Docs/R1-060436.zip (7 pages).

NTT DoCoMo, NEC, Sharp, SCH Structure and Cell Search Method for E-UTRA Downlink, 3GPP TSG RAN WG1 Meeting #44 R1-060311, Feb. 17, 2006, URL, http://www.3gpp.org/ftp/tsg_ran/WG1_RL1/TSGR1_44/Docs/R1-060311.zip (9 pages).

Japanese Office Action for Application No. 2006-077821, mailed on Dec. 1, 2009 (9 pages).

Philippine Office Action for Application No. 1-2007-502796, mailed on Feb. 16, 2012 (2 pages).

Office Action issued in counterpart Indian Patent Application No. 4818/KOLNP/2007, mailed Nov. 27, 2014 (1 page).

| SCH CODE NUMBERS | SCRAMBLE CODE GROUP NUMBERS |
|---|---|
| $C(1)$ | #1 |
| $C(2)$ | #2 |
| $C(3)$ | #3 |
| $C(4)$ | #4 |
| ⋮ | ⋮ |
| $C(N_{grp})$ | #$N_{grp}$ |

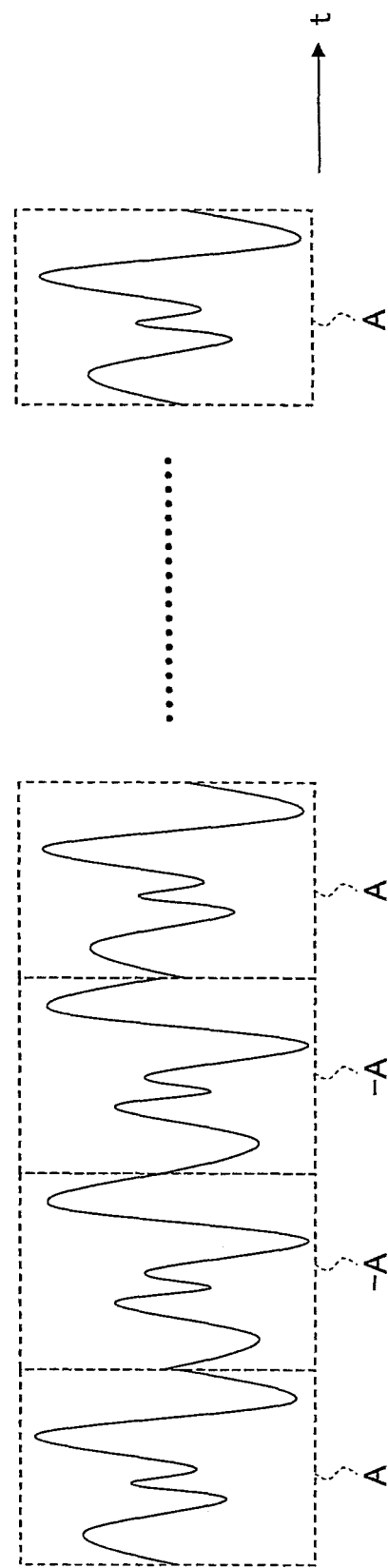

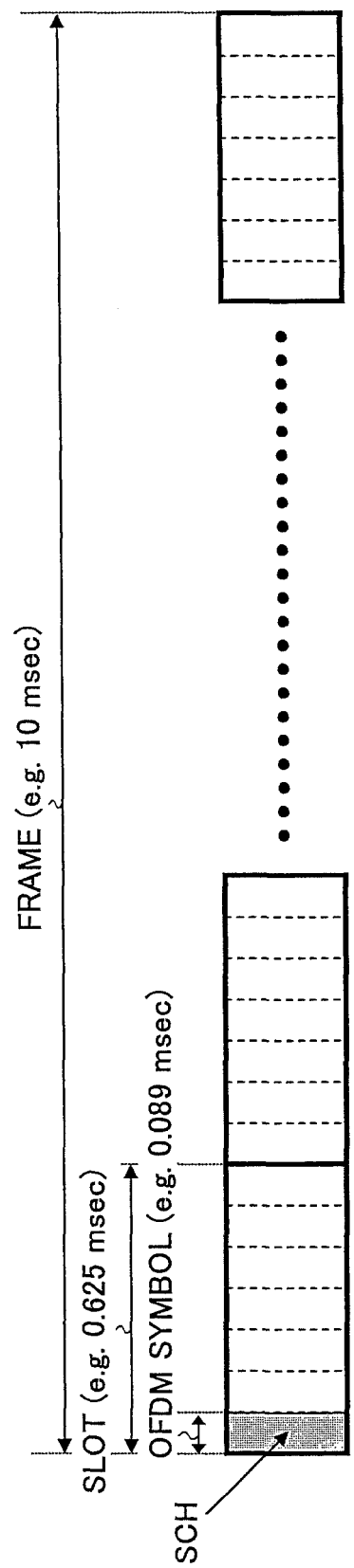

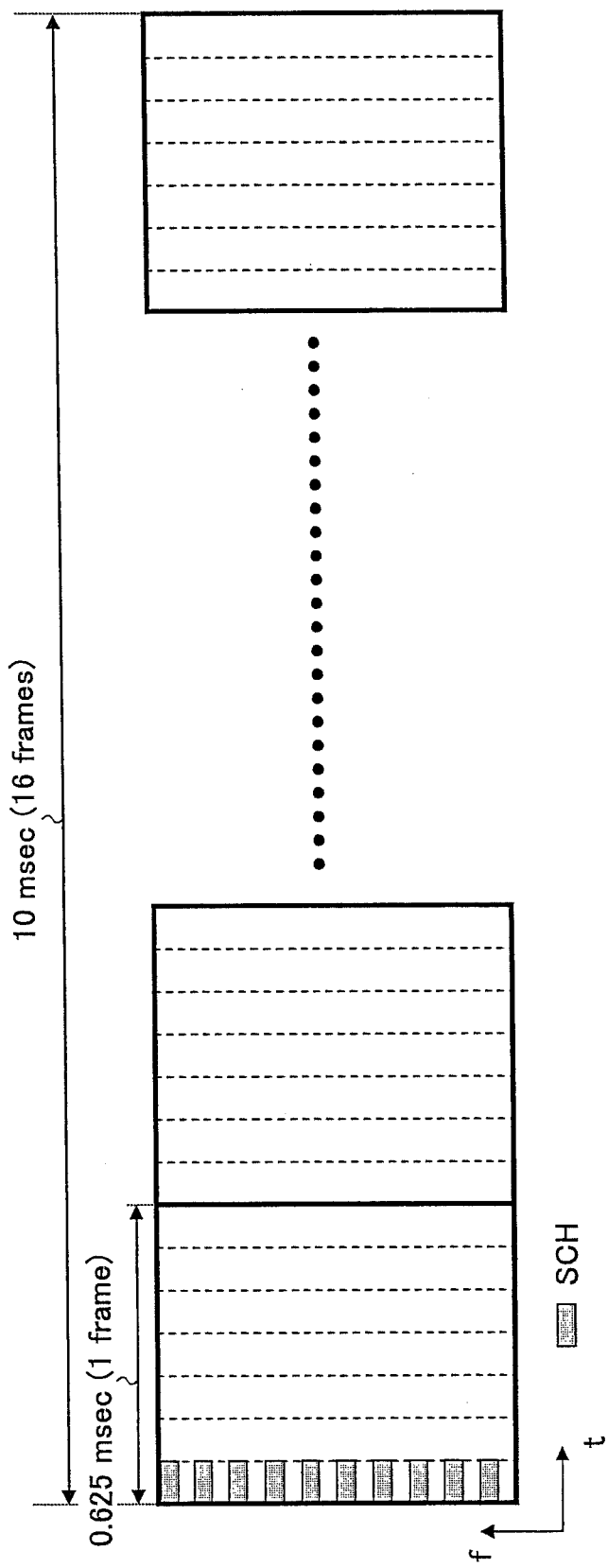

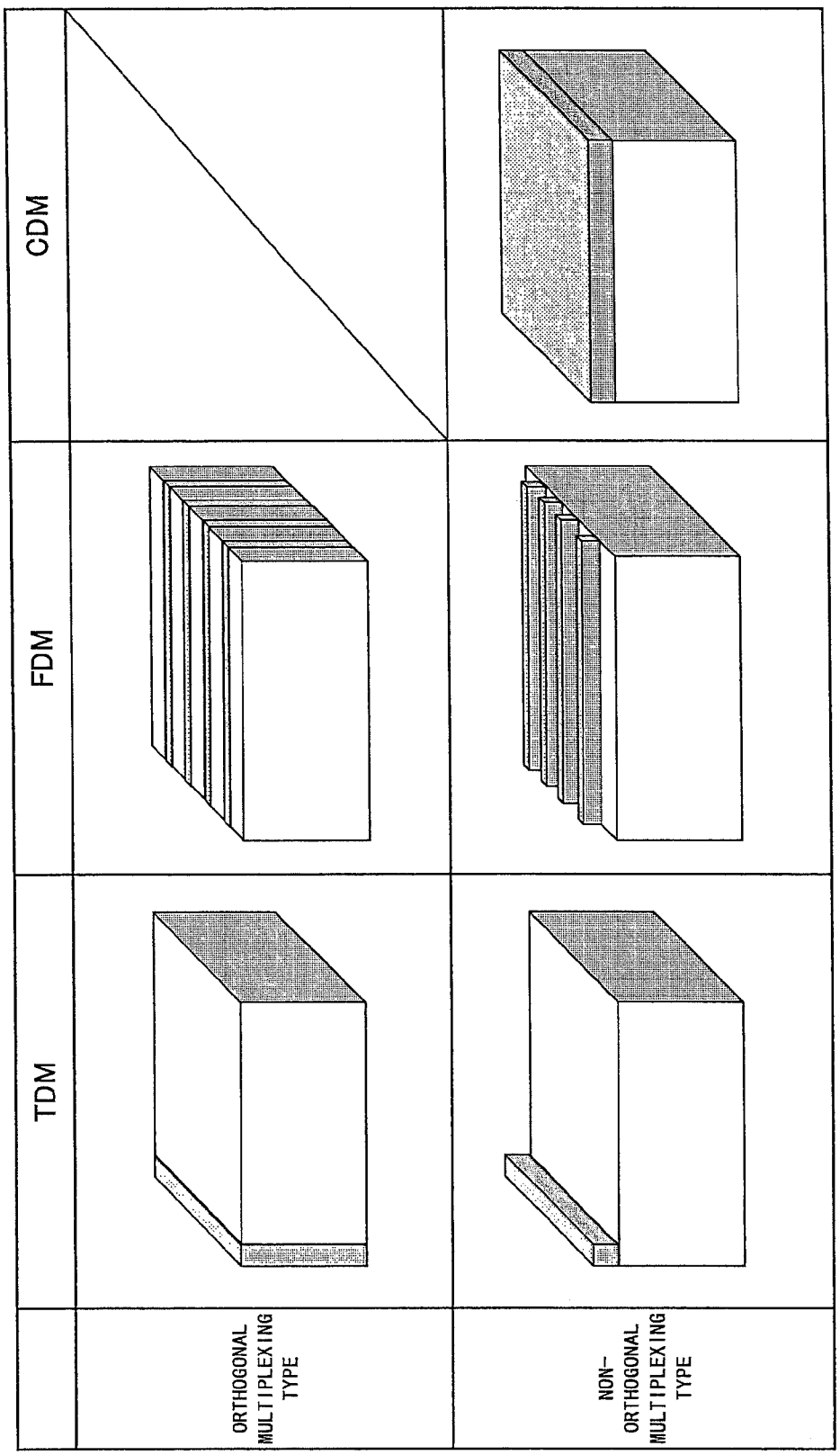

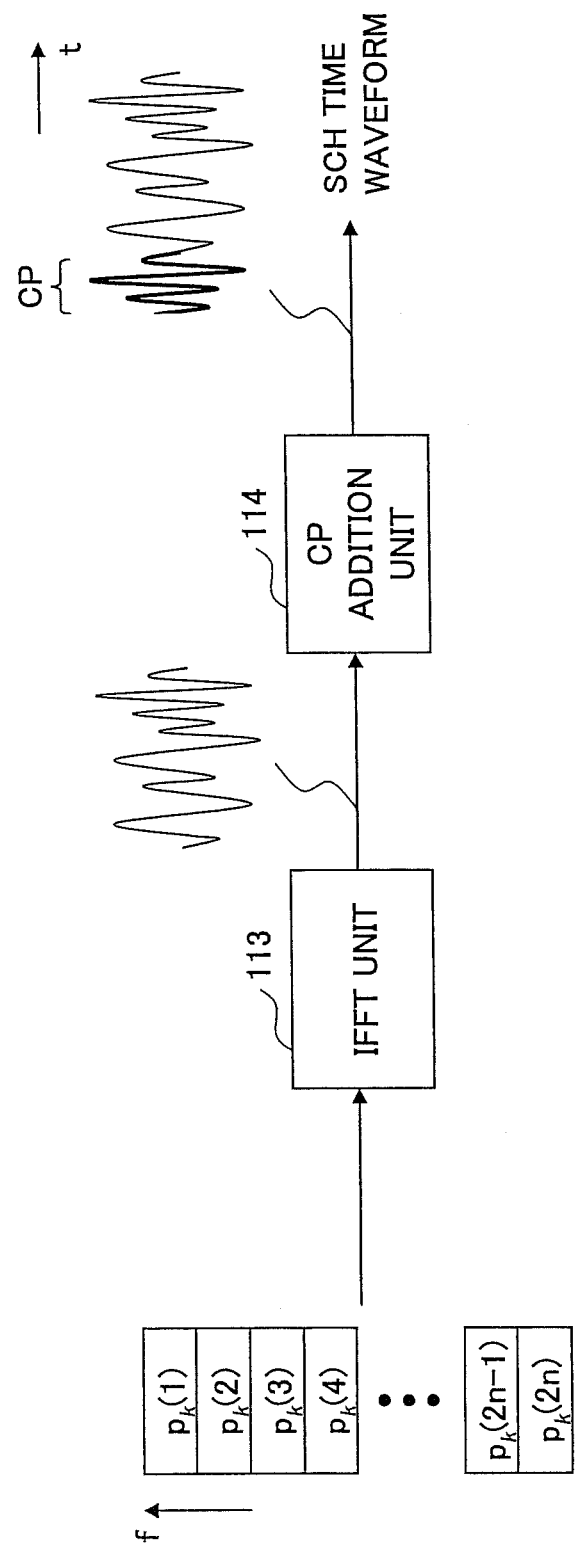

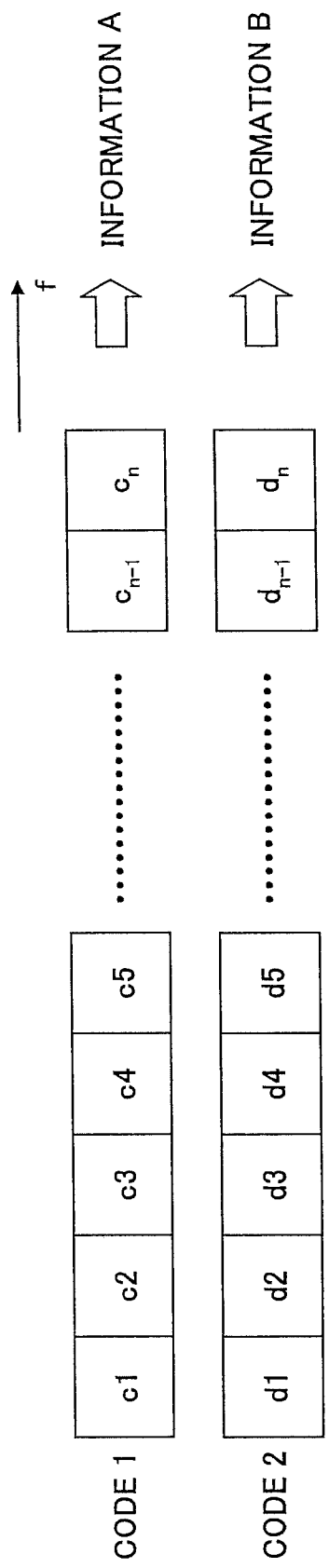

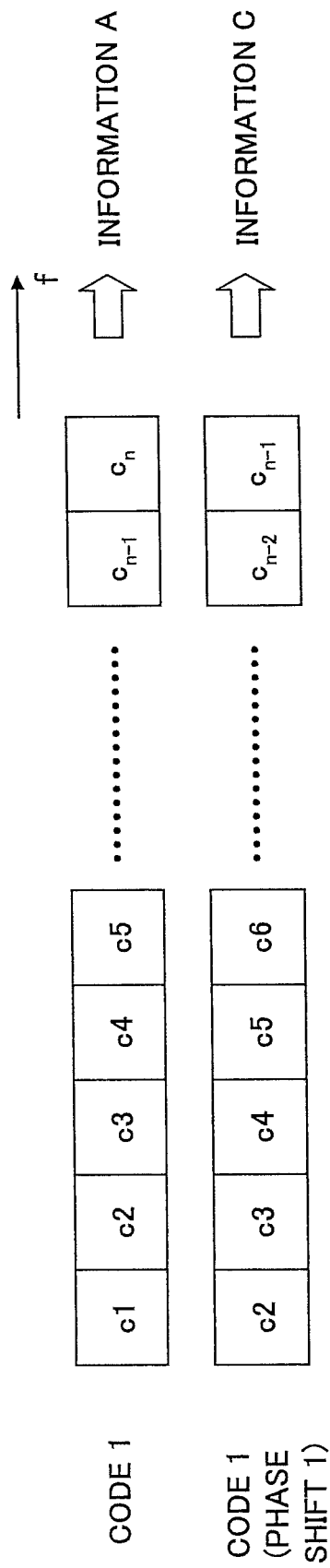

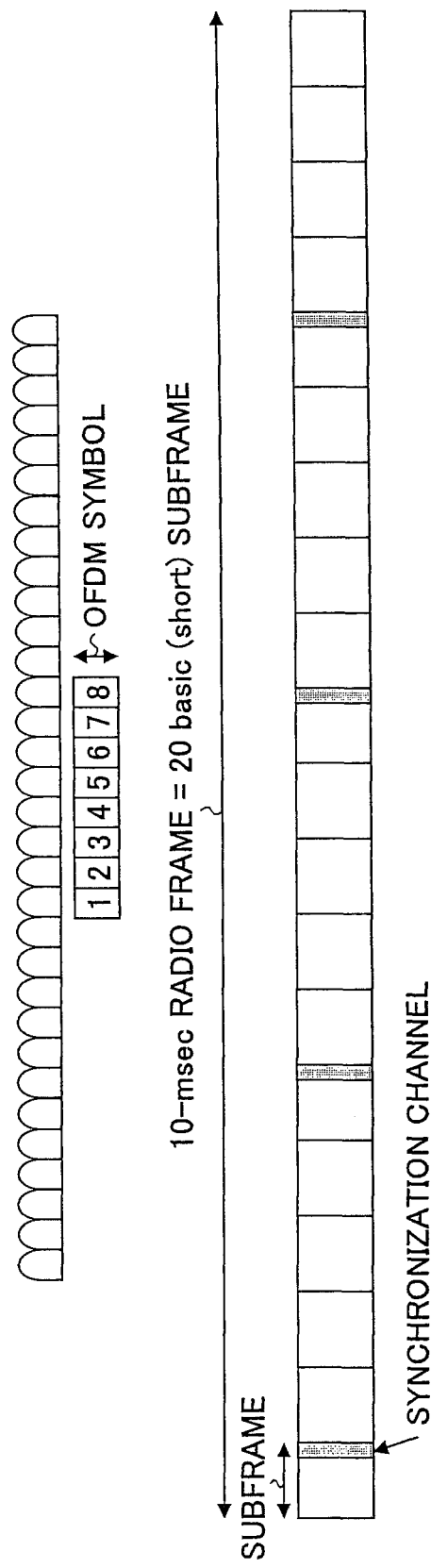

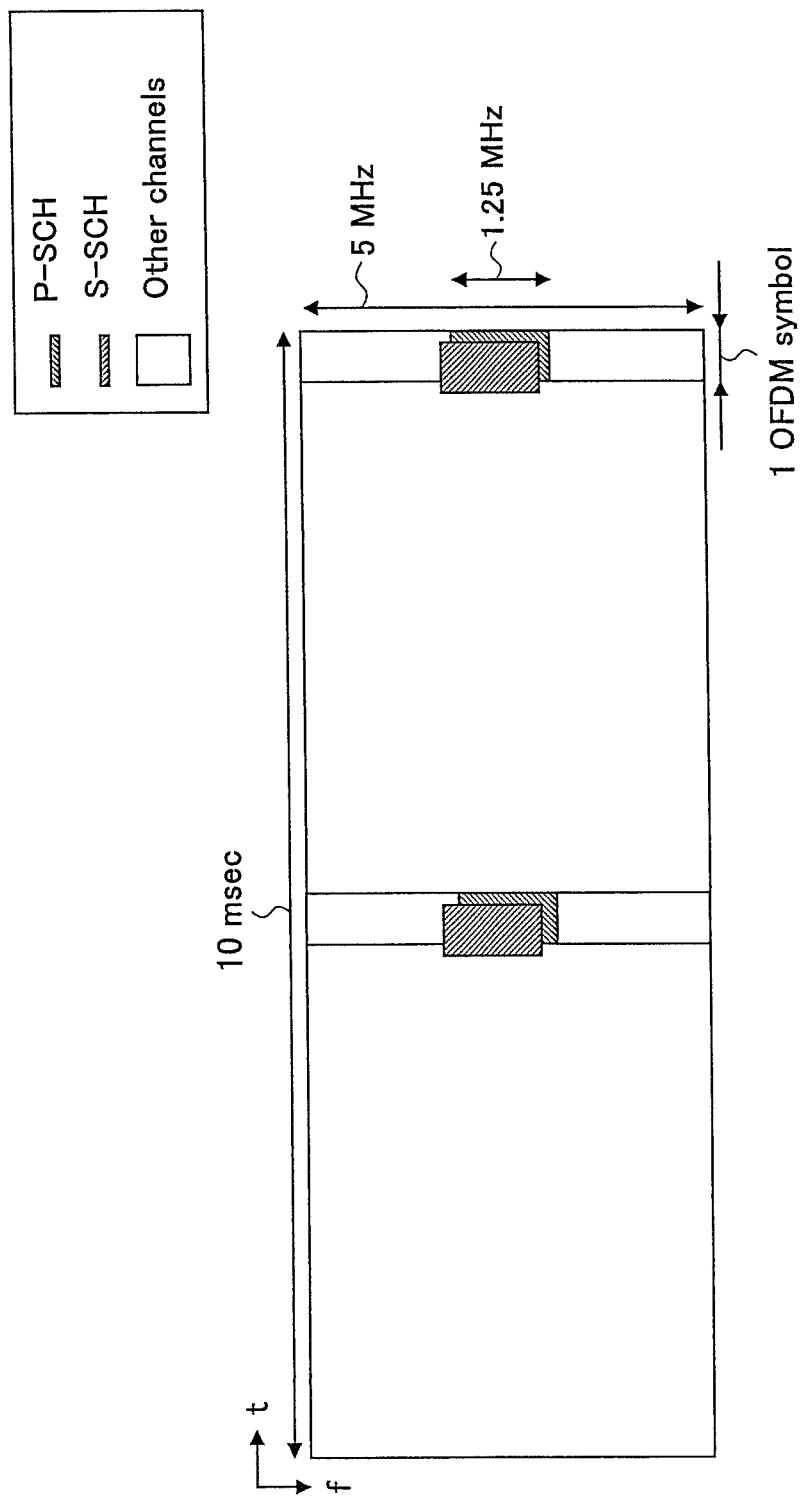

FIG.14

| SCH CODE NUMBERS | CP LENGTH |
|---|---|
| $C(1)$ | $L_1$ |
| $C(2)$ | $L_2$ |
| $C(3)$ | $L_3$ |
| $C(4)$ | $L_4$ |
| ⋮ | ⋮ |
| $C(N_{CP})$ | $L_{NCP}$ |

FIG.15

| SCH CODE NUMBERS | SCRAMBLE CODE GROUP NUMBERS | CP LENGTH |
|---|---|---|
| C(1) | #1 | $L_1$ |
| C(2) | #1 | $L_2$ |
| C(3) | #2 | $L_1$ |
| C(4) | #2 | $L_2$ |
| ...... | ...... | ...... |
| C($2N_{grp}-1$) | #$N_{grp}$ | $L_1$ |
| C($2N_{grp}$) | #$N_{grp}$ | $L_2$ |

FIG.16

| SCH CODE NUMBERS | SCRAMBLE CODE GROUP NUMBERS |
|---|---|
| $C(1)$ | #1 |
| $C(2)$ | #2 |
| $C(3)$ | #3 |
| ⋮ | ⋮ |
| $C(N_{grp})$ | #$N_{grp}$ |

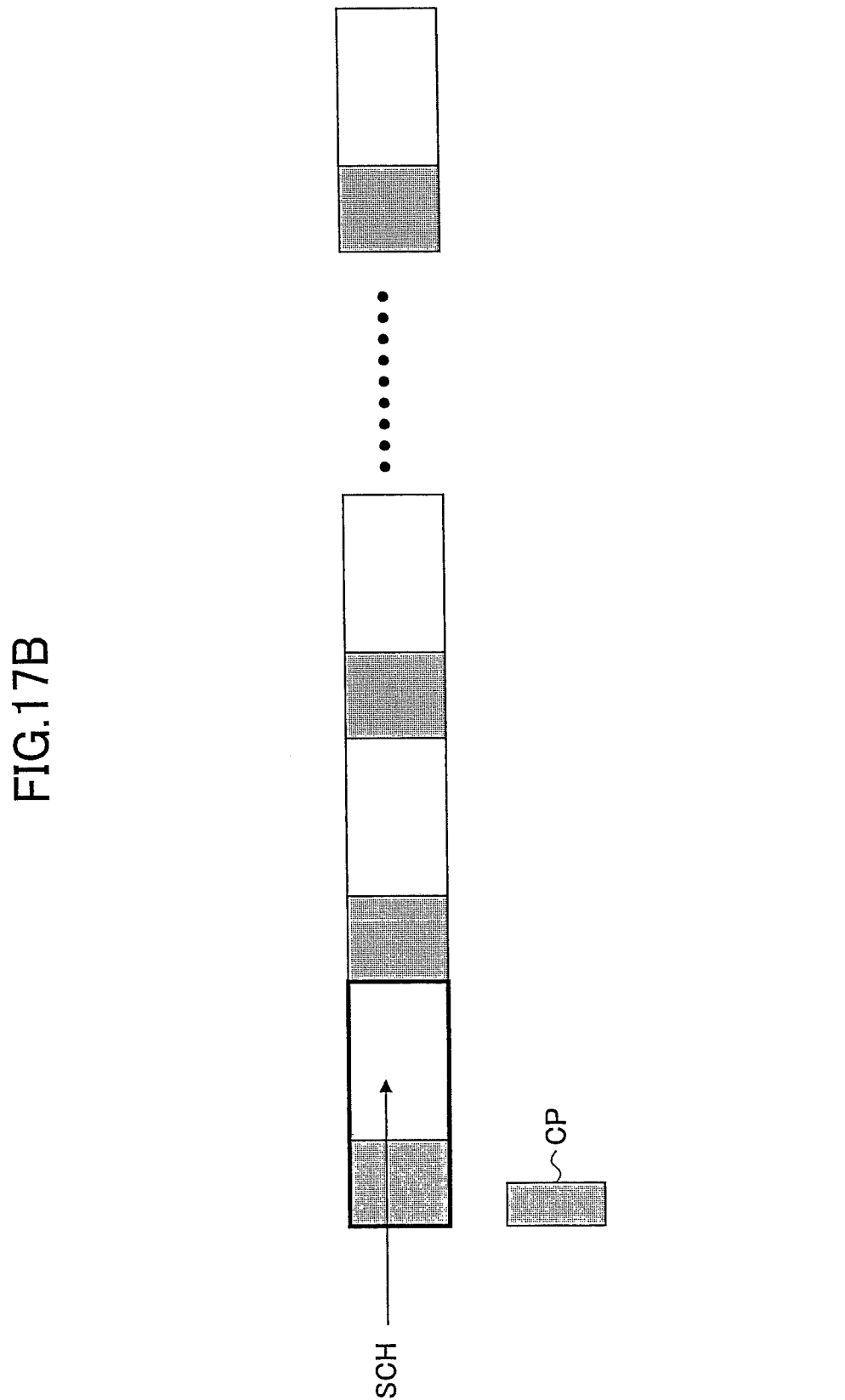

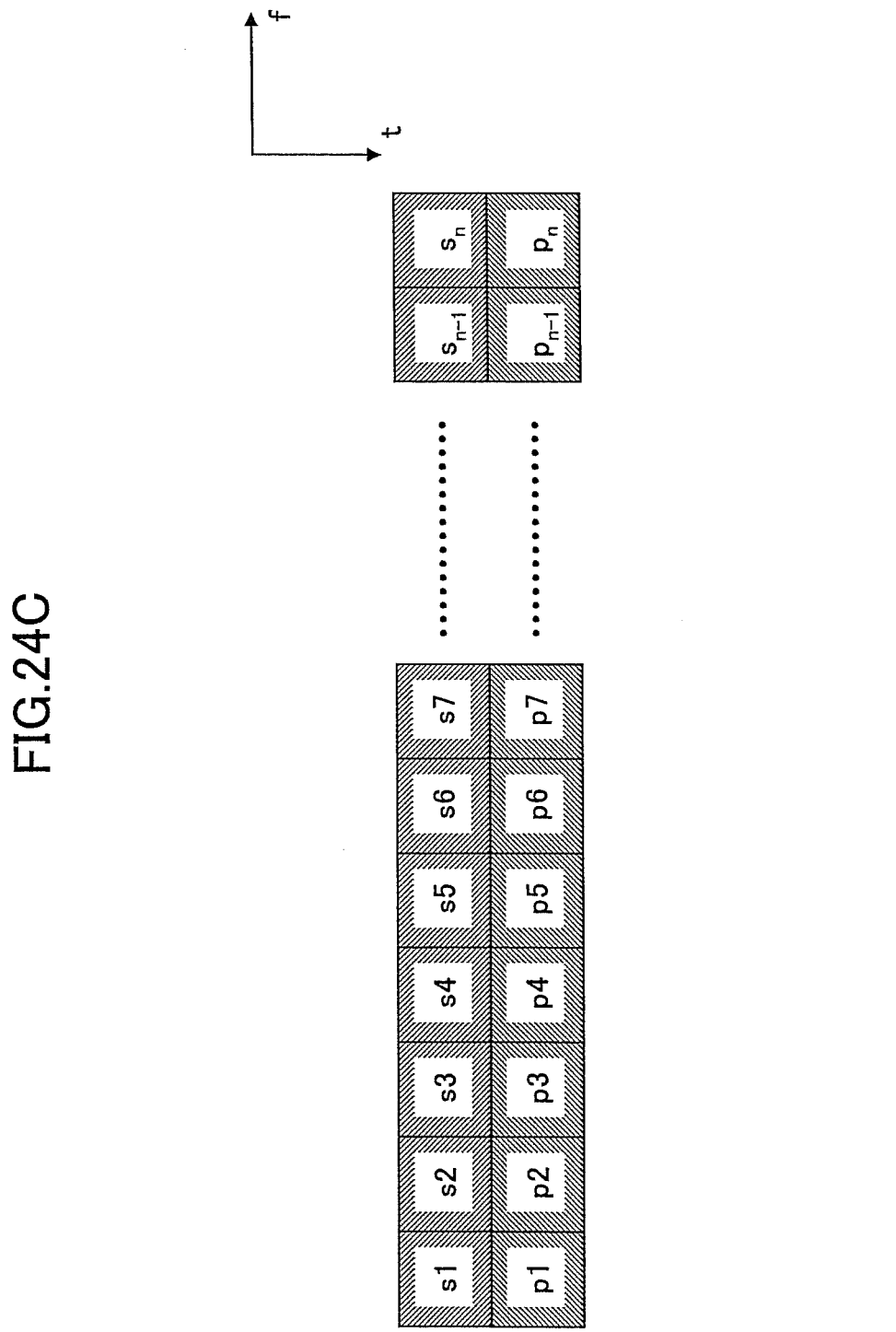

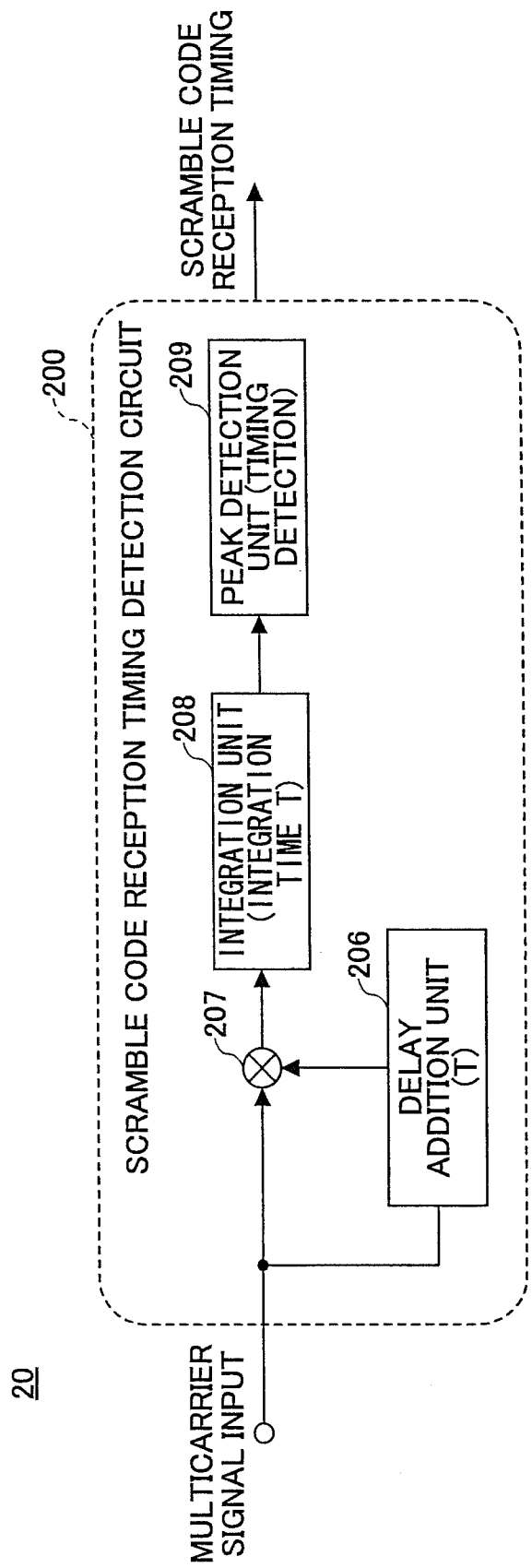

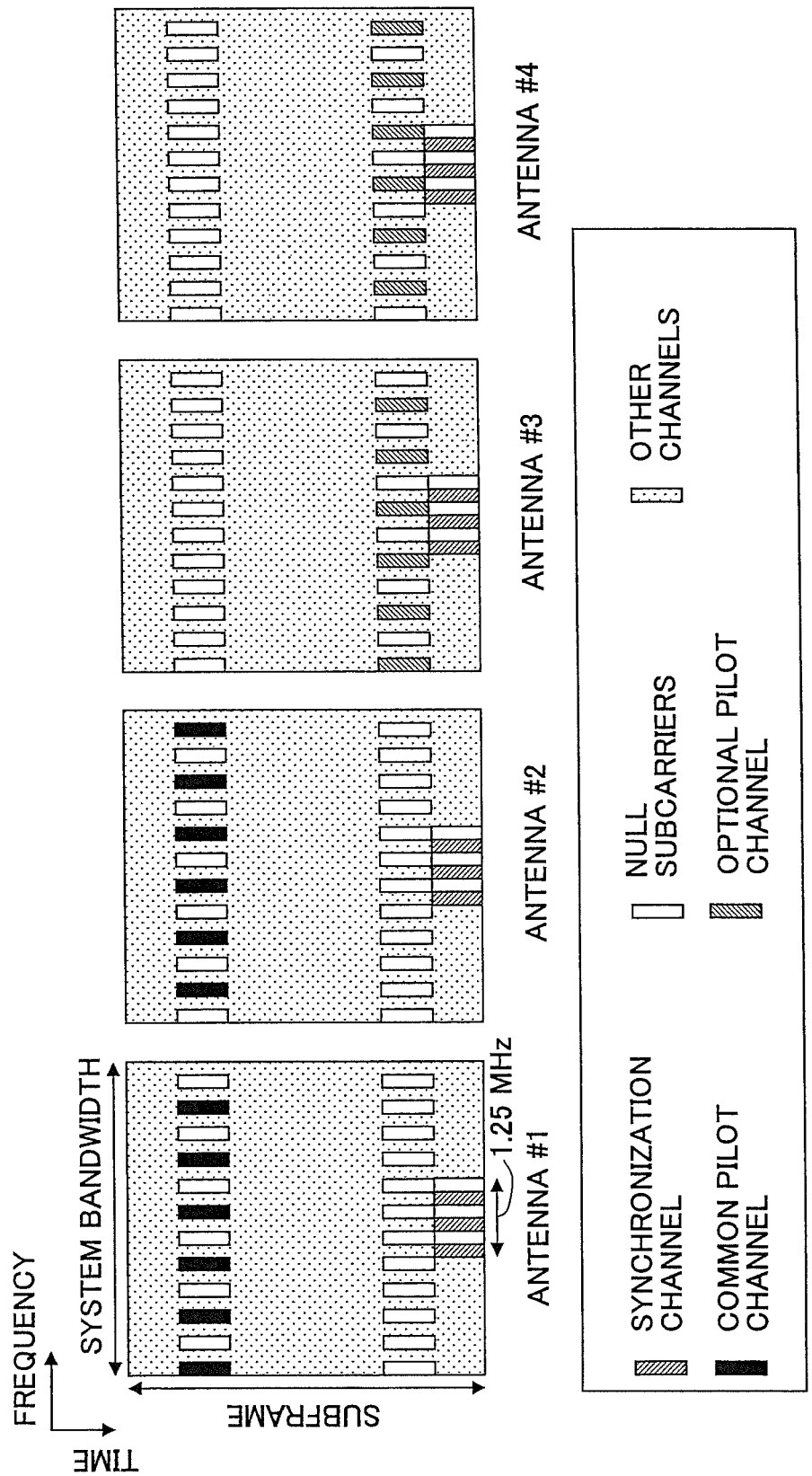

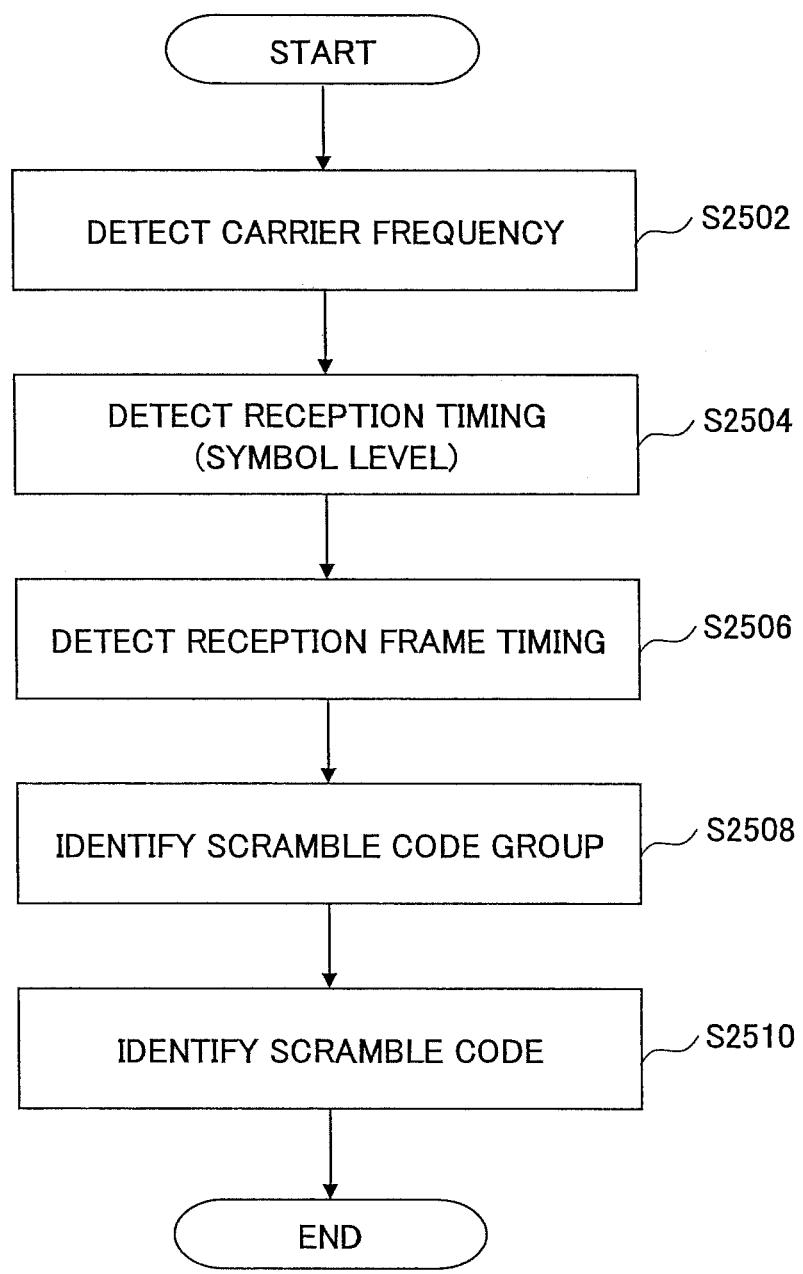

US 8,948,159 B2

TRANSMITTER, RECEIVER, MOBILE COMMUNICATION SYSTEM AND SYNCHRONIZATION CHANNEL

CROSS-REFERENCE TO RELATED APPLICATIONS

The present application is a continuation application of and, thereby, claims benefit under 35 U.S.C. §120 to U.S. patent application Ser. No. 11/917,338 filed on Dec. 12, 2007, titled, "TRANSMITTER, RECEIVER, MOBILE COMMUNICATION SYSTEM AND SYNCHRONIZATION CHANNEL," which is a national stage application of PCT Application No. PCT/JP2006/311543, filed on Jun. 8, 2006, which claims priority to Japanese Patent Application No. 2005-174391 filed on Jun. 14, 2005, Japanese Patent Application No. 2005-241901 filed on Aug. 23, 2005, Japanese Patent Application No. 2006-010500 filed on Jan. 18, 2006, and Japanese Patent Application No. 2006-077821 filed on Mar. 20, 2006. The contents of the priority applications are incorporated by reference in their entirety.

BACKGROUND OF INVENTION

1. Technical Field

The present invention relates to a transmitter, a receiver, a mobile communication system and a synchronization channel transmission method.

2. Background Art

In multi carrier transmission schemes such as multi carrier CDMA (Multi Carrier Code Division Multiple Access: MC-CDMA) scheme and OFDM (Orthogonal Frequency Division Multiplexing) modulation scheme, an information signal is modulated with multiple subcarriers at the transmitter side, and a guard interval is inserted into a transmitted signal in order to reduce waveform distortion caused by multipath delayed wave.

As one method of detecting FFT (Fast Fourier Transform) timing in the multi carrier transmission scheme utilizing the OFDM modulation scheme, a method of detecting FFT timing by correlating a guard interval part inserted for each symbol is known. Also, a method of detecting FFT timing by transmitting the same signal as a timing detection signal twice repeatedly and correlating two symbols at the receiver side is known.

Meanwhile, a transmitter for multiplexing and transmitting a synchronization signal at certain timing is known. (For example, see patent document 1.) In this transmitter, the synchronization signal is transmitted throughout all subcarriers in a burst manner In the transmitter, for example, if start time of a single scramble code pattern is synchronized with transmitting timing of the synchronization signal, the synchronization signal might be transmitted twice during a repetition interval .tau. of the single scramble code pattern.

Patent document 1: Japan Laid Open Patent Application No. 2003-152681

Non-patent document 1: R. L. Frank and S. A. Zadoff, "Phase shift pulse codes with good periodic correlation properties", IRE Trans. Inform. Theory, vol. IT-B, pp. 381-382, 1962

Non-patent document 2: D. C. Chu, "Polyphase codes with good periodic correlation properties", IEEE Trans. Inform. Theory, vol. IT-18, pp. 531-532, July 1972

Non-patent document 3: A. Milewski, "Periodic sequences with optimal properties for channel estimation and fast start-up equalization", IBMJ. Res. Develop., vol. 27, No. 5, pp. 426-431, 1983

Non-patent document 4: B. M. Popovic, "Generalized chirp-like polyphase sequence with optimum correlation properties", IEEE Trans. Inform. Theory, vol. 38, pp. 1406-1409, July 1992

Non-patent document 5: N. Suchiro and M. Hatori, "Modulatable orthogonal sequences and their application to SSMA systems", IEEE Trans. Inform. Theory, vol. 34, pp. 93-100, January 1998

Non-patent document 6: 3GPP TS25.213 Spreading and modulation (FDD)

SUMMARY OF INVENTION

However, the above-mentioned prior art has some problems as described below.

Different subcarrier signals are added to an OFDM signal in a temporal range. Thus, it is required at a transmission amplifier that these signals be amplified and wirelessly transmitted. In the transmission amplifier, however, it is hard to amplify a signal of some width linearly. In this case, average power may be reduced, and some processing such as clipping may be conducted to avoid occurrence of distortion.

However, such processing may lead to degraded data and worse detection accuracy of synchronization channels (SCHs).

In addition, the synchronization channel induces overhead in a system. In order to prevent reduction in the system efficiency, allocation of all radio resources to the synchronization channel is not acceptable, that is, only a portion of time and frequency can be allocated to the synchronization channel In this case, if transmission power of the synchronization channel is not adjustable, signal power supplied to the synchronization channel could be reduced accordingly, resulting in longer cell search time at mobile stations.

The present invention is intended to eliminate the above-mentioned problem, and the object of the present invention is to provide a transmitter, a receiver, a mobile communication system and a synchronization channel transmission method that achieve improved detection accuracy on synchronization channels.

In order to overcome the above-mentioned problem, in one feature of the present invention, a transmitter includes an amplitude adjustment unit multiplying an amplitude adjustment sequence value for adjusting amplitude with a synchronization channel.

According to this configuration, the synchronization channel can be transmitted at higher power than a data part.

In another feature of the present invention, a receiver includes a synchronization signal replica generation unit generating a synchronization channel replica approximated by an integer; and a correlation unit detecting correlation between a received multicarrier signal and the synchronization channel replica and detecting a correlation value indicative of each peak and timing associated with the peak based on the detected correlation.

According to this configuration, it is possible to reduce an amount of computation relating to correlation operations in the receiver.

In another feature of the present invention, a mobile communication system includes a transmitter and a receiver, the transmitter comprising an amplitude adjustment unit multiplying an amplitude adjustment sequence value for adjusting amplitude with a synchronization channel transmitted from a base station for establishing synchronization with a mobile station, and the receiver comprising: a synchronization signal replica generation unit generating a synchronization channel replica approximated by an integer; and a correlation unit detecting correlation between a received multicarrier signal and the synchronization channel replica and detecting a correlation value indicative of each peak and timing associated with the peak based on the detected correlation.

According to this configuration, the transmitter can transmit the synchronization channel at higher power than a data part, and the receiver can conduct correlation operations with less computation.

In another feature of the present invention, a method of transmitting a synchronization channel includes: multiplying an amplitude adjustment sequence value for adjusting amplitude with a synchronization channel; and combining the synchronization channel multiplied with the amplitude adjustment sequence value with a data symbol sequence.

According to this configuration, the synchronization channel can be transmitted at higher power than a data part, resulting in improved frame detection accuracy in the receiver.

According to the embodiments of the present invention, it is possible to provide a transmitter, a receiver, a mobile communication system and a synchronization channel transmission method that achieve improved detection accuracy on synchronization channels.

BRIEF DESCRIPTION OF DRAWINGS

FIG. 4B is a schematic diagram illustrating a P-SCH signal waveform resulting from repetition and code inversion of a fundamental waveform;

FIG. 5A is a schematic diagram illustrating an exemplary configuration of the synchronization channel;

FIG. 7 is a schematic diagram illustrating an exemplary configuration of the synchronization channel;

FIG. 8 is a schematic diagram illustrating an exemplary configuration of the synchronization channel;

FIG. 9 is a schematic diagram illustrating an exemplary waveform of the synchronization channel;

FIG. 10B is a schematic diagram illustrating an exemplary waveform for use in S-SCH;

FIG. 10C is a schematic diagram illustrating an exemplary waveform for use in S-SCH;

FIG. 13A is a schematic diagram illustrating an exemplary configuration of the secondary synchronization channel;

FIG. 13E is a schematic diagram illustrating an exemplary multiplexing scheme of P-SCH and S-SCH;

FIG. 14 is a schematic diagram illustrating exemplary correspondence between synchronization channel code numbers and CP lengths;

FIG. 15 is a schematic diagram illustrating exemplary correspondence between synchronization channel code numbers, scramble code numbers and CP lengths;

FIG. 16 is a schematic diagram illustrating exemplary correspondence between synchronization channel code numbers and scramble code numbers;

FIG. 17B is a schematic diagram illustrating an exemplary arrangement of a synchronization channel;

FIG. 24C is a schematic diagram illustrating exemplary synchronization detection in S-SCH detection in a receiver according to one embodiment of the present invention;

FIG. 26 is a block diagram illustrating a receiver according to one embodiment of the present invention;

FIG. 27A is a schematic diagram illustrating an exemplary configuration of a synchronization channel and a common pilot channel;

FIG. 29E is a flowchart illustrating an exemplary operation of a receiver according to one embodiment of the present invention;

LIST OF REFERENCE SYMBOLS

Figure 1:
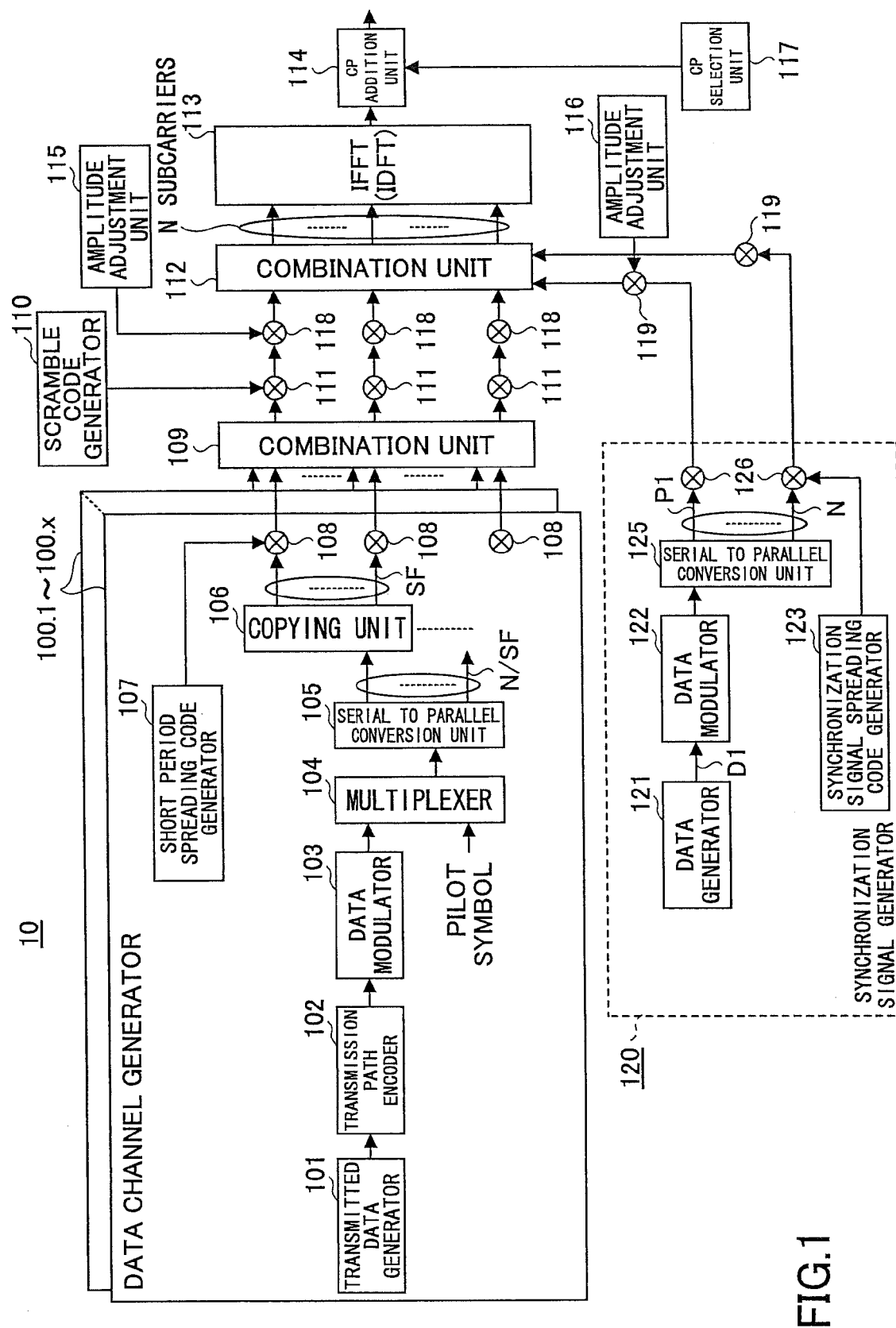
FIG. 1 is a block diagram illustrating a transmitter according to one embodiment of the present invention.

10: transmitter
20: receiver

DETAILED DESCRIPTION

Embodiments of the present invention will be described with reference to the accompanying drawings. Throughout the drawings, components having the same functionality may be denoted as the same reference numerals, and the description thereof may not be repeated.

A mobile communication system according to an embodiment of the present invention will be described.

In this embodiment, the mobile communication system includes a transmitter 10 and a receiver 20.

Then, the transmitter 10 according to this embodiment will be described with reference to FIG. 1.

The transmitter 10 transmits a synchronization channel The receiver 20 uses the synchronization channel to detect symbol timing and frame timing Furthermore, the receiver 20 uses the synchronization channel to detect control information on scramble codes, scramble code groups and others.

The transmitter 10 is provided to a base station for transmitting radio signals. The transmitter 10 includes multiple data channel generators 100.1-100.x. In each data channel generator 100, a sequence of transmitted data supplied from a transmitted data generator 101 is encoded in a transmission path encoder 102, and the resulting data are modulated in a data modulator 103. In a multiplexer 104, a pilot symbol is multiplexed to the modulated data sequence, and in a serial to parallel conversion unit 105, the resulting data are serial to parallel converted into N/SF information symbol sequences on a frequency axis. In a copying unit 106, each information symbol of the N/SF converted information symbol sequences is copied every SF symbols equal to the sequence length of short period spreading codes, and the resulting information symbol sequences are aligned on the frequency axis. In a multiplier 108, a short period spreading code generated by a short period spreading code generator 107 is multiplied with the N information symbol sequences aligned on the frequency axis.

In a first combination unit 109, the symbol sequences having the sequence length N and multiplied with the respective short period spreading codes supplied from the respective data channel generators 100 are multiplexed. In each of the N multipliers 111, scramble codes supplied from a scramble code generator 110 are multiplied with the multiplexed symbol sequences of the sequence length N in the frequency direction. In each of the N multipliers 118, the symbol sequences multiplied with the scramble codes are multiplied with an amplitude adjustment sequence value generated an amplitude adjustment unit 115, and the resulting symbol sequences are supplied to a second combination unit 112. The second combination unit 112 multiplexes the symbol sequences having the sequence length N and multiplied with the amplitude adjustment sequence value and the scramble codes with a synchronization signal generated by a synchronization signal generator 120 in relevant ones of N subcarriers.

An inverse Fourier transform (IFFT) device 133 converts N symbols into an orthogonal multi carrier signal. A cyclic prefix (CP) addition unit 114 inserts a CP selected by a CP selection unit 117 into the multi carrier signal for each Fourier target time. Then, the transmitter 10 transmits the multi carrier signal generated in the CP addition unit 114 as a radio signal in the air.

Although OFCDM has been illustratively applied in the above-mentioned transmitter, OFDM may be applied.

In this case, portions associated with spreading in the OFCDM are removed. Specifically, the data channel generators 100.2-100.x, the copying unit 106, the short period spreading code generator 107, the multiplier 108 and the combination unit 109 may be omitted. Then, N information symbols are supplied from the serial to parallel conversion unit 105. In other words, the N information symbols supplied from the serial to parallel conversion unit 105 are multiplied in the multiplier 111.

An exemplary operation for generating synchronization signals in the synchronization signal generator 120 will be described.

Figure 2A:
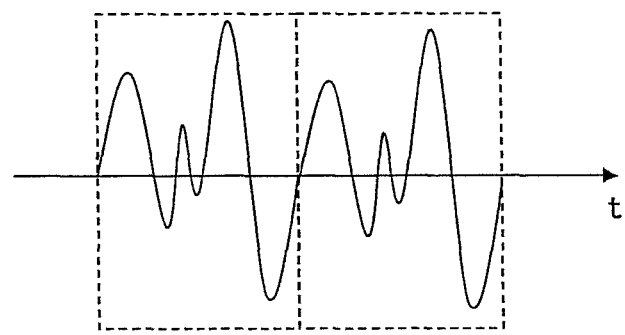
FIG. 2A is a schematic diagram illustrating a repetition waveform in a time range.

A data generator 121 generates codes for synchronization channels. For example, the data generator 121 may generate a common code, such as "1", in all cells. In this manner, the receiver 20 can easily detect timing independently of located cells by correlating received signals with a time waveform in a common synchronization channel As illustrated in FIG. 2A, the synchronization signal generator 120 may generate a repetition waveform in a temporal range. For example, the data generator 121 may repeatedly generate an arbitrary fundamental waveform. In this case, a correlation value may be computed for a portion located at the distance of the repetition period in the receiver. In the timing where the repeated waveform is transmitted, a similar waveform is transmitted, resulting in a larger correlation value. In this case, the receiver does not have to know the waveform of SCH, and determines whether two separated portions are the same by computing the correlation values for the two separated portions.

In this fashion, frequency offset compensation and timing detection with autocorrelation are achieved at timing detection time in the receiver by means of the arbitrary repeated waveform. For example, since the same signal is transmitted repeatedly, the receiver can measure and compare its phase. The receiver can facilitate the frequency offset and the timing detection with autocorrelation of the received signal based on phase rotation. In this fashion, computational complexity can be reduced through the frequency offset and the timing detection with autocorrelation of received signals compared to replica correlation.

Figure 2B:
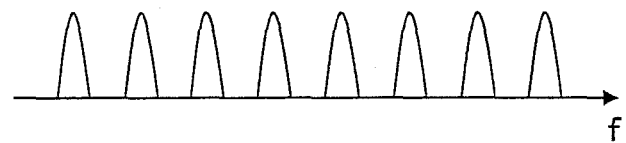
FIG. 2B is a schematic diagram illustrating a sawtoothed waveform in a frequency range.

As illustrated in FIG. 2B, frequency conversion of the repeated waveform in a temporal range results in a saw-toothed waveform in a frequency range. The synchronization signal generator 120 may generate the sawtoothed waveform in this frequency range. Also in this fashion, it is possible to obtain an advantage similar to the above-mentioned one.

Alternatively, the repetition number of the repeated waveforms in the temporal range and/or the interval between teeth of the sawtoothed waveform in the frequency range may be greater than 2.

Figures 3, 4A:
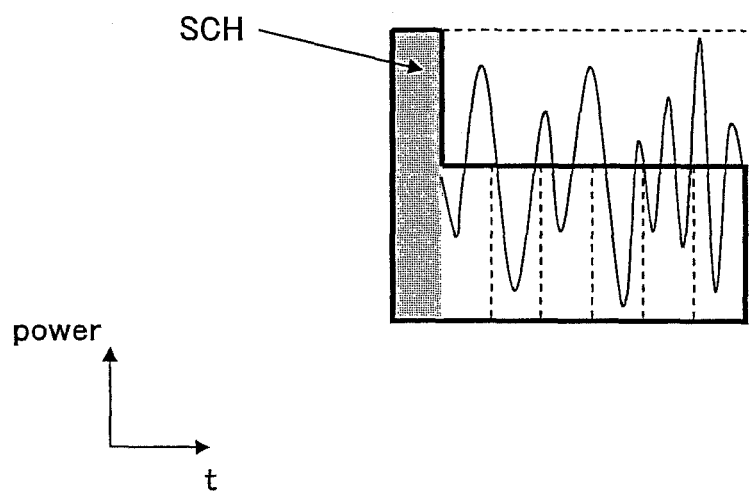
FIG. 3 is a schematic diagram illustrating exemplary correspondence between synchronization channel numbers and scramble code group numbers.
FIG. 4A is a schematic diagram illustrating an exemplary method of generating a synchronization channel waveform.
Figure 4C:
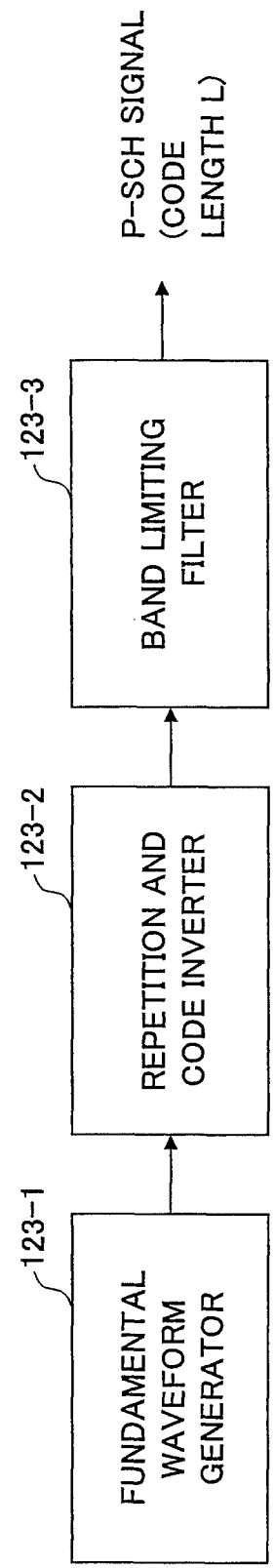
FIG. 4C is a block diagram illustrating exemplary P-SCH signal generation in a base station.

Alternatively, the data generator 121 may generate synchronization channel codes defined for respective control information such as scramble codes and scramble code groups. In this case, as illustrated in FIG. 3, a synchronization channel is defined for respective control information such as a scramble code and a scramble code group. In other words, a synchronization channel number indicative of a synchronization channel is associated with the control information such as a scramble code and a scramble code group. In this case, the receiver 20 can detect the control information and frame timing by computing correlation between all defined synchronization channel waveforms and received signals, resulting in reduced cell search time. Thus, it is possible to reduce power consumed in the receiver 20.

A data modulation unit 122 modulates synchronization signal data, and a serial to parallel conversion unit 125 performs serial to parallel conversion on the modulated data to generate N symbol sequences on the frequency axis. Each multiplier 126 multiplies the corresponding symbol sequence signal with a synchronization signal spreading code generated in a synchronization signal spreading code generator 123 in the frequency direction to generate N parallel synchronization signals.

For example, the synchronization signal spreading code generator 123 may multiply a scramble code included in the scramble code group number corresponding to the synchronization channel code number in accordance with correspondence between the channel code numbers and the scramble code group numbers as described in reference to FIG. 3.

The multipliers 126 generate N parallel synchronization signals and supply them to N multipliers 119. Each of the N multipliers 119 multiplies the respective parallel synchronization signal with an amplitude adjustment sequence value incoming from an amplitude adjustment unit 116, and supplies the resulting signal to a second combination unit 112.

Next, an exemplary operation in the amplitude adjustment units 115 and 116 in the transmitter 10 according to this embodiment will be described in detail below.

The amplitude adjustment units 115 and 116 multiply synchronization channels with an amplitude adjustment sequence value for amplitude adjustment. For example, the amplitude adjustment units 115 and 116 use a signal having sufficiently low peak-to-average power ratio (PAPR) in the temporal range to conduct some operation for reducing PAPR of the synchronization channel.

In a transmission amplifier, data are supplied to a data channel randomly, resulting in the higher PAPR and a random waveform as illustrated in FIG. 4A. In FIG. 4A, the vertical axis and the horizontal axis represent transmission power at a base station and time, respectively.

On the other hand, since the synchronization channel has a fixed reference pattern, a signal of lower PAPR can be selected by determining an appropriate pattern.

In FIG. 4A, if the amplifier has an upper achievable power level as indicated in a dotted line, the back-off is set to have a level lower than the average level in consideration of fluctuation margin of signals.

Supposing that a temporal waveform of PAPR equal to zero, that is, a temporal waveform without a peak rising, can be generated as a synchronization channel, an output signal greater than the average output over data channels can be transmitted accordingly. Thereby, it is possible to improve detection accuracy of the synchronization channels in the receiver 20.

The amplitude adjustment units 115 and 116 supply an amplitude adjustment sequence value to the multipliers 118 and 119 in order to generate a waveform without outstanding PAPR. The amplitude adjustment sequence value has some characteristics as follows.

(a) Basically, the amplitude adjustment sequence value has constant amplitude in the temporal range and the frequency range. For example, respective signal components of a sequence are in the form of exp(j.theta.) where j is an imaginary unit.

(b) The amplitude adjustment sequence value has perfect periodic autocorrelation characteristics. For example, the autocorrelation has zero except zero shift.

As a sequence having these characteristics, a CAZAC (Constant Amplitude Zero AutoCorrelation) sequence is typical. For example, see non-patent documents 1, 2 and 3. In this fashion, utilization of the CAZAC sequence (CAZAK code) fulfils better autocorrelation characteristics, and thus timing detection accuracy based on replica correlation can be improved.

Furthermore, sequences having characteristics as presented below in addition to the above-mentioned characteristics may be used.

(c) Even after the sequence is multiplied as an arbitrary complex number sequence, the sequence still has the above-mentioned characteristics (a) and (b).

(d) The sequence has optimum crosscorrelation. For example, the crosscorrelation (absolute value) is limited to $1/\{\text{square root over} (N)\}$ for the sequence length N.

As sequences having the above-mentioned characteristics, a GCL (Generalized Chirp-Like) sequence (cf. non-patent document 4) and a Generalized Frank sequence (cf. non-patent document 5) are typical.

Alternatively, a Golay code (cf. non-patent document 6) may be used. Since the Golay code fulfils better autocorrelation characteristics, the timing detection accuracy based on replica correlation can be improved in the receiver. In addition, its code property can simplify correlation processing.

Alternatively, signals generated by converting PN codes generated within a SCH bandwidth in a frequency range into ones in a temporal range in IFFT may be used. Since such signals fulfill better autocorrelation characteristics, the timing detection accuracy based on replica correlation can be improved in the receiver.

Furthermore, any of the above-mentioned three waveforms may be used as a fundamental waveform, and then it may be transmitted repeatedly. In this case, reception processing can be simplified in the receiver. For example, the receiver may include only one correlator corresponding to the fundamental waveform and combine some outputs of the correlator.

Also, in case of a repeated fundamental waveform, inverted codes may be included. In this case, the autocorrelation characteristics can be improved, and thus the timing detection accuracy can be improved in the receiver.

Also, it may be selected in the receiver, based on the fundamental waveform transmitted repeatedly, which of the autocorrelation based approach and the replica correlation based approach should be used for the timing detection. For example, if higher throughput is given higher priority, that is, if the processing amount should be reduced, the timing detection is carried out based on the autocorrelation. On the other hand, if higher detection accuracy is given higher priority, the timing detection is carried out based on the replica correlation.

For example, the fundamental waveform having better autocorrelation characteristics may be inverted, and the inverted and repeated waveform may be used.

For example, a fundamental waveform having the length equal to 1/N of the symbol length L of 1 OFDM symbol may be used. In this case, some code having better autocorrelation characteristics such as a Golay code, a Gold code and an orthogonal Gold code may used as the fundamental waveform. As illustrated in FIG. 4B, codes having better autocorrelation characteristics even in the whole signal can be generated by repeating the inverted fundamental waveform N times. In FIG. 4B, the horizontal axis represents time (t). For example, inverted fundamental waveform "A" may be repeated N times. In FIG. 4B, the inverted fundamental waveform is represented as "−A".

Some component may arise out of the signal band if it is left as it is. Thus, a P-SCH signal waveform is finally formed through passage into a desired signal bandwidth filter.

For example, for the transmitter 10 described with reference to FIG. 1, a synchronization signal spreading code generator 123 is configured to include a fundamental waveform generator 123-1, a repetition and code inverting unit 123-2 receiving output signals from the fundamental waveform 123-1, and a band limiting filter 123-3 receiving output signals from the repetition and code inverting unit 123-2.

The fundamental waveform generator 123-1 generates a fundamental waveform having the code length L/N. The repetition and code inverter 123-2 repeats and code-inverts the fundamental waveform having the code length L/N. For example, the repetition and code inverter 123-2 repeats and code-inverts the fundamental waveform having the code length L/N N times, resulting in the code length being L.

The band limiting filter 123-2 provides final P-SCH signal waveform by passing the resulting waveform through a desired signal bandwidth filter.

As such a desired signal bandwidth, two cases may be conceived as follows.

(1) A bandwidth provided for S-SCH may be used. In this case, it is possible to eliminate influence toward other channels out of the SCH band.

(2) A system bandwidth may be used. In this case, although there is slight influence toward other channels out of the SCH band, the SCH signal waveform has less distortion, resulting in higher detection accuracy in a mobile station.

In the mobile station, a correlator corresponding to the fundamental waveform is prepared, and its output is code-inverted and combined. In this fashion, replica correlation with high detection accuracy can be achieved under a smaller amount of computation.

An exemplary operation in the combination unit 112 in the transmitter 10 according to the embodiment will be described in detail below.

As illustrated in FIG. 5A, the combination unit 112 inserts a synchronization channel at a frame period. In the case of frame periodic insertion of the synchronization channel, for example, the combination unit 112 may time-multiplex the synchronization channel, that is, store and transmit the synchronization channel in an OFDM symbol of some slot. In this case, for example, a frame may be configured to have an integer multiple of the slot length. One frame may be configured to include multiple slots such as 15 slots, and in turn, one slot may be configured to include multiple OFDM symbols such as 7 OFDM symbols.

In this configuration, slots having the synchronization channel can be controlled under closed loop control such as retransmission without awareness in the transmitter 10. In other words, the round trip time may be unchanged. In the receiver 20, on the other hand, reception timing of the synchronization channel can be identified by correlating a received signal and a synchronization channel replica in a temporal range, and thus, symbol timing and frame timing can be detected at the same time. Alternatively, the receiver 20 may identify the reception timing of the synchronization channel by correlating the received signal with the synchronization channel replica in a frequency range. In this case, the receiver 20 would use a common pilot channel subjected to scramble coding to detect the scramble code.

By providing only one frame with the synchronization channel, if a synchronization channel is detected, the frame boundary can also be detected. In addition, compared to the case of providing multiple frames with the synchronization channel, higher transmission power for the synchronization channel is achieved, resulting in improved detection accuracy.

Alternatively, the receiver 20 may use a common pilot channel subjected to scramble coding to detect the scramble code after frame detection and scramble code group detection.

Conventionally, for example, according to W-CDMA (Wideband Code Division Multiple Access), the synchronization channel is inserted for each slot period, that is, for each slot. As a result, symbol timing is first detected, and then frame timing is detected. In other words, the frame timing is detected through the two steps. According to this scheme, although slot timing can be detected through the synchronization channel, it is not possible to identify the associated portion of the frame. Thus, the associated portion of the frame is detected after the detection of the slot timing. According to this embodiment, when the synchronization channel is detected, the frame and the symbol timings can be identified. As a result, the symbol timing and the frame timing can be detected at the same time.

In this embodiment, the insertion of the synchronization channel into only one portion of frame unit (period) has been described. However, the synchronization channel may be inserted into multiple portions of the frame unit or period. In other words, the synchronization channel only has to be inserted into at least one portion of the frame unit or period.

Figure 5B:
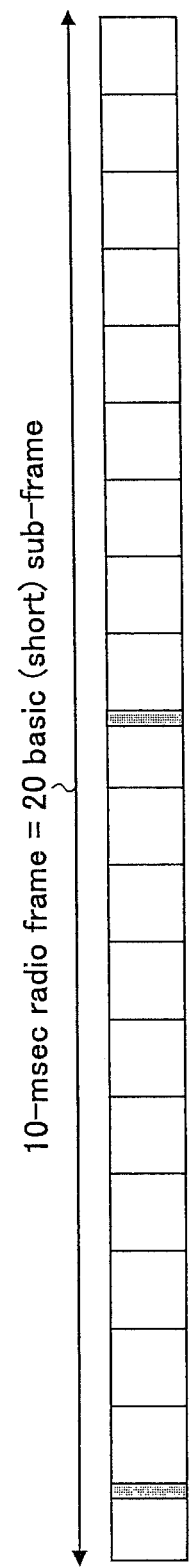
FIG. 5B is a schematic diagram illustrating an exemplary configuration of the synchronization channel.
Figure 5C:
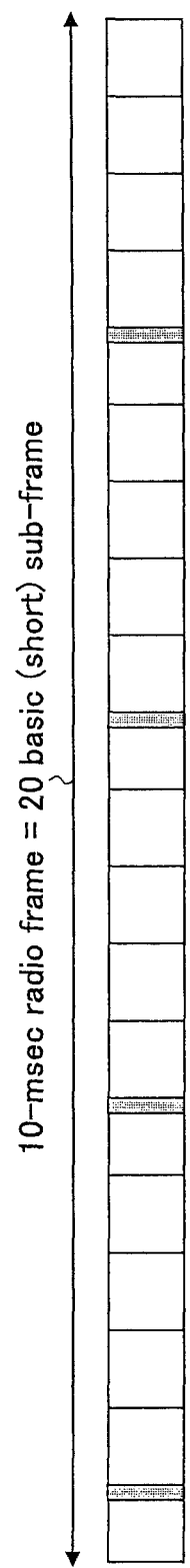
FIG. 5C is a schematic diagram illustrating an exemplary configuration of the synchronization channel.

For example, as illustrated in FIG. 5B, the synchronization channel may be inserted in such a manner that two periods can be configured for each frame. Also, as illustrated in FIG. 5C, the synchronization channel may be inserted in such a manner that four periods can be configured for each frame.

The receiver 20 identifies reception timing of the synchronization channel by correlating the received signal with the synchronization channel replica. In this case, correlations between multiple frames are averaged. For example, if there are 10,000 samples within a single frame, correlations are computed for the 10,000 samples, and the sample having the maximum correlation is found. In this case, if multiple frames are averaged, a memory has to be prepared for storing the 10,000 correlation values temporarily. Then, correlation values are computed for 10,000 samples in the next frame, and the correlation values of the respective samples are added for improved S/N. Thus, a larger memory has to be provided.

In the case of multiple synchronization channels being provided, if the above-mentioned multiple frames are averaged, the memory only has to have smaller capacity. For example, if a two-period channel is used for each frame, the memory capacity can be reduced to ½. If a four-period channel is used for each frame, the memory capacity can be reduced to ¼.

In addition, as more synchronization channels are provided for each frame, the memory capacity can be further reduced.

In the case of multiple channels being provided, the channels may be arranged equally. In other words, the synchronization channels are equally spaced in a frame period. In this arrangement, the averaging operation of multiple frames can be easily carried out.

Alternatively, in the case of multiple channels being provided, the channels may be arranged unequally. In this arrangement, the frame boundary can be easily detected.

In addition, in the case of the insertion of the multiple synchronization channels into a frame, a time diversity effect can be obtained by combining correlation outputs between the multiple synchronization channels in the receiver. As a result, it is possible to improve the timing detection accuracy.

Figure 5D:
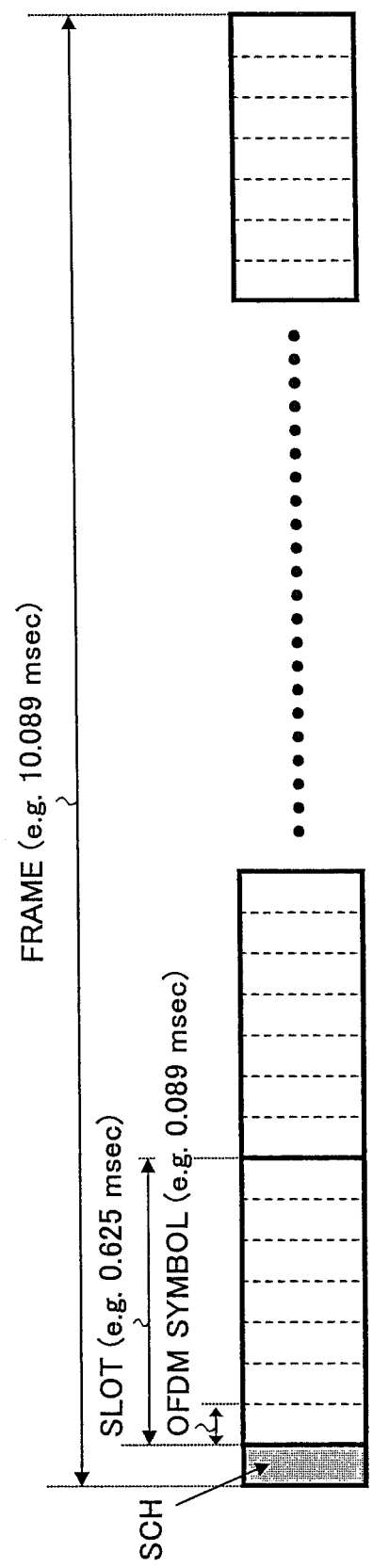
FIG. 5D is a schematic diagram illustrating an exemplary configuration of the synchronization channel.

Also, as illustrated in FIG. 5D, in the case of the synchronization channel being time multiplexed in a frame period, the combination unit 112 may provide an independent slot and insert the synchronization channel therein. In this case, such a frame may be configured to have (an integer multiple of the slot length+the synchronization channel length) in length. In this configuration, the configuration within slots can be made uniform over all the slots, resulting in a simpler radio I/F configuration. In other words, the transmission and reception can be more simplified.

An exemplary configuration of a synchronization channel will be described in detail below.

Figure 6A:
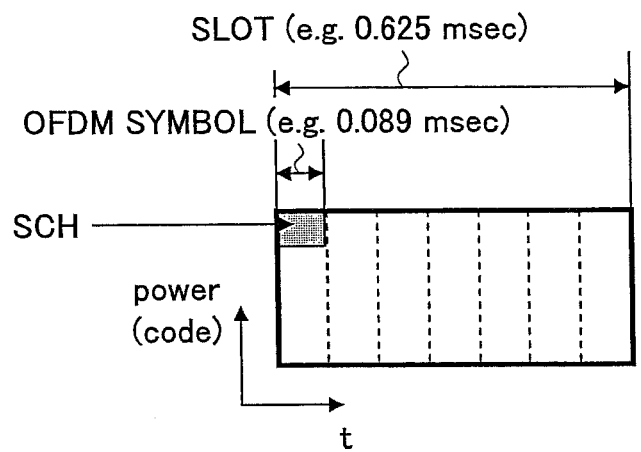
FIG. 6A is a schematic diagram illustrating an exemplary configuration of the synchronization channel.

In W-CDMA, as illustrated in FIG. 6A, the synchronization channel is accommodated at the head of a slot, and in addition to the synchronization channel, a data channel is accommodated. In other words, the synchronization channel and the other channel are code-multiplexed and transmitted. In this configuration, the other channel can be configured without consideration of the synchronization channel, but only a portion of total transmission power can be allocated to the synchronization channel As a result, the receiver 20 must conduct averaging operations for a longer time in order to detect the synchronization channel. In FIG. 6A, the vertical and horizontal axes represent the transmission power (code) level and time, respectively.

Figure 6B:
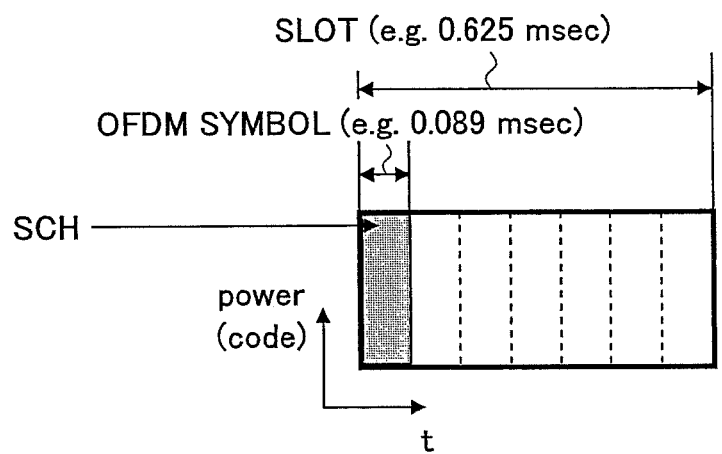
FIG. 6B is a schematic diagram illustrating an exemplary configuration of the synchronization channel.

According to this embodiment, as illustrated in FIG. 6B, for example, an OFDM symbol is allocated to the synchronization channel for a certain duration. As a result, the total transmission power can be allocated to the synchronization channel In this configuration, the receiver 20 can complete reception operations in a shorter duration and detect the symbol and frame timings. For example, 1 OFDM symbol is allocated to the synchronization channel In FIG. 6B, the vertical and horizontal axes represent transmission power (code) level and time, respectively.

In W-CDMA, the synchronization signal cannot be detected based on only one slot, and thus the synchronization channel having a longer duration is used like a frequency multiplex type. In W-CDMA, multiple slots are used and correlated to detect the synchronization signal. In other words, the detection of the synchronization signal requires a reasonable number of samples, which may lead to a longer reception duration and a larger amount of computation in the receiver 20.

According to this embodiment, since the total transmission power can be allocated to the synchronization channel in the transmitter 10, higher power can be allocated. As a result, the synchronization channel can be transmitted for a shorter time of period. For example, while the transmission of the synchronization channel may require about 10% of the time period of one frame in W-CDMA, it may require only about 1% in this embodiment.

Also in the receiver 20, frame correlation can be facilitated in a shorter period of time, resulting in a smaller amount of the computation. In addition, since the symbol and frame timings can be detected by means of only one synchronization channel, it is possible to reduce the required buffering amount and the consumed power.

Also in the case of the synchronization channel being time-multiplexed as illustrated in FIG. 7, the combination unit 112 may allocate the synchronization channel to some subcarriers of 1 OFDM symbol. For example, the combination unit 112 may allocate the synchronization channel to some subcarriers of 1 OFDM symbol at even intervals. Also, the synchronization channel may be allocated at uneven intervals in order to improve the detection accuracy in replica correlation. In FIG. 7, the vertical and horizontal axes represent frequency and time, respectively.

In OFDM, the number of subcarriers and the OFDM symbol length are increased to enhance tolerance to multipath. As a result, if one whole OFDM symbol is allocated to a synchronization signal, this may increase overhead.

In this case, the combination unit 112 allocates the synchronization channel to some subcarriers and another channel to the remaining channel part. According to this allocation, it is possible to reduce the overhead on the synchronization channel Also in the case of fixed total transmission power, the transmission power of the synchronization channel can be adjusted by changing a transmission power allocation ratio between the synchronization channel and a multiplexed channel. Furthermore, the transmission power of the multiplexed channel can be adjusted. The transmission power of the synchronization channel can be adjusted by an operator during cell designing, for example.

In addition, the combination unit 112 may use at least a portion of allocated frequency to allocate the synchronization channel discretely (orthogonal multiplex type FDM) as illustrated in FIG. 8. According to this allocation, a frequency diversity effect can be obtained.

In addition, the combination unit 112 may allocate the synchronization channel in such a manner that time division multiplexing can be facilitated by superimposing it on at least one portion of a data channel (non-orthogonal multiplex type TDM) as illustrated in FIG. 8. In this case, the synchronization channel is transmitted in such an arrangement that it is superimposed on at least a portion of an OFDM symbol and time division multiplexed.

In addition, the combination unit 112 may allocate the synchronization channel in such an arrangement that it is superimposed on at least one portion of a data channel at even intervals and frequency division multiplexed (non-orthogonal multiplex type FDM) as illustrated in FIG. 8. According to this configuration, the frequency diversity effect can be obtained.

In addition, the combination unit 112 may allocate the synchronization channel in such a manner that it can be code division multiplexed with at least one portion of a data channel (non-orthogonal multiplex type CDM) as illustrated in FIG. 8.

As a result, as shown in FIG. 9, synchronization channel codes $p.sub.k(1)$, $p.sub.k(2)$, ..., $p.sub.k(2n)$ ($k=1, 2, \ldots,$ Kgrp) belonging to a scramble code group are allocated to subcarriers. The synchronization channel codes allocated to the subcarriers are supplied to the inverse Fourier transform (IFFT) unit 113. Then, the synchronization channel codes are converted into an orthogonal multi carrier signal, and the converted signal is supplied to the CP addition unit 114. The CP addition unit 114 inserts a CP (Cyclic Prefix) selected by the CP selection unit 117 into a multi carrier signal supplied for each Fourier target time. Then, the transmitter 10 transmits a multi carrier signal supplied from the CP addition unit 114, that is, the SCH time waveform, into the air as a radio signal. The SCH time waveform is provided by defining a number of SCH time waveforms corresponding to the number of groups.

Also, a sequence of synchronization channels may be provided by differential encoding between subcarriers.

In this case, the receiver detects the sequence of synchronization channels by extracting phase difference information through delay correlation between subcarriers.

In the case of direct multiplication of subcarriers with the synchronization sequence, if there is fading fluctuation in a frequency range (frequency selective fading) r no in-phase addition can be fulfilled in a long interval on the frequency axis.

By using a phase difference between subcarriers (differential encoding) to multiply the synchronization channel sequence, even if fading fluctuation occurs in the frequency range, in-phase addition can be fulfilled for the small fading fluctuation between adjacent subcarriers by extracting the phase difference between subcarriers in delay detection type correlation. As a result, even if the fading fluctuation occurs, high detection accuracy can be achieved.

Also, since correlation in a long sequence can be used, a large number of sequences can be provided. In other words, the synchronization channel can be used to transmit a large amount of information.

Figure 10A:
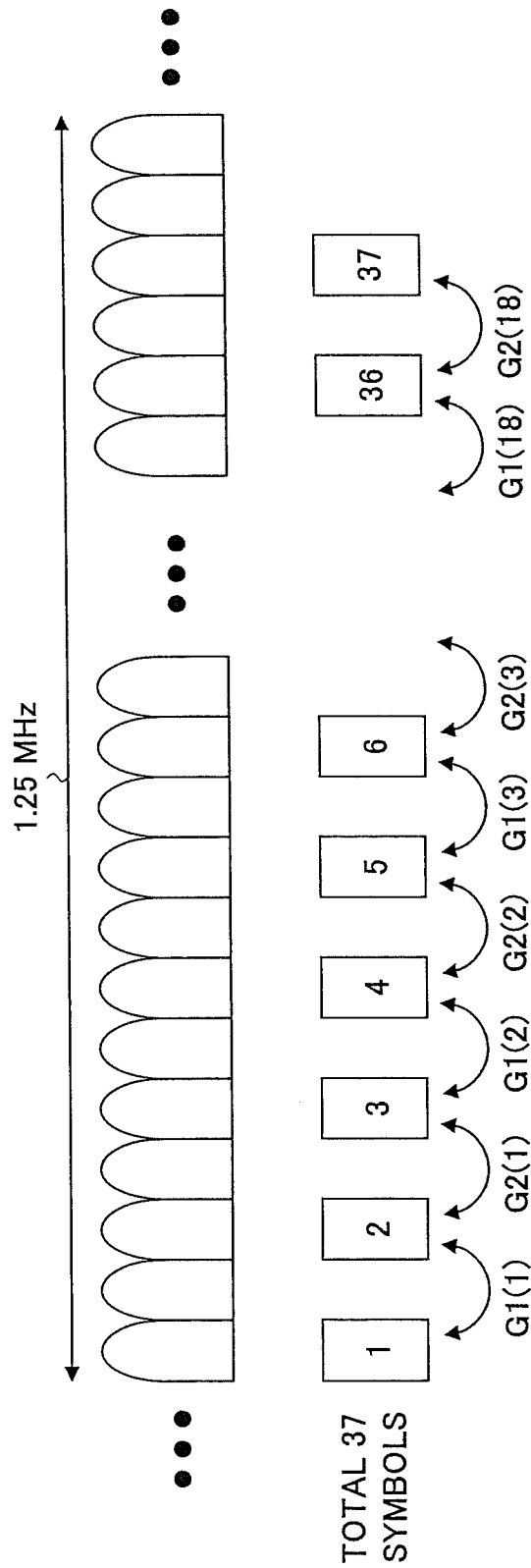
FIG. 10A is a schematic diagram illustrating an exemplary arrangement of the synchronization channel.

In this case, as illustrated in FIG. 10A, the placement of the synchronization channel sequence is not limited to the placement between adjacent subcarriers, and the synchronization channel can be provided every two subcarriers. Also, a larger amount of control information can be transmitted by providing two types of sequences and configuring them in two layers.

For example, if the two types of sequences include 16 patterns, 256 (=16.times.16) types of information can be transmitted. In this case, the synchronization channel can be used to transmit information such as 16 cell IDs, 2 frame timings, two sector structures, two MIMO (Multiple Input Multiple Output) antenna structures and two CP lengths. In this case, the two sequences may be arranged alternately as sequence 1 and sequence 2, for example. In addition, a GCL sequence, Walsh sequence and others can be applied. For example, in the case of the GCL sequence, GCL sequence 1 consists of $G1(1)$, $G1(2)$, $G1(3)$, ..., and GCL sequence 2 consists of $G2(1)$, $G2(2)$, $G2(3)$, ....

Instead of GCL code and Walsh code, any of (1) orthogonal code, (2) quasi-orthogonal code or (3) code having good autocorrelation and crosscorrelation characteristics in a frequency range may be used as a secondary synchronization channel code as described below.

Specifically, an orthogonal code whose phase rotates at a constant rotational speed on the frequency axis may be used.

According to such a code, it is possible to generate an orthogonal code for arbitrary sequence length and improve the detection accuracy at the second step.

In addition, the above-mentioned code may be scrambled on the frequency axis in accordance with a manner predefined in the system. In this case, a common scrambling scheme is used for different cells rather than different scrambling schemes. In the above-mentioned code, the phase rotates on the frequency axis at a constant rotational speed. As a result, the code has an impulse waveform on the time axis, which is not desirable from the viewpoint of efficiency of transmission amplifiers. Thus, the code is scrambled on the frequency axis for randomization in order to eliminate the problem with transmission amplifier efficiency. Since a mobile station knows the scramble code in advance, the correlation detection can be easily achieved by descrambling and correlating the code prior to correlating the secondary synchronization channel.

Here, the synchronization channel codes $p.sub.k(1)$, $p.sub.k(2)$, ..., $p.sub.k(2n)$ belonging to a scramble code group may be divided into codes for detecting frame timing and codes for detecting control information such as the scramble code group. For example, the synchronization channel for frame timing is used as a primary synchronization channel (Primary-SCH), and the synchronization channel for group detection is used as a secondary synchronization channel (Secondary-SCH). Here, Primary-SCH is used as a waveform common to all cells. Secondary-SCH has a waveform defined for each scramble code group. Primary-SCH and Secondary-SCH are combined with a data symbol sequence.

In other words, reception timing is detected in Primary-SCH, and a reception frame and information relating to scramble codes are detected in Secondary-SCH. For example, symbol timing (FFT timing) is reported in Primary-SCH. Also, the frame timing can be reported in Primary-SCH by setting the insertion interval of Primary-SCH as one frame. Since the symbol timing and the frame timing can be detected in Primary-SCH, the frame timing does not have to be reported in Secondary-SCH.

Also, for example, a scramble code group may be detected in Secondary-SCH. In addition, scramble codes in the scramble code group may be further detected. The further detection of scramble codes enables demodulation to be carried out immediately. For example, some code may be defined as a secondary channel, and different code patterns may be associated with the respective scramble groups. For example, for 64 types of code groups, 64 types of code patterns may be provided. For 512 types of scramble codes, 512 types of code patterns are provided. In this fashion, correlation with the synchronization channel is carried out. Conventionally, a pilot channel is used to detect a scramble code from a scramble code group.

Also, information reported in the secondary synchronization channel may include only scramble code group information. According to this configuration, it is possible to reduce the workload of reception operations and improve detection accuracy.

Also, information indicative of a scramble code group may be reported through the pattern of a common pilot channel (CPICH). The reporting of the CPICH pattern allows a physical channel to report a scramble code group, that is, the secondary synchronization channel becomes unnecessary.

Also, information indicative of a system bandwidth may be reported in the secondary synchronization channel. If the transmission bandwidth of the synchronization channel is 1.25 MHz or 5 MHz, a mobile station does not have to know the system bandwidth at the cell search stage. In addition, since radio resources allocated to the synchronization channel may increase overhead, it is desirable to use as few radio resources as possible.

Also, information indicative of the bandwidth of a broadcasting channel may be reported in the secondary synchronization channel For example, the bandwidth of the broadcasting channel can be detected in the secondary synchronization channel in the reception side by using different secondary synchronization channel signals for different broadcasting channel bandwidths.

Also, information indicative of the number of transmission antennas may be reported in the secondary synchronization channel. For example, the maximum number of the synchronization channels and CPICH may be set to be 2. In this configuration, the number of transmission antennas does not have to be known at the cell search stage.

Also, information related to cell structure such as the number of sectors may be reported in the secondary synchronization channel. For example, the cell structure can be detected in the secondary synchronization channel at the reception side by using different secondary synchronization channel signals depending on the number of sectors in a cell.

Also, information relating to the number of antennas in a base station may be reported in the secondary synchronization channel For example, the number of transmission antennas can be detected in the secondary synchronization channel at the reception side by using different secondary synchronization channel signals depending on the number of transmission antennas.

Also, information relating to the CP length may be reported in the secondary synchronization channel. For example, the CP length can be detected in the secondary synchronization channel at the reception side by using different secondary synchronization channel signals depending on the CP length.

As a signal waveform for use in S-SCH, for example, codes having good crosscorrelation characteristics at the same timing may be used.

In S-SCH, control information such as cell ID groups may be reported by transmitting different codes. In this case, correlation between different codes such as codes having good crosscorrelation characteristics may be used for easy identification of different control information. In S-SCH, codes are arranged on the frequency axis unlike W-CDMA. Thus, no shift on the frequency axis has to be taken into consideration, and any code having good crosscorrelation characteristics at the same timing, that is, under conditions where there is no shift in the frequency direction, can be used. From this viewpoint, the above-mentioned Walsh code and CAZAC code are suitable because they are orthogonal at the same timing. For example, if code 1 ($c1, c2, c3, c4, c5, \ldots, cn-1, cn$) having good crosscorrelation characteristics at the same timing and code 2 ($d1, d2, d3, d4, d5, \ldots, dn-1, dn$) are used as illustrated in FIG. 10B, information A and B can be reported via the codes 1 and 2, respectively. In FIG. 10B, the horizontal axis represents frequency.

Also, for example, some code having good autocorrelation and/or crosscorrelation characteristics also including timing shift may be used as the signal waveform in S-SCH. For example, different timings may be generated through shifting on the frequency axis.

If some code having good autocorrelation and/or cross correlation characteristics also including timing shift is used in addition to the crosscorrelation characteristics, information can be reported by timing shift such as the code phase in addition to codes. As a result, a larger amount of control information can be transmitted. For example, the transmitted amount of information can be increased corresponding to (the number of codes.times.the number of phase shifts). As the codes having such characteristics, for example, Gold code and orthogonal Gold code are applicable. For example, if code 1 ($c1, c2, c3, c4, c5, \ldots, cn-1, cn$) having good crosscorrelation characteristics at the same timing and code 1 (phase shift 1) ($c2, c3, c4, c5, c6, \ldots, cn-2, cn-1$) resulting from code 1 being shifted by a predefined amount of phase, such as the amount of phase shift equal to 1, are used as illustrated in FIG. 10C, information A and C can be reported by code 1 and code 1 (phase shift 1) respectively. In FIG. 10C, the horizontal axis represents frequency.

Figure 11A:
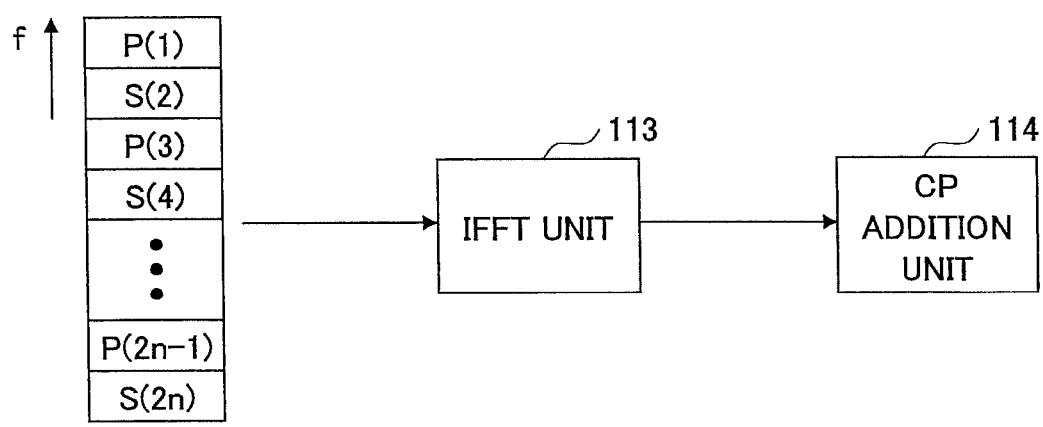
FIG. 11A is a schematic diagram illustrating the type of the synchronization channel.

Primary-SCH and Secondary-SCH are multiplexed and transmitted. For example, as illustrated in FIG. 7, Primary-SCH may be allocated to some subcarriers of 1 OFDM symbol, and Secondary-SCH may be allocated to the remaining subcarriers. In this case, as illustrated in FIG. 11A, Primary-SCH(P(k)) ($k=1, 3, \ldots, 2n-1$) and Secondary-SCH(S(k)) ($k=2, 4, \ldots, 2n$) may be allocated to some subcarriers of 1 OFDM symbol.

Alternatively, Primary-SCH and Secondary-SCH may be allocated to different slots and transmitted. Also, as illustrated in FIG. 8, Primary-SCH and Secondary-SCH may be discretely allocated by using at least a portion of allocated frequency (orthogonal multiplex type FDM). According to this allocation, a frequency diversity effect can be obtained.

Also, Primary-SCH and Secondary-SCH may be allocated in such a manner that they are superimposed on at least a portion of a data channel and time division multiplexed (non-orthogonal multiplex type TDM). In this case, Primary-SCH and Secondary-SCH are superimposed on at least a portion of an OFDM symbol and time division multiplexed. The resulting Primary-SCH and Secondary-SCH are transmitted.

Also, Primary-SCH and Secondary-SCH may be allocated in such a manner that they are superimposed at even intervals on at least a portion of a data channel and frequency division multiplexed (non-orthogonal multiplex type FDM). According to this allocation, frequency diversity effect can be obtained.

Also, Primary-SCH and Secondary-SCH may be allocated in such a manner that they are code division multiplexed with at least a portion of a data channel (non-orthogonal multiplex type CDM).

If the synchronization channel is divided and transmitted into Primary-SCH and Secondary-SCHR, the receiver 20 detects frame timing in Primary-SCH and uses Secondary-SCH to detect a scramble code channel based on the detected frame timing.

In this configuration, only one type of synchronization channel waveform has to be computed at time point of the frame timing detection, that is, correlation between Primary-SCH and the received signal only has to be computed herein. In addition, after the frame timing is detected, the synchronization channel waveform only has to be computed at the frame timing based on Secondary-SCH and the received signal herein. As a result, a computational amount in the receiver 20 can be reduced compared to the configuration where different types of synchronization channel waveforms of all pages are defined corresponding to the number of code groups.

Also, when information indicative of scramble code groups is reported in S-SCH, different types of waveforms are defined corresponding to the number of groups in advance, and these types of waveforms may be used for reporting. According to this configuration, it is possible to reduce the workload of reception operations and improve the detection accuracy for a small number of groups.

Also, when information indicative of scramble code groups is reported in S-SCH, the information may be reported in the form of control bits resulting from application of channel encoding. In this configuration, particularly if there are a large number of groups or if control information other than information indicative of scramble codes is reported in S-SCH, it is possible to reduce the workload of reception operations and improve the detection accuracy. In addition, since CRC (Cyclic Redundancy Check) is applicable, it is possible to improve the reliability of the detection.

Figure 11B:
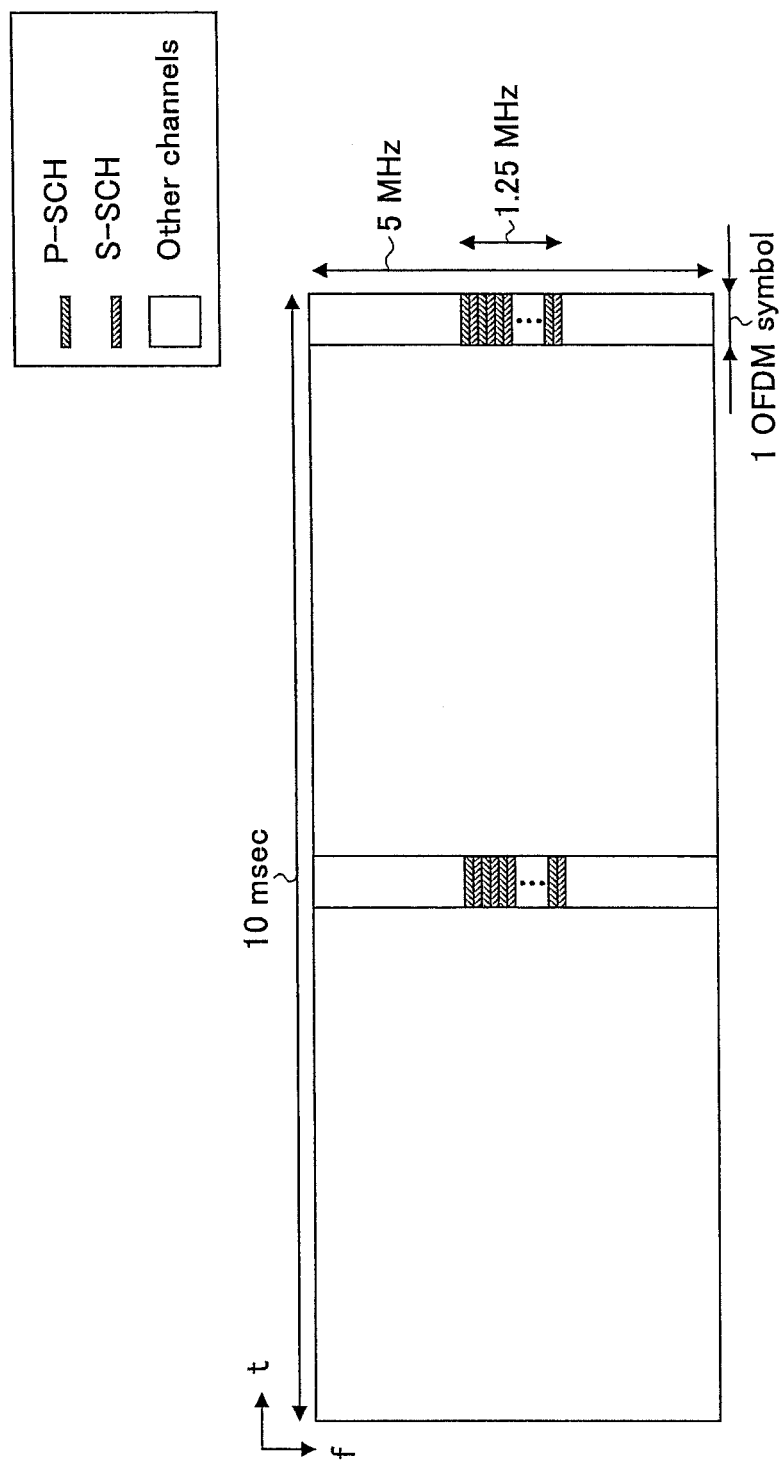
FIG. 11B is a schematic diagram illustrating an exemplary multiplexing scheme of P-SCH with S-SCH.

Also, as illustrated in FIG. 11B, P-SCH and S-SCH may be multiplexed on the same OFDM symbol in FDM. In FIG. 11B, the vertical and horizontal axes represent frequency and time, respectively.

In this configuration, compared to TDM multiplexing, if the number of symbols allocated to SCH is the same, both P-SCH and S-SCH can be allocated to a large number of OFDM symbols, for example, in a temporally distributed manner. As a result, a greater time diversity effect can be obtained.

Also, since S-SCH and P-SCH are located in the same OFDM symbol, the synchronization detection can be facilitated at the S-SCH detection by using P-SCH as reference. Since channel estimation can be carried out at the same time as S-SCH reception timing, effective synchronization can be detected.

There are two FDM schemes of P-SCH and S-SCH as follows.

(1) As a regular arrangement every other one subcarrier, P-SCH and S-SCH are arranged alternately. In this arrangement, greater frequency diversity effect can be obtained.

At the synchronization detection of S-SCH, P-SCHs are always arranged at both sides evenly on the frequency axis for any S-SCH subcarriers. Thus, channel estimation can be carried out with high accuracy by using P-SCH as reference. For FDM, no interference occurs between P-SCH and S-SCH.

(2) P-SCH and S-SCH are irregularly alternated on the frequency axis. In this case, this arrangement is defined by the system. According to (1), if P-SCH is arranged every other one subcarrier on the frequency axis, a two-time repetition waveform appears in the time range. As a result, several peaks appear at the timing detection, which may cause degraded detection accuracy. In order to overcome this problem, P-SCH is irregularly arranged on the frequency axis.

For example, P-SCH and S-SCH are arranged in either one of 2 OFDM symbols or 4 OFDM symbols within a 10 ms frame. Such arrangement can lead to a time diversity effect.

In the case of P-SCH and S-SCH being arranged in 2 OFDM symbols or 4 OFDM symbols, supposing that the overhead of SCH in W-CDMA is the transmission power rate of 10%, for example, the SCH overhead can be limited below about 1%. For example, if SCH of 1.25 MHz is transmitted in the system having bandwidth greater than 5 MHz, the SCH overhead can be reduced.

Also, since SCHs can be arranged in a temporally burst manner, faster cell search can be fulfilled at smaller SCH overhead than W-CDMA.

Figure 12:
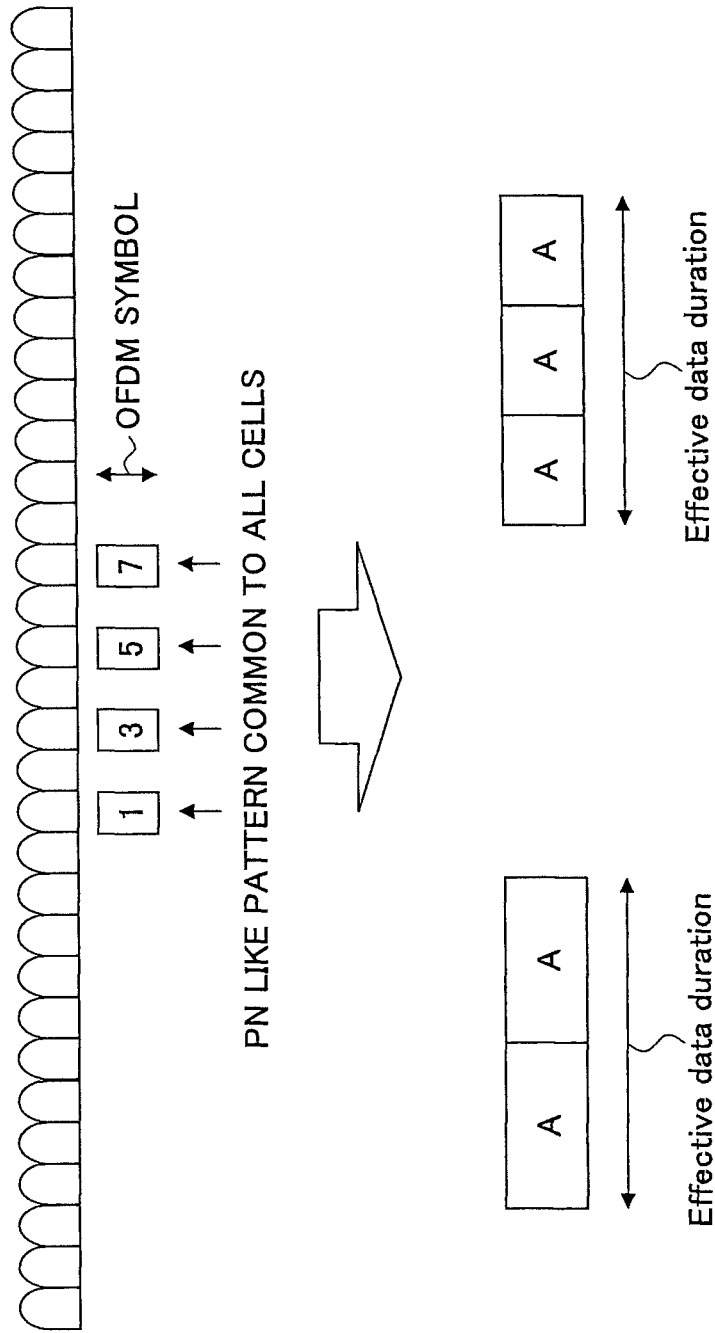
FIG. 12 is a schematic diagram illustrating an exemplary configuration of the primary synchronization channel.

Exemplary transmission and reception operations of a primary synchronization channel will be described with reference to FIG. 12.

The transmitter 10 may transmit a primary synchronization channel in discrete subcarriers. For example, the primary synchronization channel may be transmitted every other subcarrier. For example, the primary synchronization channel may be transmitted in the 1st, 3rd, 5th and 7th subframes from a certain subcarrier in a PN-like pattern common to all cells. In this case, the transmitted primary synchronization channel is common to all subframes. As a result, a temporal signal becomes a repetition signal corresponding to the length of the carrier interval. In other words, a temporally similar pattern is repeated twice in an effective data duration. Similarly, if the primary synchronization channel is transmitted every two subcarriers, a temporally similar pattern is repeated three times in an effective data duration. In other words, when the primary synchronization channel is transmitted to have an interval between subcarriers, the same signal is repeated and transmitted.

According to this configuration, a mobile station (receiver) can fulfill frequency synchronization by comparing the repeatedly transmitted primary synchronization channel and computing an amount of phase rotation during the period.

The receiver detects crosscorrelation between received signals in the time range. In this case, it is advantageous that the synchronization channel be arranged to have an interval more than or equal to one carrier. In this case, the amount of frequency drift can be found from the amount of phase rotation of a correlation value.

In addition, correlation between the received signal and the primary synchronization channel in the time range is detected. In this case, the amount of frequency drift can be found based on the amount of phase rotation of partial correlation within an OFDM symbol.

Exemplary transmission and reception operations of a secondary synchronization channel will be described with reference to FIGS. 13A and 13B.

If multiple secondary synchronization channels are arranged in a frame, different secondary synchronization channels may be arranged. In other words, different code patterns are used for different synchronization channels in a frame. For example, different modulation patterns are used depending on location of scramble code groups and subframes.

An exemplary reception operation under this case will be described.

As detection schemes of secondary synchronization channels, there are frequency range operation and time range operation.

In the frequency range operation, as illustrated in FIG. 13A, symbol timing is found in the primary synchronization channel, and thus the location subjected to FFT operation is found. Thus, the frequency range operation is carried out after the FFT operation. If the absolute phase is used, correlation between received signals and the secondary synchronization channel is detected. In this case, some characteristics may be degraded due to phase rotation caused by fading. If the absolute phase to adjacent primary synchronization channel is used, the phase rotation caused by fading is followed. In other words, the primary synchronization channel is considered to be a pilot, and the phase of the secondary synchronization channel is restored. After that, the correlation value is computed.

The time range operation is conducted before FFT to detect correlation between a received signal and the secondary synchronization channel In this case, if the secondary synchronization channel is spaced by more than or equal to two carriers, crosscorrelation may arise between received signals.

Also, the primary synchronization channel and the secondary synchronization channel are arranged at the same symbol as illustrated in FIG. 133. According to this arrangement, it is possible to reduce influence of fading in the case of channel estimation in the primary synchronization channel. For example, in the case where the primary synchronization channel and the secondary synchronization channel are arranged at different symbol locations, particularly, fading variation may have greater impact during fast movement. For example, the primary synchronization channel p.sub.1, p.sub.2, p.sub.3, . . . , p.sub.N/2 and the secondary synchronization channel S'.sub.k,1, s'.sub.k,2, s'.sub.k,3, . . . , s'.sub.k,N/2 (k is a scramble code group index and N is a subcarrier number) are arranged at different symbol locations. The primary synchronization channel is common to all cells, and the secondary synchronization channel includes a code control bit (scramble code) indicative of a scramble code.

Figure 13B:
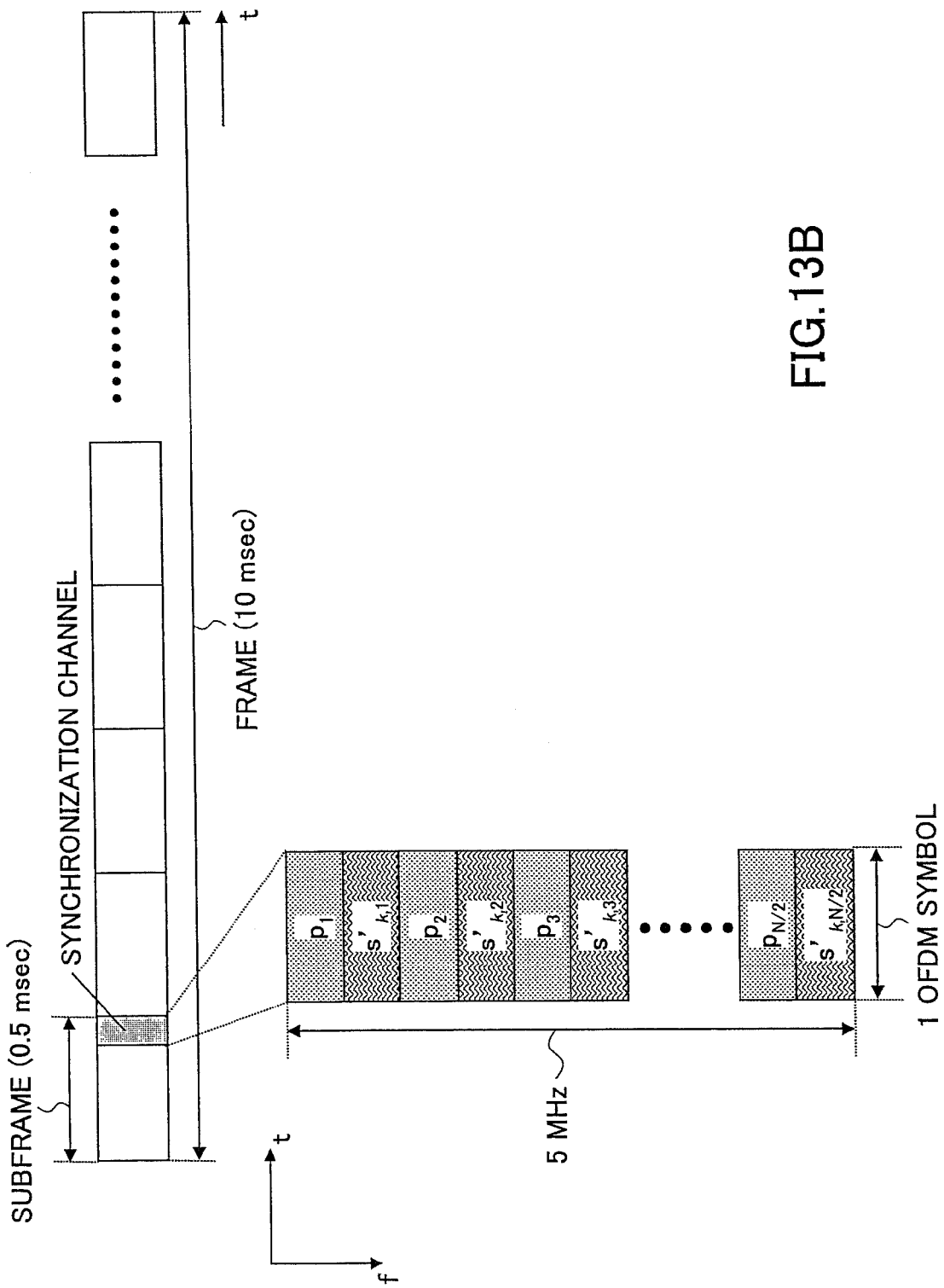
FIG. 13B is a schematic diagram illustrating an exemplary arrangement of the secondary synchronization channel.
Figure 13C:
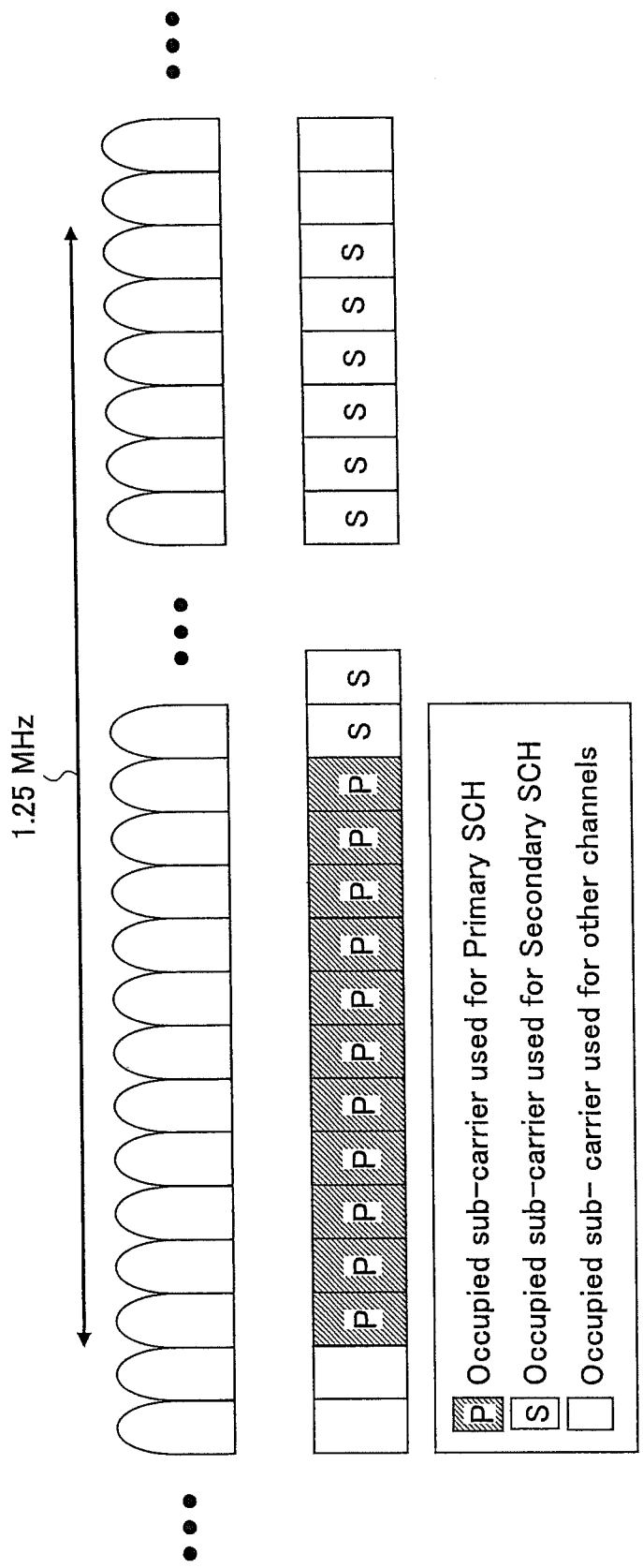
FIG. 13C is a schematic diagram illustrating an exemplary configuration of the secondary synchronization channel.
Figure 13D:
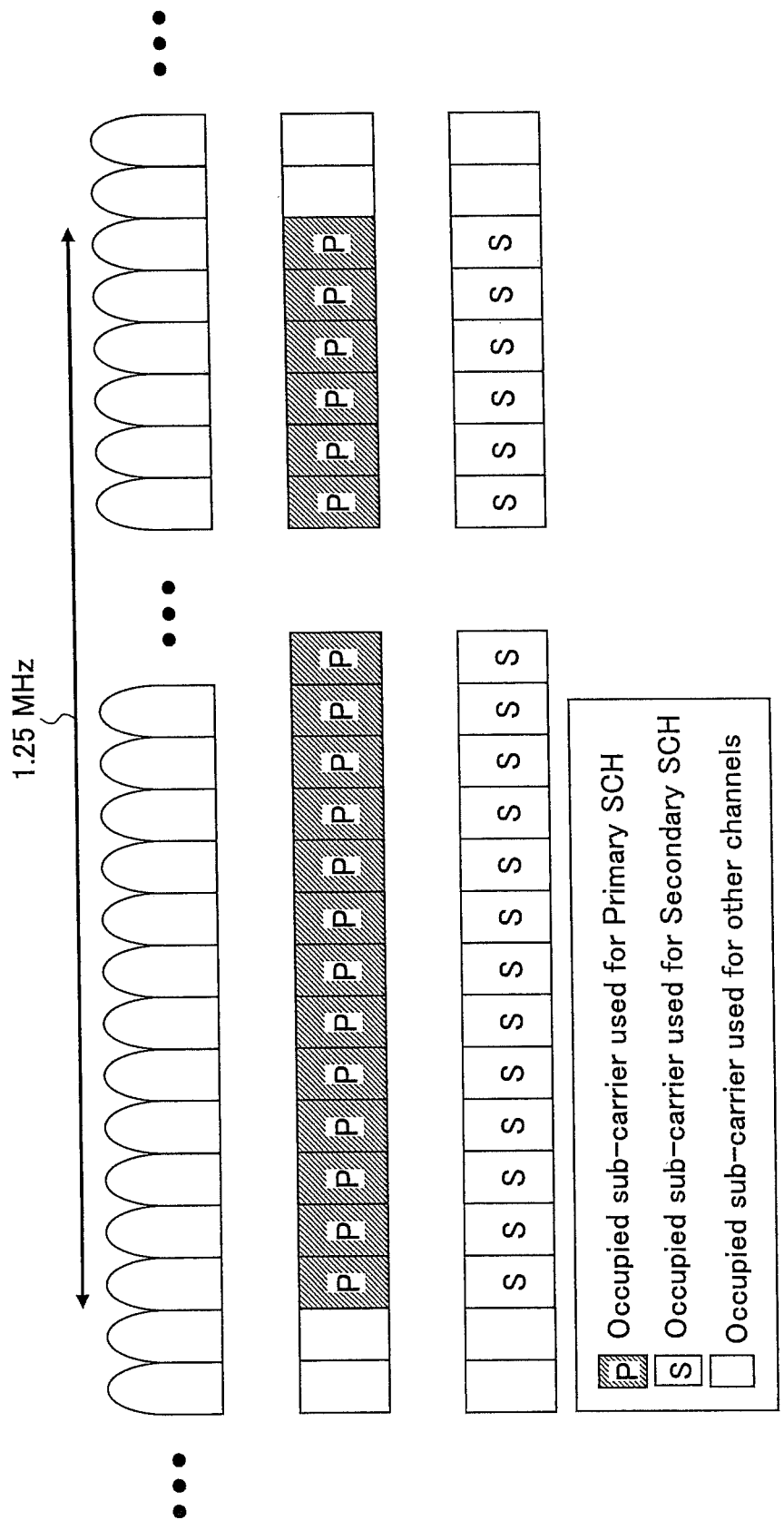
FIG. 13D is a schematic diagram illustrating an exemplary arrangement of the secondary synchronization channel.

Also, P-SCH and S-SCH may not be multiplexed with the same OFDM symbol, that is, P-SCH and S-SCH may not be alternately arranged as illustrated in FIG. 13B. Rather, P-SCH and S-SCH may be consecutively arranged as illustrated in FIG. 13C. Also, as illustrated in FIG. 13D, P-SCH and S-SCH may be multiplexed with the same OFDM in accordance with CDM, that is, P-SCH and S-SCH may be superimposed on each other.

If P-SCH and S-SCH are code multiplexed on the same ODM symbol as illustrated in FIG. 13E, P-SCH is consecutively arranged on the frequency axis compared to the case of multiplexing in accordance with FDM. As a result, there may arise no problem of degraded timing detection accuracy caused by arranging P-SCH every other subcarrier.

Also, since the number of subcarriers for S-SCH, that is, the code length on the frequency axis can be increased, a larger amount of control information such as a cell ID group can be transmitted.

At synchronization detection of S-SCH, P-SCH is multiplexed on the same subcarriers as S-SCH on the frequency axis, and thus channel estimation using P-SCH as reference can be fulfilled.

For example, P-SCH and S-SCH may be arranged at one of 2 OFDM symbols and 4 OFDM symbols within a 10 ms frame.

In this arrangement of P-SCH and S-SCH within a 10 ms frame, a time diversity effect can be obtained.

In the case of P-SCH and S-SCH being arranged at 2 or 4 OFDM symbols, supposing that the overhead of SCH in W-CDMA is the transmission power rate of 10%, for example, the SCH overhead can be limited below about 1%. For example, if SCH of 1.25 MHz is transmitted in the system having bandwidth greater than 5 MHz, the SCH overhead can be reduced. Since SCH can be arranged in a temporally burst manner, fast cell search can be achieved at less SCH overhead than W-CDMA.

Figure 13F:
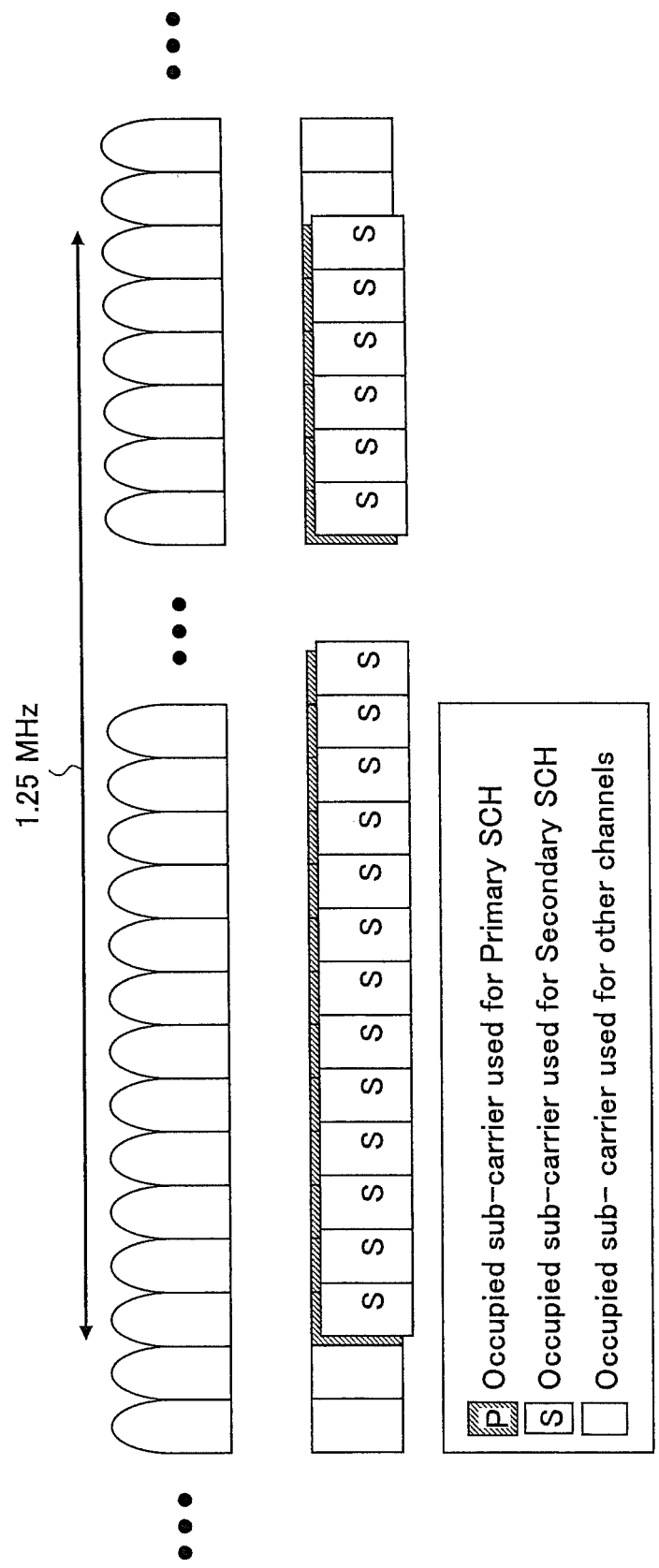
FIG. 13F is a schematic diagram illustrating an exemplary arrangement of the secondary synchronization channel.

Also, as illustrated in FIG. 13F, P-SCH and S-SCH may be multiplexed at different OFDM symbols in accordance with TDM.

Figure 13G:
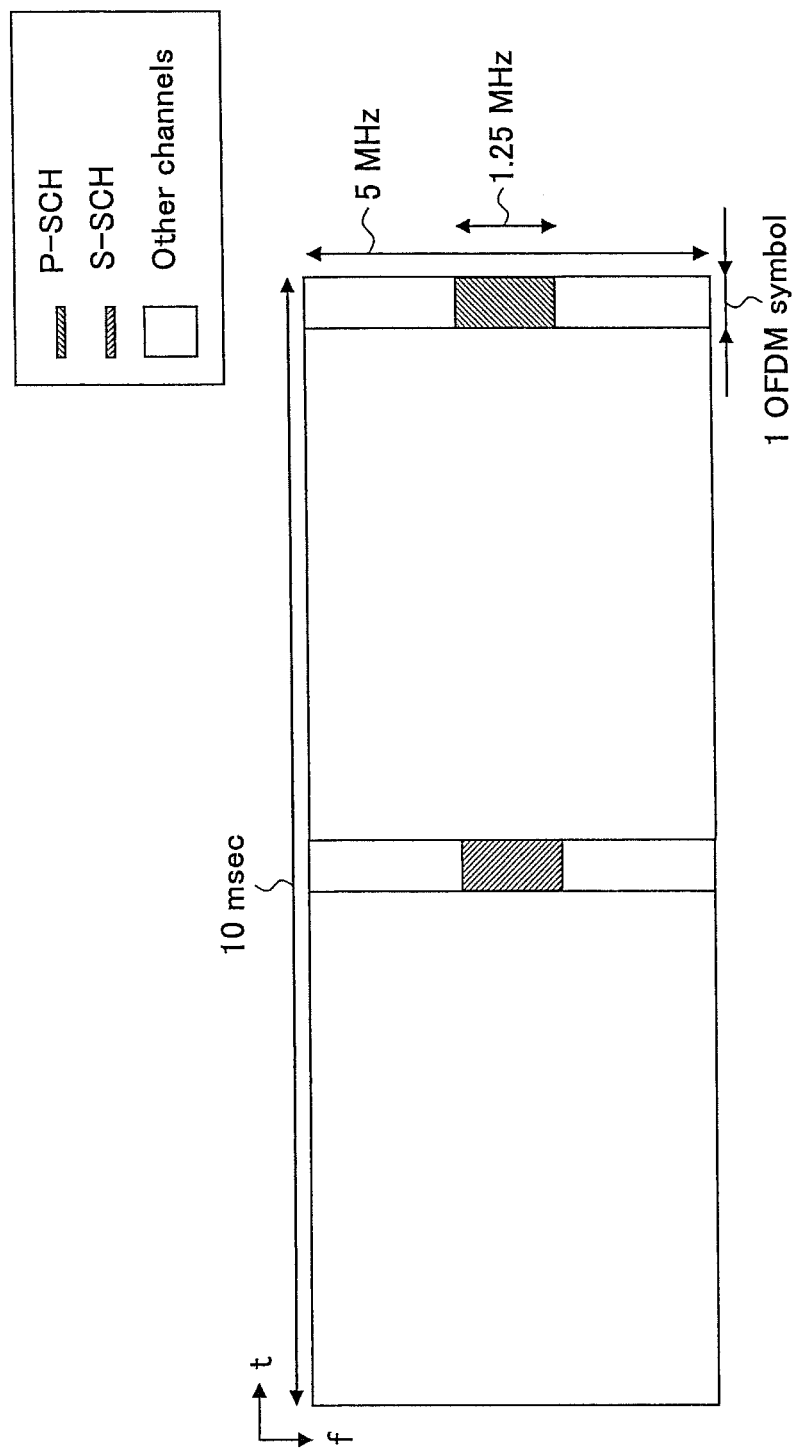
FIG. 13G is a schematic diagram illustrating an exemplary multiplexing scheme of P-SCH and S-SCH.

For example, P-SCH and S-SCH may be multiplexed at different OFDM symbols in accordance with TDM as illustrated in FIG. 13G. In this configuration, P-SCH is consecutively arranged on the frequency axis compared to the case of multiplexing in accordance with FDM. As a result, there may arise no problem of degraded timing detection accuracy caused by arranging P-SCH every other subcarrier.

Also, since the number of subcarriers for S-SCH can be increased, that is, the code length on the frequency axis can be increased, a larger amount of control information such as a cell ID group can be transmitted.

There are two types of arrangement of P-SCH and S-SCH as follows.

(1) As illustrated in FIG. 13G, P-SCH and S-SCH are spaced by a predefined number of frames. According to this arrangement, for example, if P-SCH and S-SCH are spaced by 5 ms, the resulting 5 ms units can be configured to have the same structure.

Figure 13H:
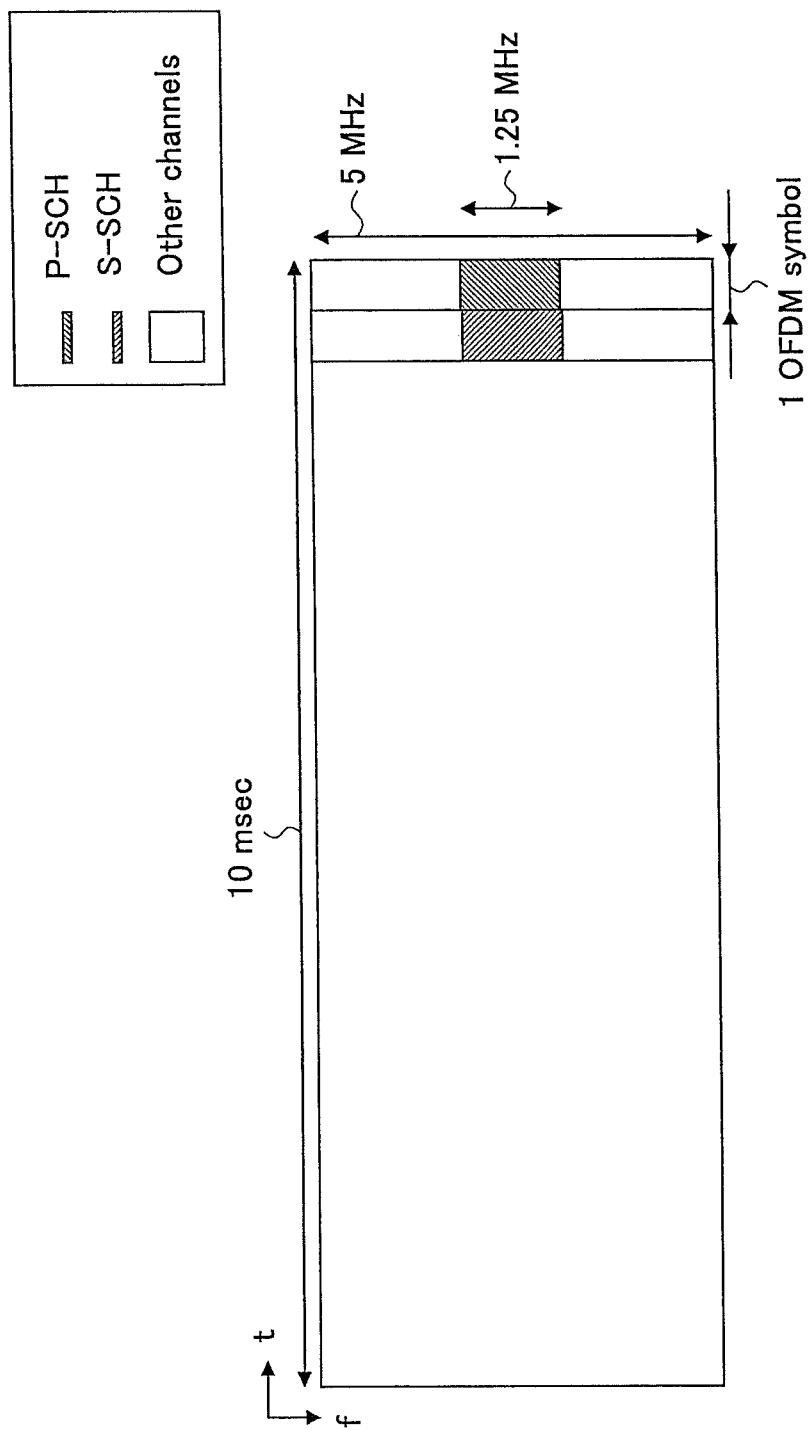
FIG. 13H is a schematic diagram illustrating an exemplary multiplexing scheme of P-SCH and S-SCH.

(2) As illustrated in FIG. 13H, P-SCH and S-SCH are arranged closely to each other on the temporal axis. According to this arrangement, the synchronization detection using P-SCH as reference can be carried out at detection of S-SCH.

Specifically, P-SCH and S-SCH may be arranged at either of 2 or 4 OFDM symbols within a 10 ms frame.

In this arrangement of P-SCH and S-SCH within a 10 ms frame, a time diversity effect can be obtained.

In the case of P-SCH and S-SCH being arranged at 2 or 4 OFDM symbols, supposing that the overhead of SCH in W-CDMA is the transmission power rate of 10%, for example, the SCH overhead can be limited below about 1%. For example, if SCH of 1.25 MHz is transmitted in the system having bandwidth greater than 5 MHz, the SCH overhead can be reduced.

In addition, since SCH can be arranged in a temporally burst manner, fast cell search can be fulfilled at less SCH overhead than W-CDMA.

An exemplary operation of the CP addition unit 114 in the transmitter 10 according to this embodiment will be described in detail below.

The CP addition unit 114 inserts a CP selected by CP selection unit 117 into a multi carrier signal at each Fourier target time.

The CP (Cyclic Prefix) is provided for absorbing influence on signal processing even if signals arrive via delay waves at different timings In fact, systems measure multipaths and determine the CP based on the measurements. In this case, since delay of a signal from a single base station can be found, the CP is determined based on the delay.

However, in the case of multicast where different signals from multiple base stations are combined, transmission delay may be caused by the transmission of signals from multiple base stations besides spreading of reception timing due to a simple multipath. In other words, the difference between transmission delays is added, and thus the spreading of reception timing may be increased compared to the case of the reception of a signal from a single base station. Thus, the amount of delay in the multicast may differ from common communications such as unicast.

Thus, according to this embodiment, several types of radio frames, for example, two types of radio frames are provided. Specifically, several types of CPs having different CP lengths, for example, two types of CPs are provided. One type of CP having a relatively larger CP length is used in multicast, and the other type of CP having a relatively smaller CP length is used in unicast. In the unicast, if a CP having a relatively larger CP length is used, transmission efficiency may decline. Thus, the longer CP is used in multicast.

As illustrated in FIG. 14, the CP selection unit 117 may associate the synchronization channel code number with the CP length for storage. The CP selection unit 117 selects the CP length based on the association.

Also, as illustrated in FIG. 15, the CP selection unit 117 may associate the synchronization channel code number with the scramble code group number and the CP length and store the association. FIG. 15 illustrates two types of the CP length.

Also, the CP selection unit 117 may associate the synchronization channel number with the scramble code group number for storage as illustrated in FIG. 16, for example.

In this embodiment, two types of CPs having different CP lengths will be described.

As mentioned above, the longer CP is used in the case of multicast where similar signals are transmitted from multiple base stations. According to this configuration, it is possible to absorb transmission delay from the base stations.

The shorter CP is used in communications, such as unicast, other than multicast.

The CP addition unit 114 adds a CP selected by the CP selection unit 117 to a multicarrier signal supplied from IFFT.

Figure 17A:
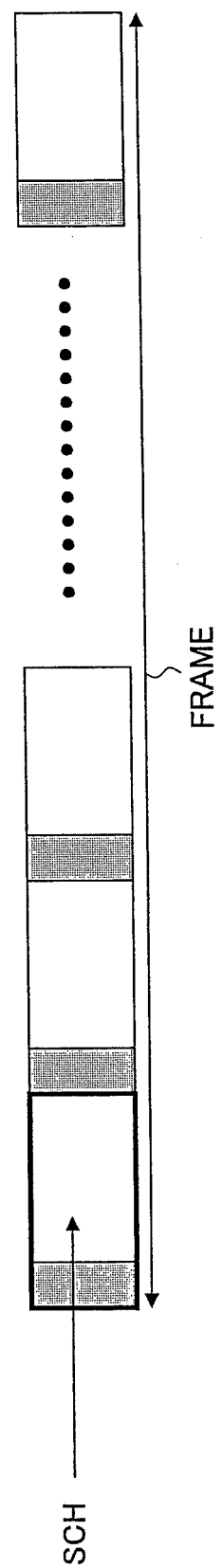
FIG. 17A is a schematic diagram illustrating an exemplary arrangement of a synchronization channel.

For example, as illustrated in FIGS. 17A and 17B, the CP addition unit 114 adds a CP in such a manner that a synchronization channel can be added to the head or end of a frame. FIG. 17A illustrates an example of a shorter CP, that is, the case where a frame includes a relatively large number of OFDM symbols. On the other hand, FIG. 17B illustrates an example of a longer CP, that is, the case where a frame includes a relatively small number of OFDM symbols. In the case of different CP lengths being used in the same system, if the interval between subcarriers is kept constant, a frame could include a different number of OFDM symbols, and thus the position of the synchronization channel relative to frame boundary may fluctuate. Since the CP is added in such a manner that the synchronization channel can be arranged at the head or end of the frame according to this embodiment, the position of the frame boundary relative to the position of the synchronization channel can be fixed independently of the CP length. As a result, the frame boundary (frame timing) can be easily fulfilled in the receiver 20.

An exemplary receiver 20 according to this embodiment will be described with reference FIG. 18A.

The receiver 20 according to this embodiment includes a scramble code reception timing detection circuit 200.

The scramble code reception timing detection circuit 200 receives a multicarrier signal from an antenna and detects scramble code reception timing and FFT timing.

Specifically, the scramble code reception timing detection circuit 200 supplies the received multicarrier signal to a correlator 201. On the other hand, a synchronization signal replica generator 202 generates a predefined synchronization signal replica and supplies it to the correlator 201 sequentially. The correlator 201 detects correlation between the received multicarrier signal and the synchronization signal replica, and the detected correlation value indicative of each peak and the associated timing are stored in a memory 203. A timing detection circuit 204 selects the maximum correlation value and the associated timing from correlation values and the associated timings stored in the memory 203, and stores them as scramble code reception timing in a memory 205. The timing detection circuit 204 further computes FFT timing based on the scramble code reception timing and stores it in the memory 205. The FFT timing is supplied from the memory 205 to a CP removal circuit, and the scramble code reception timing is supplied to a scramble code identification circuit and a demodulation circuit.

For example, if a waveform generated by code inverting and repeating a fundamental waveform having good autocorrelation characteristics is used as the P-SCH signal waveform, the receiver 20 is configured as illustrated in FIG. 1B.

Figure 18A:
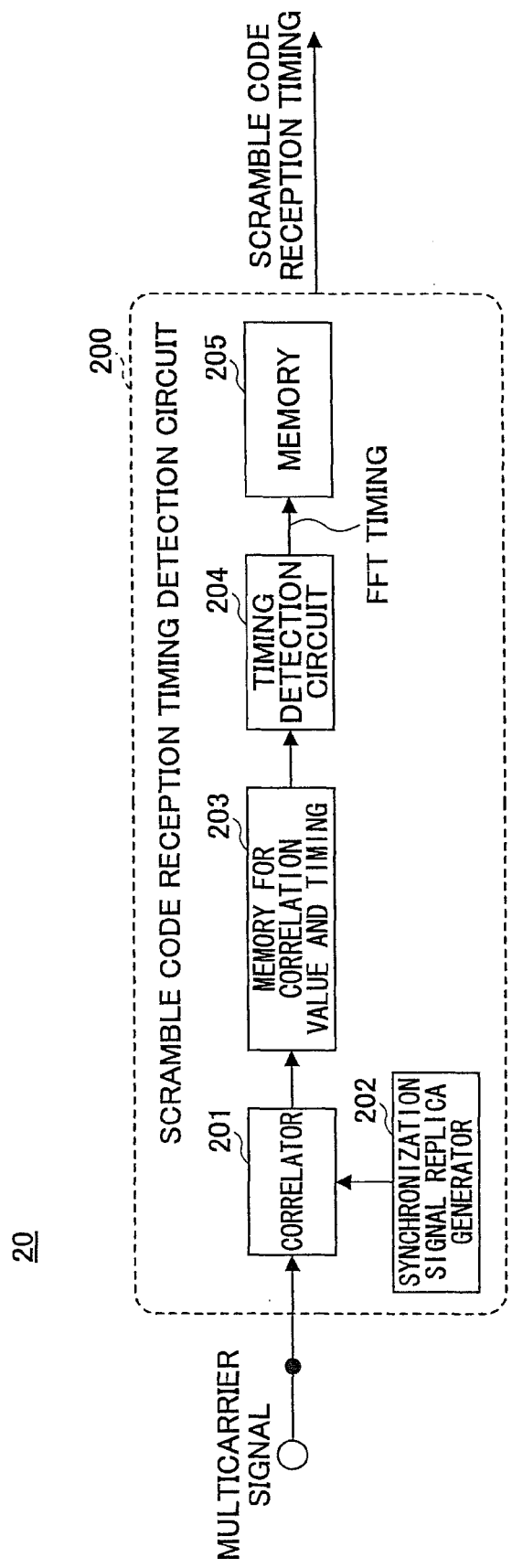
FIG. 18A is a block diagram illustrating a receiver according to one embodiment of the present invention.
Figure 18B:
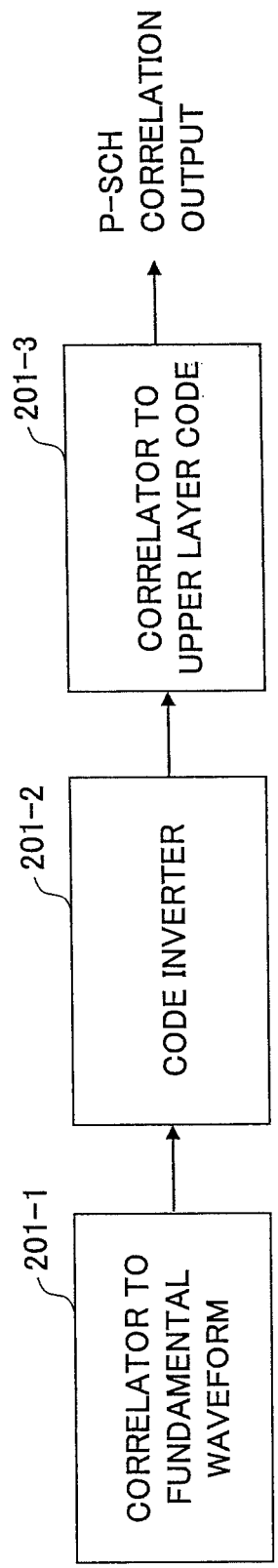
FIG. 18B is a block diagram illustrating a receiver according to one embodiment of the present invention.

In other words, the correlator 201 of the receiver 20 described with reference to FIG. 18A is configured to have a correlator 201-1 for the fundamental waveform, a code inverter 201-2 where an output signal of the correlator 201-1 is supplied, and a correlator 201-3 for an upper layer code where an output signal of the code inverter 201-2 is supplied.

The correlator 201-1 detects correlation between a multicarrier signal and the fundamental waveform. In this embodiment, the code length is set to be L/N. The code inverter 201-2 inverts an output of the correlator 201-1. The correlator 201-3 detects correlation between an output of the code inverter 201-2 and an upper layer code, and supplies a P-SCH correlation value to the memory 203. In this embodiment, the code length is set to be N. According to these settings, a long correlation value for the code length L can be omitted.

An exemplary operation of the correlator 201 will be described with reference to FIGS. 19A, 19B, 19C and 20.

The correlator 201 detects correlation between a synchronization channel replica having the minimum CP length and a received signal. In this manner, frame timing can be detected through a single type of search scheme.

Figure 19A:
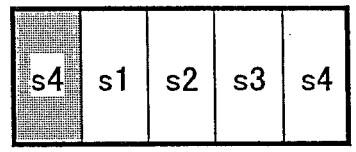
FIG. 19A is a schematic diagram illustrating exemplary frame timing detection.

For example, as illustrated in FIG. 19A, the correlator 201 establishes a synchronization channel replica including effective symbols S1, S2, S3 and S4 with S4 serving as CP as the synchronization channel used in the receiver 20 for computing correlation. For example, SCH having a smaller CP length is used. In other words, the S4 portion is copied as CP. The synchronization channel replica includes the CP having the minimum CP length.

Figure 19B:
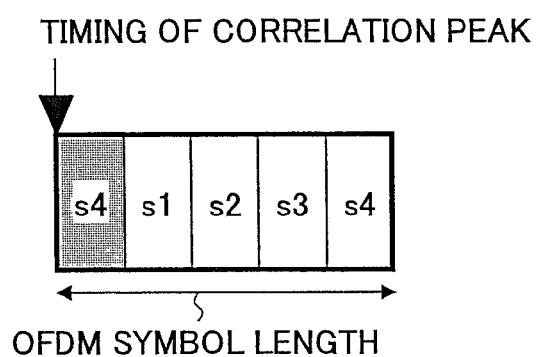
FIG. 19B is a schematic diagram illustrating exemplary frame timing detection.
Figure 19C:
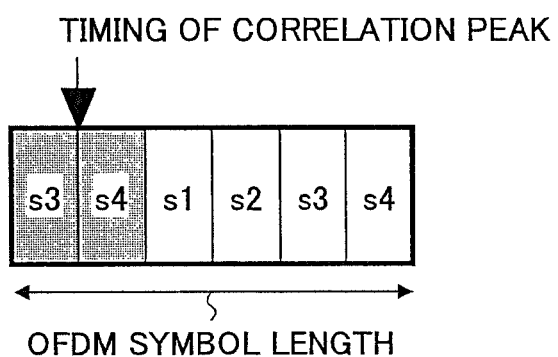
FIG. 19C is a schematic diagram illustrating exemplary frame timing detection.

In this embodiment, if a signal including a CP having a relatively small CP length is transmitted from the transmitter 10, the correlation peak may be detected at the S4 portion (FIG. 19B). On the other hand, if a signal including a CP having a relatively large CP length is transmitted from the transmitter 10, the correlation peak is also detected at the S4 portion (FIG. 19C).

In either the case of the signal including the shorter CP being transmitted from the transmitter 10 or the case of the signal including the longer CP being transmitted from the transmitter 10, the correlation peak is detected at the S4 portion. Since the signal length of the synchronization channel replica is known, the end of an OFDM symbol can be found, and thus detection timing of the correlation can be also found.

Also, if the synchronization channel is arranged at the end of a frame, the frame boundary can be easily detected.

Figure 20:
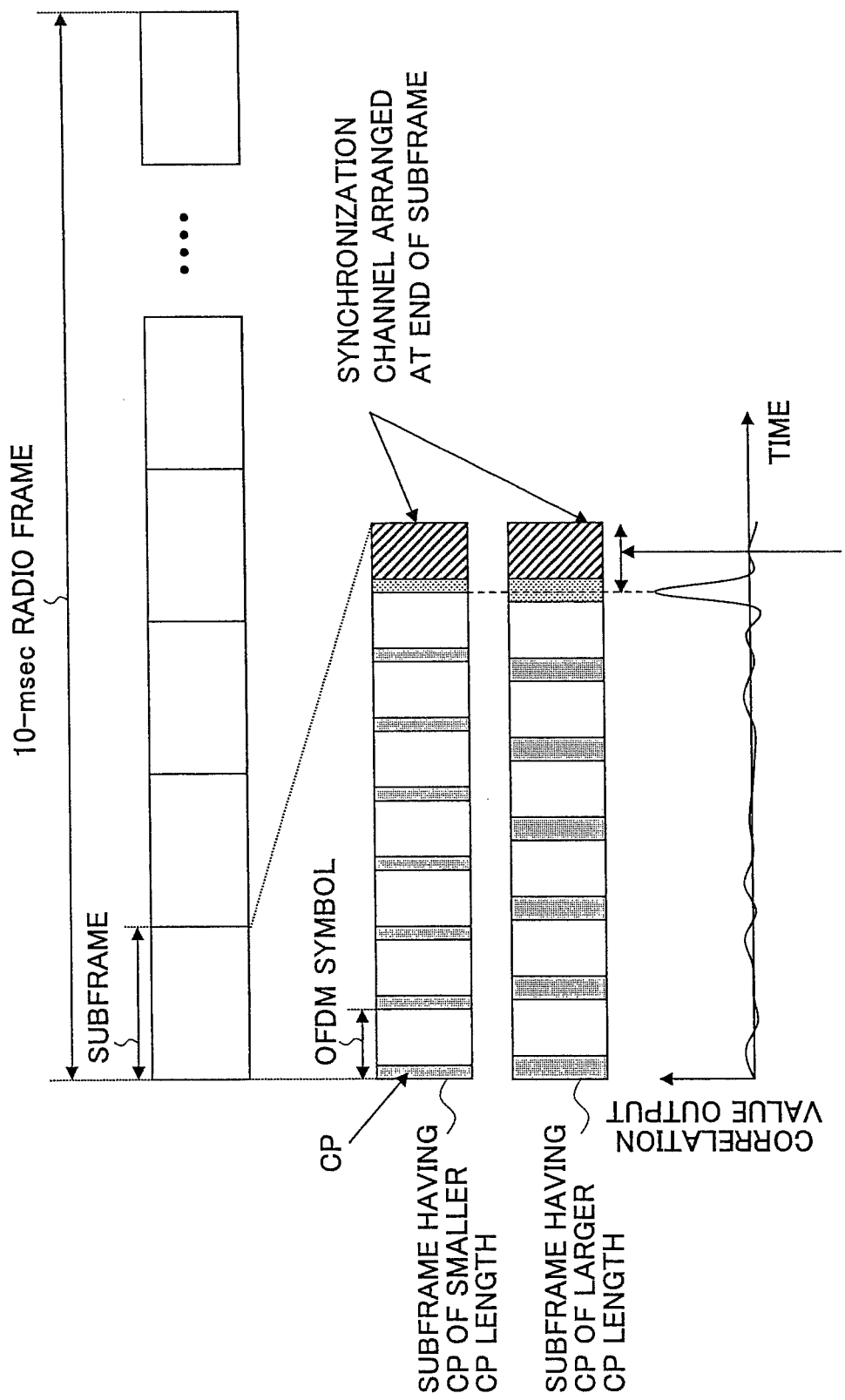
FIG. 20 is a schematic diagram illustrating an exemplary configuration of a synchronization channel.

Alternatively, in multiple subframes resulting from division of a single frame, the synchronization channel may be arranged at the end of a subframe, that is, at the last OFDM symbol of the subframe as illustrated in FIG. 20. An OFDM symbol and a guard interval are provided within a subframe. The guard interval (cyclic prefix) having different lengths such as two different lengths is defined. The length may be different for the respective subframes. For example, the length of the guard interval may be determined depending on a transmission scheme such as unicast or multicast.

In this case, two types of subframes can exist in terms of the number of symbols. For example, one is a multicast subframe and the other is a unicast subframe. In other words, the number of symbols within the respective subframes may be variable. The effective symbol length and the short guard interval are common.

The primary synchronization channel is arranged at the end of a subframe, and correlation between a symbol of the primary synchronization channel having a smaller CP length and a received signal is computed in a mobile station. At this time, in any case of subframes for larger CP length and smaller CP length, the correlation peak is observed at a timing preceding the end of the subframe by the length of the primary synchronization channel having the smaller CP length. In other words, the total length of the effective data symbol length plus the relatively small CP length is uniform for a subframe including the shorter CP and for a subframe including the longer CP, and thus, a terminal can detect carrier frequency and synchronization timing without consideration of the CP length. Thus, since transmission timing (position) of the synchronization channel is unchanged, a mobile station can compute correlation values even without the CP length information, search for the synchronization channel and identify frame timing without consideration of the CP length for use in the subframe, that is, independently of the CP length. Also, averaging of correlation values between frames can be fulfilled without consideration of the CP length. Also, the transmission timing (position) of the synchronization channel remains unchanged in averaging over multiple subframes, which may facilitate the averaging.

Alternately, if the synchronization channel is not arranged at the end of a subframe, the correlation may be detected by envisaging timing corresponding to the larger CP length and timing corresponding to the smaller CP length.

Also, if the synchronization channel is not arranged at the end of a subframe, the CP length may be reported. For example, the CP length may be specified for each frame in advance. Information related to the CP length of CP for use in the synchronization channel may be stored.

Similarly, a common pilot may be arranged at the end of a subframe.

Also, certain subframes defined in a system, such as the first subframe, are always used in unicast. In other words, the first subframe is not used in multicast.

Since subframes for multicast include a scramble code common to different cells for enabling soft-combining, a common pilot for subframes for multicast cannot be used for scramble code detection in cell search.

For this reason, the first subframe is always used for unicast (multiplied with a cell specific scramble code) in order to overcome the above-mentioned problem, and thus, the common pilot can be used to detect the scramble code in the cell search.

Also, since cell specific system information is broadcast in BCH and is transmitted in unicast, radio frames can be efficiently configured by arranging to have the first subframe dedicated to the unicast.

Figure 21:
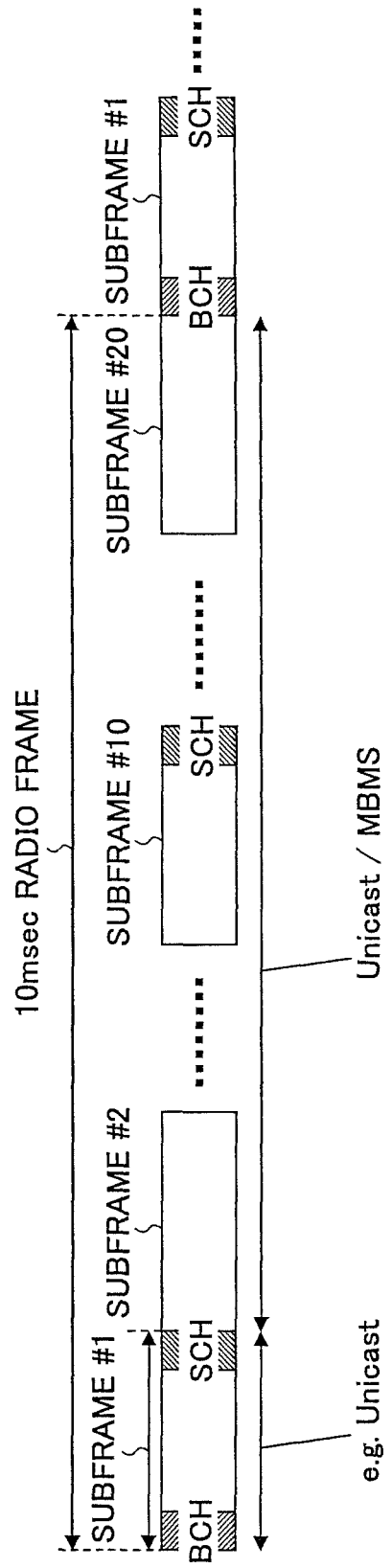
FIG. 21 is a schematic diagram illustrating an exemplary configuration of a subframe.

An example where two synchronization channels are transmitted for each 10 ms radio frame will be described with reference to FIG. 21. The first subframe is always used for unicast, and a pilot multiplied with a cell specific scramble code is used. Subsequent subframes can be used for unicast or MBMS (Multimedia Broadcast Multimedia Services). A pilot multiplied with a cell specific scramble code and a short CP are applied in the unicast, whereas a pilot multiplied with a cell common scramble code and a long CP are applied in the multicast.

Also, BCH is arranged in a certain amount of time after the synchronization channel Thus, immediately after a mobile station uses the synchronization channel to conduct cell search, the mobile station can receive the BCH, and it takes less time to complete the reception of the BCH.

An example where a cell ID is detected in a reference signal having different CP lengths will be described.

In this example, a system may define the CP length of a certain subframe.

For example, it may be stipulated that the first subframe in a frame always uses a long CP or a short CP. In cell search, the reference signal for this subframe is used to detect cell IDs. Also, the reference signal may be used to detect other information such as sector IDs as well as the cell IDs.

In this case, the CP length for each subframe within a frame is reported in S-SCH. For example, the CP length for all subframes may be reported. In this configuration, although a larger amount of information is reported in S-SCH, references for all subframes can be used in the cell search, resulting in faster detection of the cell IDs.

In addition, the CP length for only some subframes may be reported in S-SCH. Since so many subframes do not have to be used in cell search, only an essential amount of information is reported in S-SCH. A mobile station uses only a reference signal for reported subframes.

Also, the CP length for each subframe for use in a system may have an arbitrary value, and thus a mobile station may detect the CP length blindly. In this case, the mobile station detects a reference signal corresponding to both CP lengths and uses the larger correlation value.

An exemplary bandwidth of a reference signal will be described.

Although SCH is transmitted in a fixed bandwidth of 1.25 MHz, the bandwidth of the reference signal is not known at the cell search stage. The bandwidth of the reference signal may be determined in a scheme as presented below.

(1) The bandwidth of a reference signal is reported in S-SCH. According to this configuration, although an increased amount of information is reported in S-SCH, the overall bandwidth of the reference signal can be used, which may achieve fast cell search.

(2) A reference signal of the same bandwidth as the BCH bandwidth reported in S-SCH is used. In the case of the BCH bandwidth being reported in S-SCH, since the reference signal is transmitted in a bandwidth at least greater than or equal to the BCH bandwidth, the reference signal of the same bandwidth as BCH is used in cell search. According to this configuration, the reference signal of a wider bandwidth can be used without increase in the amount of information reported in S-SCH.

Figure 22:
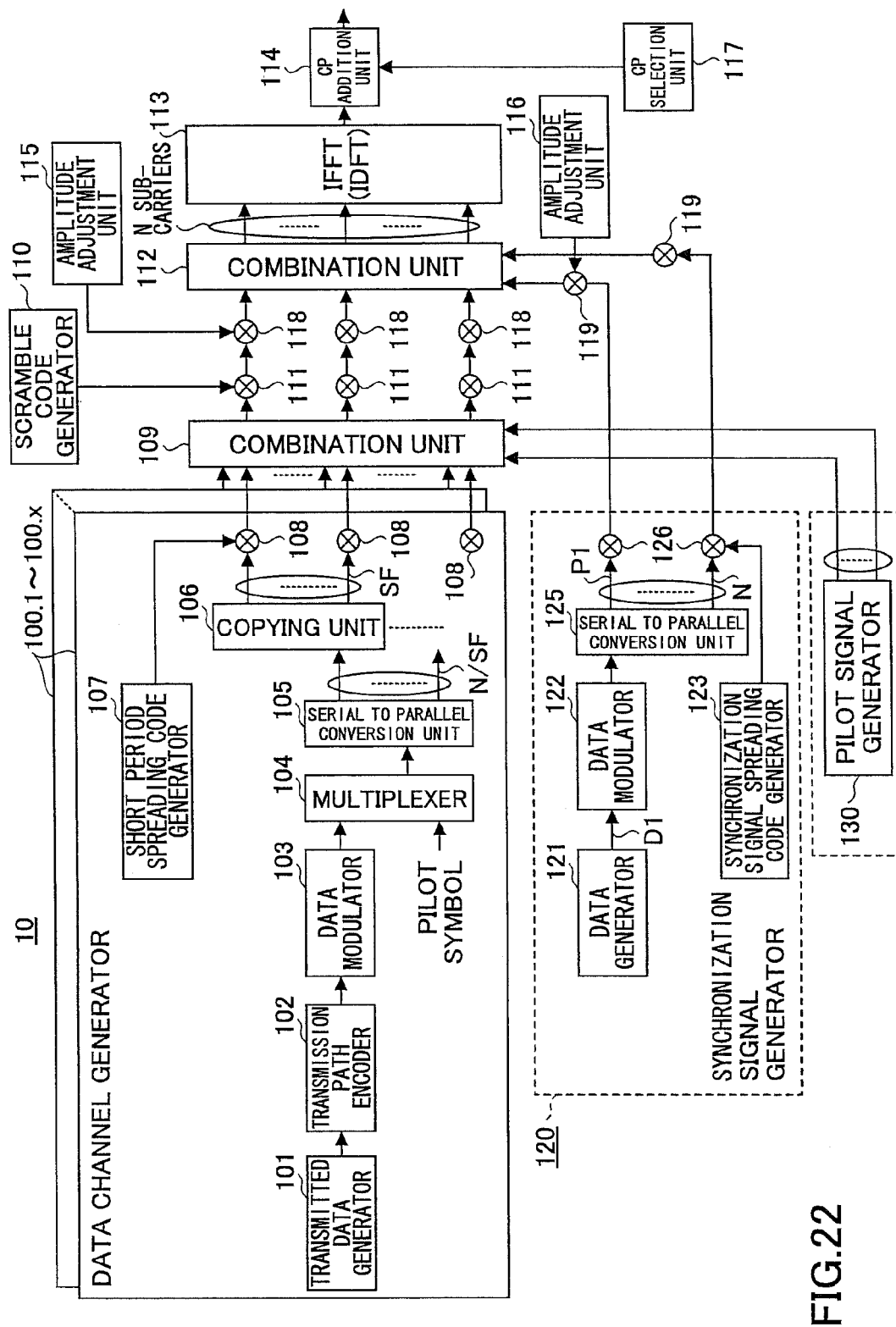
FIG. 22 is a block diagram illustrating a transmitter according to one embodiment of the present invention.

An exemplary configuration of the transmitter 10 in the case of a common pilot being arranged at the end of a subframe will be described. As illustrated in FIG. 22, the transmitter 10 includes a pilot signal generator 130 coupled to the combination unit 109 as illustrated in FIG. 22.

In FIG. 22, in the case of OFDM being applied, a portion relating to spreading of OFCDM is removed. Specifically, the data channel generators 100.2-100.x, the copying unit 106, the short period spreading code generator 107, the multiplier 108 and the combination unit 109 are omitted. Also, N information symbols are supplied from the serial to parallel conversion unit 105. In other words, the N information symbols supplied from the serial to parallel conversion unit 105 are multiplied with a scramble code in the multiplier 111.

Also, when the synchronization channel is transmitted from the transmitter 10 to the receiver 20, information related to the attached CP length must be reported. For example, the information is reported in a control channel In this case, the information related to the attached CP length must be reported to the control channel The control channel may be recognized by the receiver 20 by setting attachment of a longer CP in advance.

Also, the transmitter 10 may report information related to the attached CP length in the control channel for the previous frame. Alternatively, the information may be recognized in the receiver 20 by detecting correlation in a lower layer.

Also, although the receiver 20 computes correlation between a received signal and a synchronization timing replica in order to compute the correlation, real number (complex number) based computation is basically required.

Figure 23:
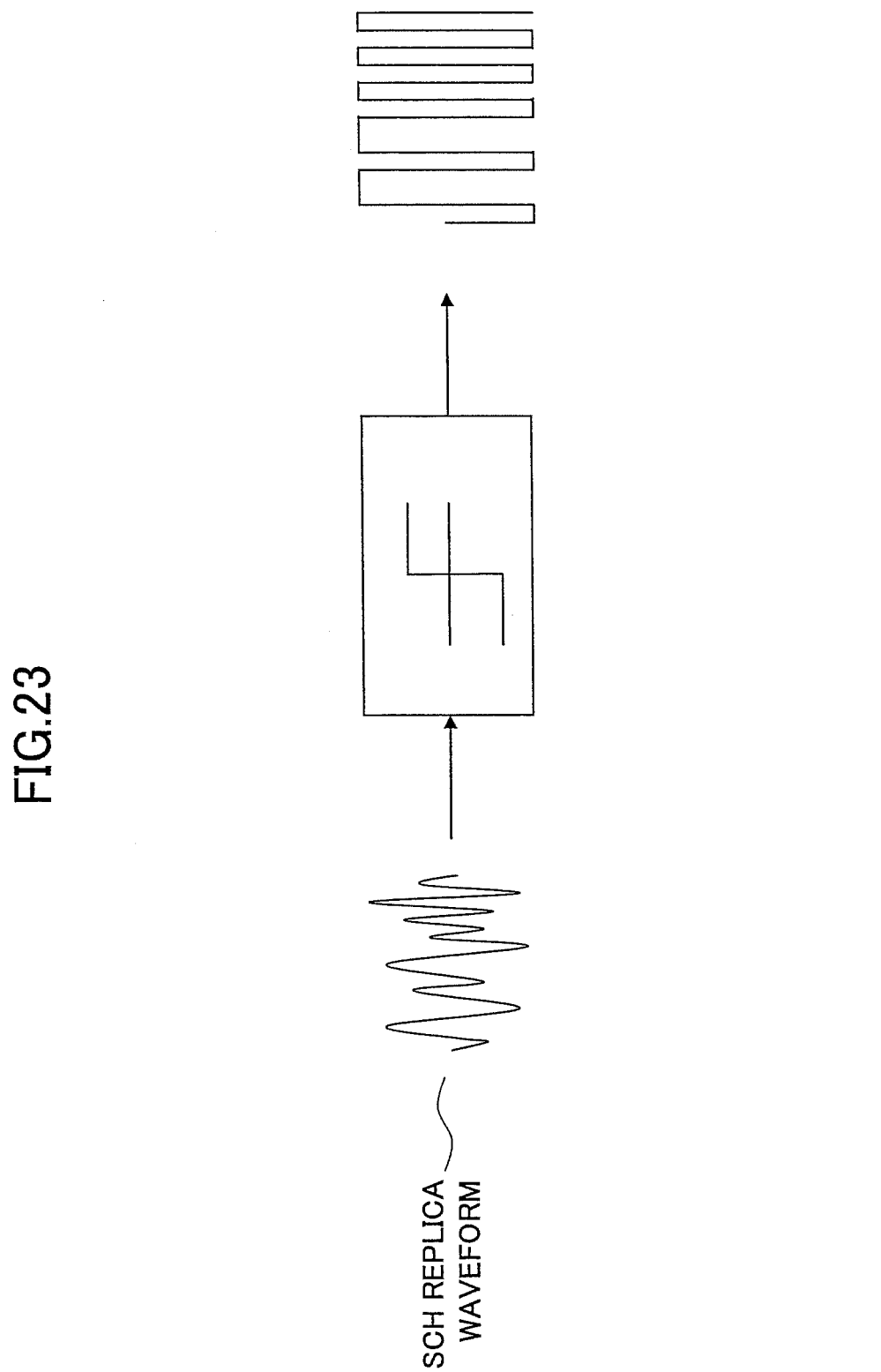
FIG. 23 is a schematic diagram illustrating an exemplary correlation computation scheme.

In this case, the correlator 201 approximates the synchronization channel replica to some integers such as .+−.1 as illustrated in FIG. 23. According to this configuration, the receiver 20 can fulfill this correlation operation through addition and/or subtraction of received sample signals. Also, the correlator 201 envisages the correlation operation and renders a temporal waveform of a synchronization channel signal approximated to some integers such as .+−.1. For example, a receiver of a mobile station computes correlation between this signal and a received signal. In this case, the correlation computation can be implemented through addition and/or subtraction. According to this configuration, it is possible to reduce an amount of computation and an amount of consumed power in the receiver 20.

An exemplary receiver for some operation in a frequency range will be described with reference to FIG. 24.

A receiver 30 includes, a FFT unit 302 receiving input signals, a demultiplexer 304 coupled to the FFT unit 302, a channel estimation unit 306 coupled to the demultiplexer 304, a demodulation unit 308 coupled to the demultiplexer 304 and the channel estimation unit 306, a secondary synchronization channel correlation unit 310 coupled to the demodulation unit 308, and a peak detection unit 312 coupled to the secondary channel correlation unit 310.

The FFT unit 302 receives FFT timing detected by a FFT timing detection unit in a primary synchronization channel.

The FFT unit 302 performs some FFT operations and supplies the operational result to the demultiplexer 304.

The demultiplexer 304 distributes the multiplexed signal in a primary synchronization channel (P-SCH) and a secondary synchronization channel (S-SCH).

For example, if P-SCH and S-SCH are multiplexed in accordance with FDM, the channel estimation unit 306 conducts channel estimation by using N P-SCHs located in both sides of a S-SCH subcarrier detected in S-SCH synchronization detection as a reference (pilot). In this case, a code of P-SCH is known.

The greater N is, the greater the suppression effect on noise interference is. However, if N is set to have too great a value, some influence of frequency selective fading may arise. Thus, N may be set to be in the range between 1 and 3. Also, as the distance from the detected S-SCH subcarrier is greater, a smaller weight may be used.

For example, in detection of s2 as illustrated 24B, p2 and p3 may be used for channel estimation. In addition, p1 and p4 may be used together with p2 and p3 for channel estimation. From this viewpoint, it is desirable for the channel estimation to use a low amplitude code such as a CAZAC code for P-SCH.

Also, for example, if P-SCH and S-SCH are multiplexed in accordance with TDM, the channel estimation unit 306 may conduct the channel estimation by using N P-SCHs located on the same subcarrier as and in both sides of a detected S-SCH as a reference (pilot). In this case, the code of P-SCH is known.

The greater N is, the greater the suppression effect on noise interference is. However, if N is set to have a too great a value, some influence of frequency selective fading may arise. Thus, N may be set to be in the range between 1 and 6. Also, as the distance from the detected S-SCH subcarrier is greater, a small weight may be multiplied.

Figure 24A:
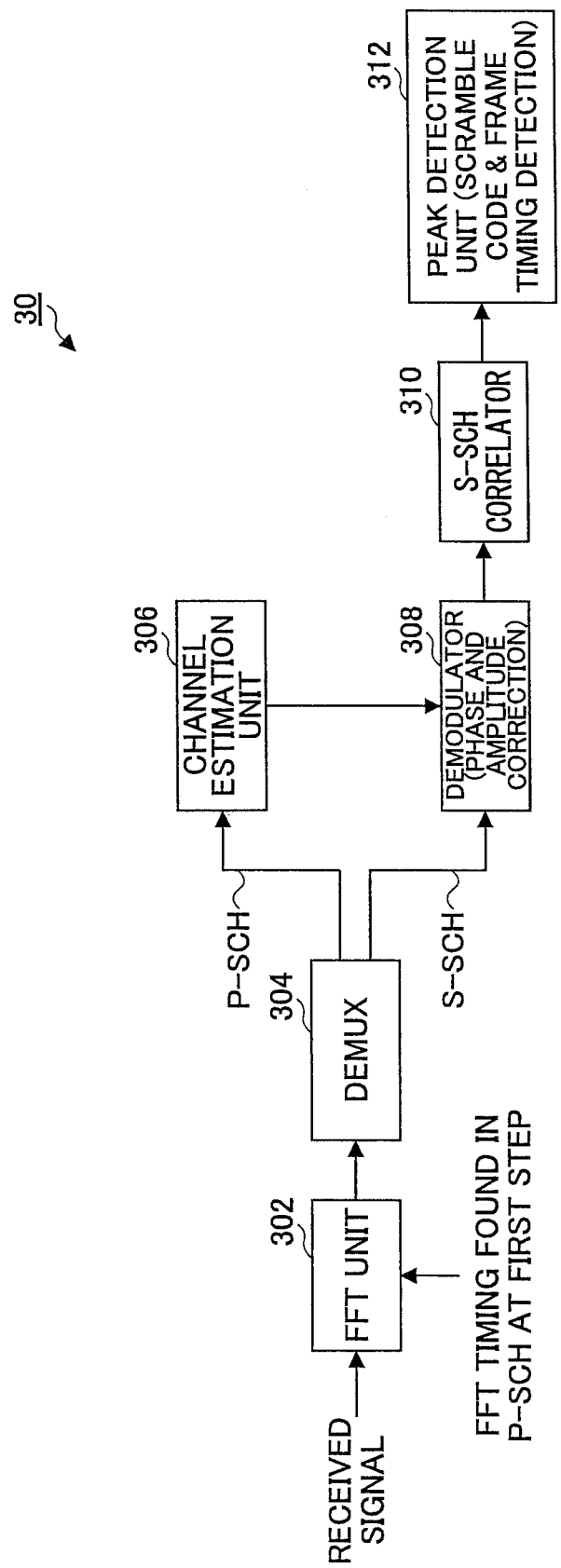
FIG. 24A is a block diagram illustrating a receiver according to one embodiment of the present invention.
Figure 24B:
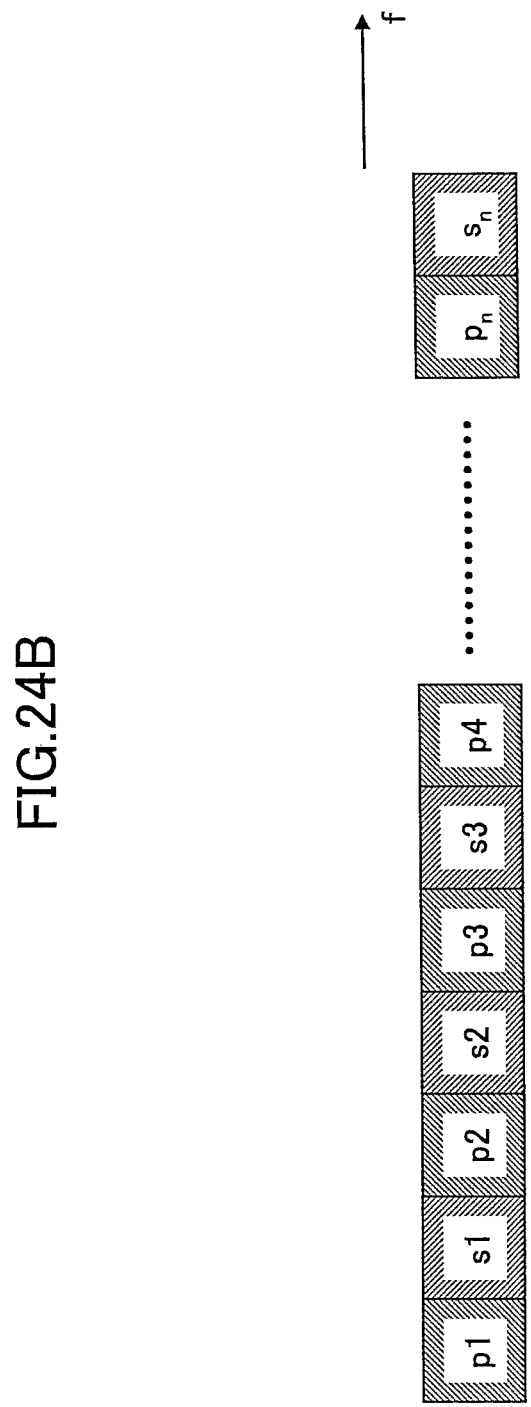
FIG. 24B is a schematic diagram illustrating exemplary synchronization detection in S-SCH detection in a receiver according to one embodiment of the present invention.

For example, if s4 is detected as illustrated in FIG. 24C, p4 is used for channel estimation. Also, p3 and p5 may be additionally used for the channel estimation.

Also, for example, if P-SCH and S-SCH are multiplexed in accordance with CDM, the channel estimation unit 306 may conduct channel estimation by using N P-SCHs located on the same subcarrier as and in both sides of a detected S-SCH as a reference (pilot). In this case, the code of P-SCH is known.

The greater N is, the greater the suppression effect on noise interference is. However, if N is set to have too great a value, some influence of frequency selective fading may arise. Thus, N may be set to be in the range between 1 and 6. Also, as the distance from the detected S-SCH subcarrier is greater, a small weight may be used.

Figure 24D:
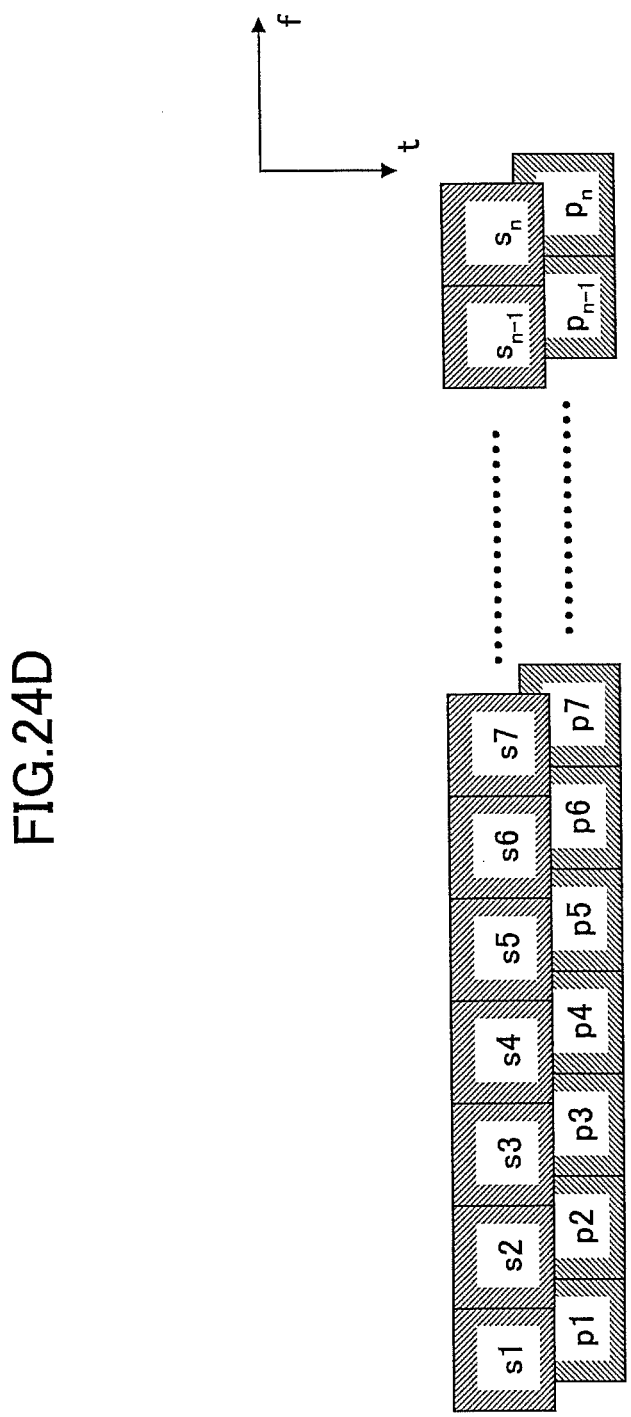
FIG. 24D is a schematic diagram illustrating exemplary synchronization detection in S-SCH detection in a receiver according to one embodiment of the present invention.

For example, if s4 is detected as illustrated in FIG. 24D, p4 is used for channel estimation. Also, p3 and p5 may be additionally used for the channel estimation.

The primary synchronization channel is supplied to the channel estimation unit 306, and the secondary synchronization channel is supplied to the demodulation unit 308.

The channel estimation unit 306 conducts the channel estimation, and the operation result is supplied to the demodulation unit 308.

The demodulation unit 308 conducts some demodulation operations. In this embodiment, phase and amplitude compensations are carried out. For example, the demodulation unit 308 may conduct demodulation by using the primary synchronization channel for subcarriers adjacent in both sides to a subcarrier for the demodulated secondary synchronization channel within a range where fading may have sight influence.

The secondary synchronization channel correlation unit 310 detects correlation of the secondary synchronization channel.

The peak detection unit 312 detects control information such as scramble codes and frame timing for peak detection.

An exemplary averaging operation of the primary synchronization channel in the frequency direction in correlation of the secondary synchronization channel will be described.

Figure 25A:
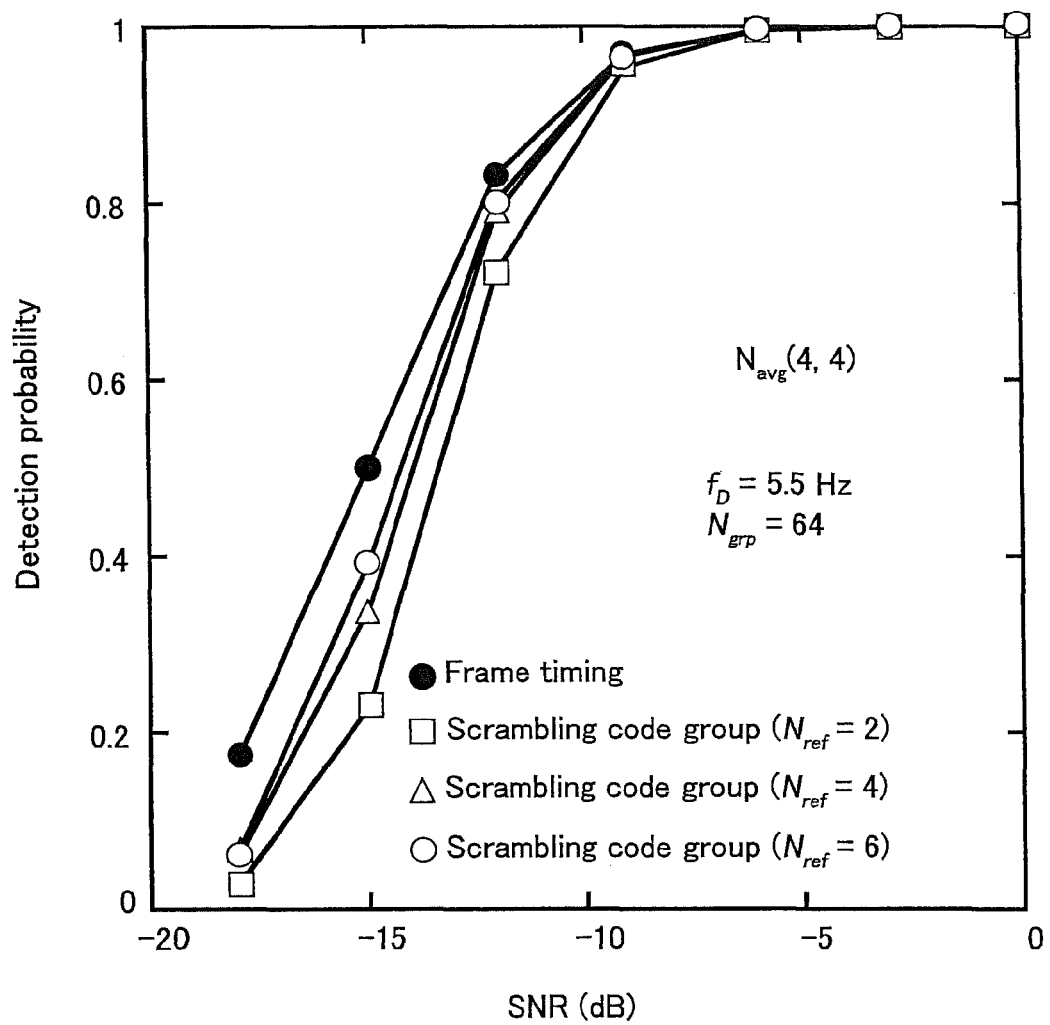
FIG. 25A is a schematic diagram illustrating exemplary relationships between SNRs and detection probability for averages of the secondary synchronization channel.

FIG. 25A shows exemplary relationships between SNR and detection probability in walking speed.

In FIG. 25A, the horizontal and vertical axes represent SNR and detection probability, respectively. Nref represents the number of subcarriers in the primary synchronization channel.

In FIG. 25A, for fD=5.55 Hz, Nref=2 indicates a both sides 1 subcarrier, Nref=4 indicates a both sides 2 subcarrier, and Nref=6 indicates a both sides 3 subcarrier.

As observed in FIG. 25A, as a greater number of subcarriers are used, the detection probability is improved. However, as a greater number of subcarriers are used, fading may have greater influence.

Figure 25B:
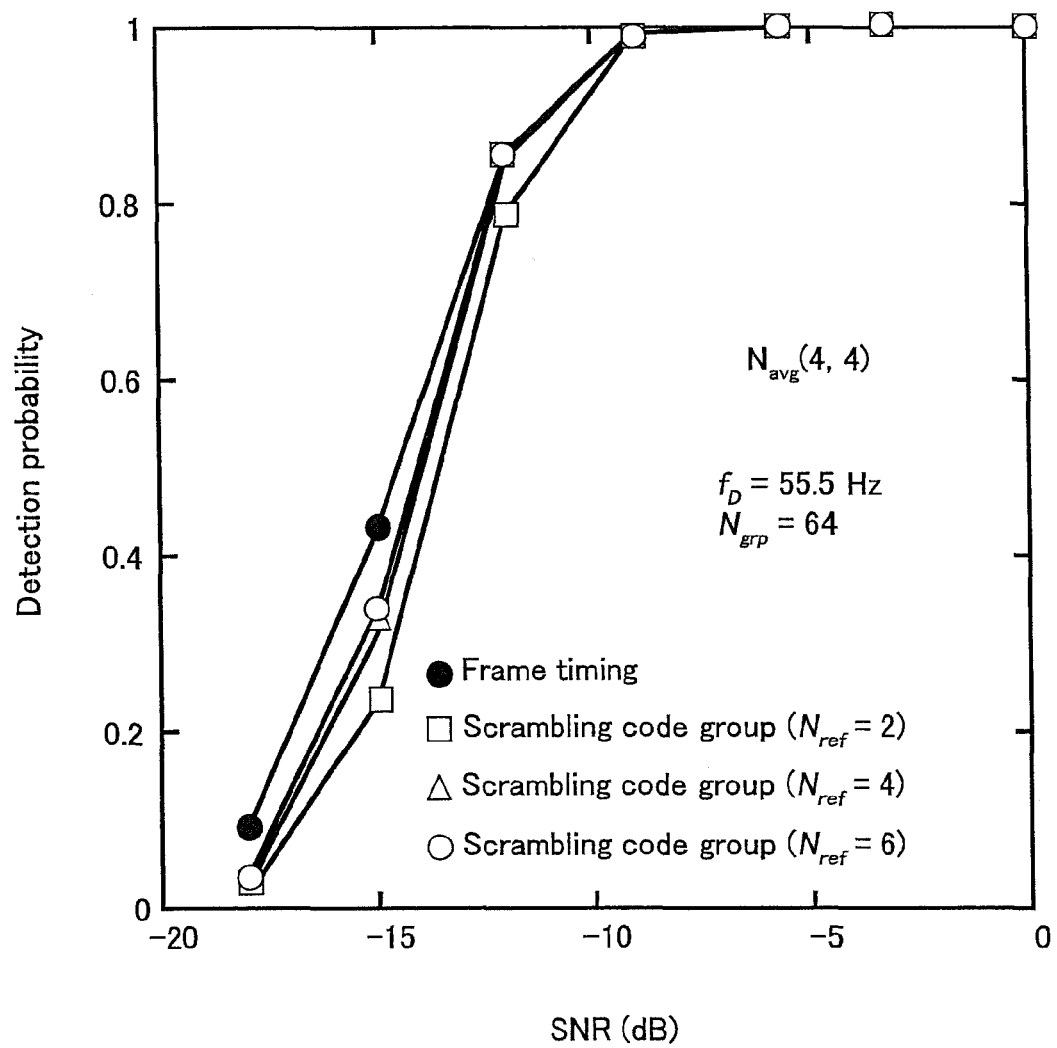
FIG. 25B is a schematic diagram illustrating exemplary relationships between SNRs and detection probability for averages of the secondary synchronization channel.

FIG. 25B shows an exemplary relationship between SNR and detection probability in drive speed of an automobile.

In FIG. 25B, the horizontal and vertical axes represent SNR and detection probability, respectively. Nref represents the number of subcarriers in the primary synchronization channel.

In FIG. 25B, for fD=5.55 Hz, Nref=2 indicates a both sides 1 subcarrier, Nref=4 indicates a both sides 2 subcarrier, and Nref=6 indicates a both sides 3 subcarrier.

As observed in FIG. 25B, as a greater number of subcarriers are used, the detection probability is improved. However, as a greater number of subcarriers are used, fading may have greater influence.

An exemplary receiver 20 for detecting timing based on autocorrelation and compensating frequency offset will be described with reference to FIG. 26.

The receiver 20 according to this embodiment includes a scramble code reception timing detection circuit 200.

The scramble code reception timing detection circuit 200 receives a multicarrier signal from an antenna, and detects scramble code reception timing and FFT timing.

Specifically, the scramble code reception timing detection circuit 200 delays the multicarrier signal transmitted at a repetition period T via an antenna by an amount of time T in a delay addition unit 206, adds the delayed signal to the underlying multicarrier signal in an adder 207, performs integration on the resulting signal in terms of the repetition time T in an integrator 208, and supplies the resulting signal to the peak detection unit 209. The peak detection unit 209 detects timing based on the supplied signal. According to this configuration, it is possible to compensate for frequency offset and detect timing based on autocorrelation.

In addition, the transmitter 10 may transmit the synchronization channel (SCH) by applying transmission diversity.

For example, the synchronization channel may be transmitted by using transmit diversity suitable for SCH based cell search. Since a control loop between a base station and a mobile station has not been established unlike transmission and reception of normal data channels, open-loop type transmit diversity is used in the cell search. Also, since the receiver 20 detects correlation in the cell search, switched type transmit diversity or delay diversity may be suitable. For example, any of TSTD (Time Switched Transmit Diversity), FSTD (Frequency Switched Transmit Diversity) and CDD (Cyclic Delay Diversity) is applicable as the transmit diversity.

Also, the synchronization channel may be transmitted from a certain one of multiple antennas in MIMO transmission. Also, the synchronization channel may be transmitted in TSTD. Also, the synchronization channel may be transmitted synchronously in order to obtain delay diversity. For example, if a transmitter having four antennas is used, the synchronization channel may be transmitted from all the four transmission antennas at the power level of ¼. Also in this case, the synchronization channel may be transmitted at different transmission timings. In this configuration, greater path diversity effect can be obtained in the receiver.

Also, if multiple antennas are provided, SCH and CPICH may be transmitted via only two antennas. Alternatively, SCH may be transmitted via all the antennas whereas CPICH may be transmitted via only two antennas.

If CPICH is transmitted via four antennas, for example, CPICH may be transmitted in such a manner that it can be orthogonal on the frequency axis. In the receiver, channel estimation is conducted based on a transmitted common pilot signal, and a control channel is demodulated. In the case of CPICH being transmitted via four antennas, the common pilot signal for a portion distant on the frequency axis must be used, and the channel estimation accuracy may be degraded. Thus, it is desirable that the interval between the pilots be smaller on the frequency axis. To do so, CPICH may be transmitted from two antennas. According to this configuration, since only two CPICHs have to be orthogonally multiplexed, higher orthogonality can be achieved. As a result, it is possible to improve accuracy of the channel estimation and others using CPICH and enhance reception quality of L1/L2 control channels and others.

In this case, a mobile station may conduct some operation on the assumption that CPICH may be transmitted from only two antennas in maximum in cell search. As a result, it is possible to simplify the reception operation as well as radio interfaces.

FIG. 27A shows an exemplary configuration of the synchronization channel and the common pilot channel in the case of four transmission antennas. In this illustration, the synchronization channel is transmitted from the four transmission antennas, and the common pilot channel is transmitted from only two of the transmission antennas.

An exemplary combination of two antennas for transmitting SCH and CPICH in the case of four transmission antennas will be described.

Figure 27B:
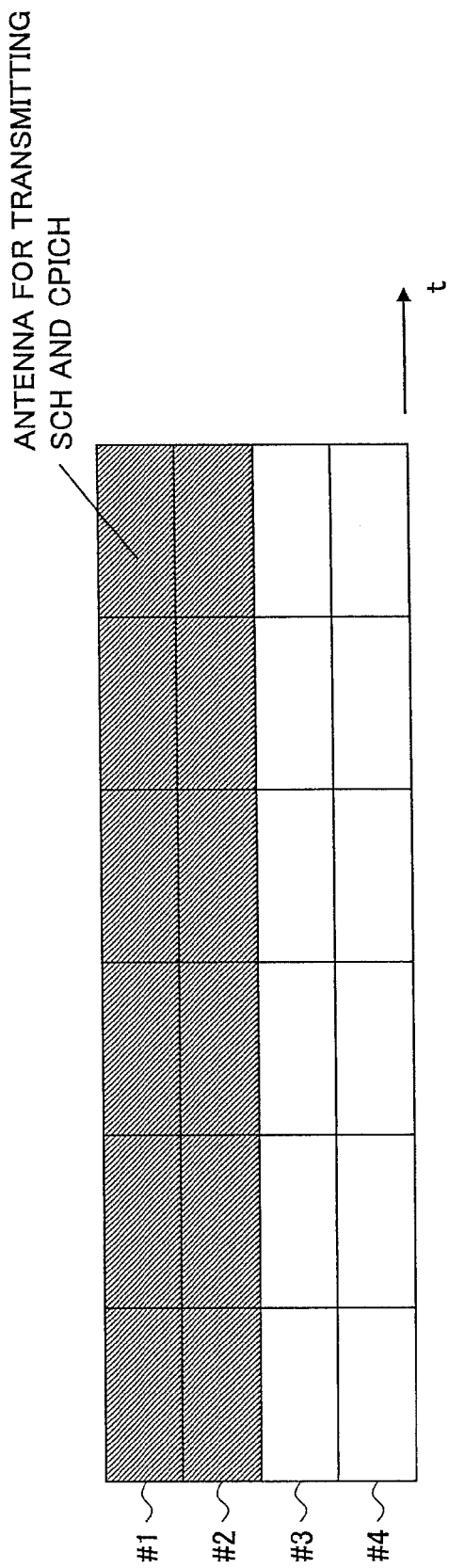
FIG. 27B is a schematic diagram illustrating an exemplary SCH transmission scheme for multiple transmission antennas according to one embodiment of the present invention.

The two antennas for transmitting SCH and CPICH may be fixed. For example, if transmission antennas #1-#4 are provided as illustrated in FIG. 27B, the antennas #1 and #2 always serve to transmit SCH and CPICH. In FIG. 27B, the vertical and horizontal axes represent the transmission antennas and time, respectively.

Also, the two antennas for transmitting SCH and CPICH may be defined in advance in the system. In this case, it is possible to simplify the transmission and reception operation.

Also, the combination of two antennas for transmitting SCH and CPICH may be variable over time. In other words, a number of combinations of two antennas for transmitting SCH and CPICH may be predefined, and then the combinations may be switched over time.

Figure 27C:
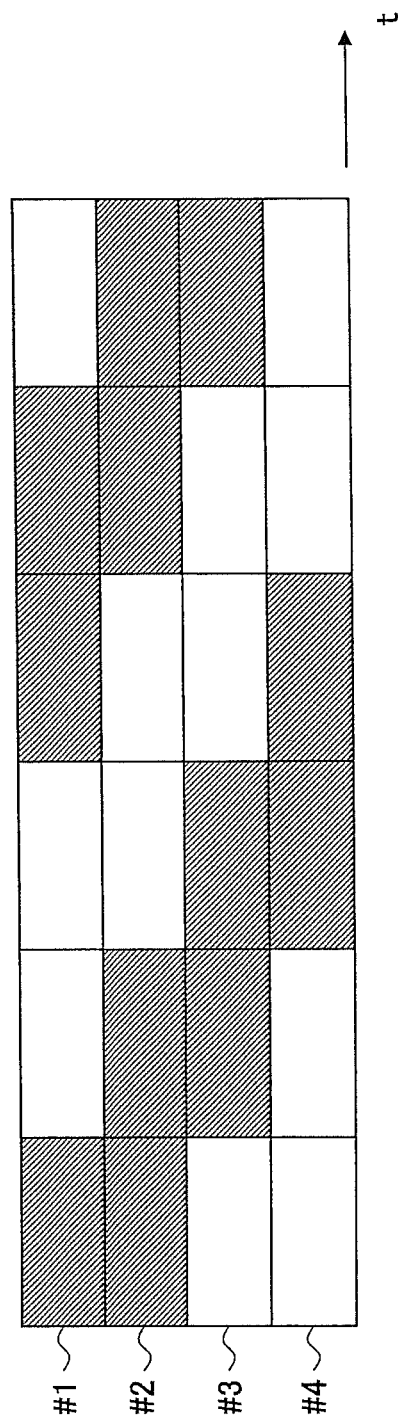
FIG. 27C is a schematic diagram illustrating an exemplary SCH transmission scheme for multiple transmission antennas according to one embodiment of the present invention.

For example, if the transmission antennas #1-#4 are provided as illustrated in FIG. 27C, the antennas #1 and #2 are used at the time point 4$n$ ($n$ is a natural number), the antennas #2 and #3 are used at the time point 4n+1, the antennas #3 and #4 are used at the time point 4n+2, and the antennas #4 and #1 are used at the time point 4n+3. In this case, the system may predefine how to switch the combination pattern. In this configuration, although the transmission and reception operations may be slightly complicated, a diversity effect (randomization) can be obtained.

Also, transmit diversity may be applied to SCH transmitted from two antennas. According to this application to only two antennas, it is possible to simplify the transmission and reception operation as well as radio interfaces and thus obtain merits of transmit diversity. In this case, any of TSTD, FSTD and CDD is applicable as the transmit diversity method for SCH. On the other hand, either FDM or CDM is applicable as the transmit diversity method for CPICH. Furthermore, the transmit diversity method for SCH may be combined with the transmit diversity method for CPICH.

Figure 28:
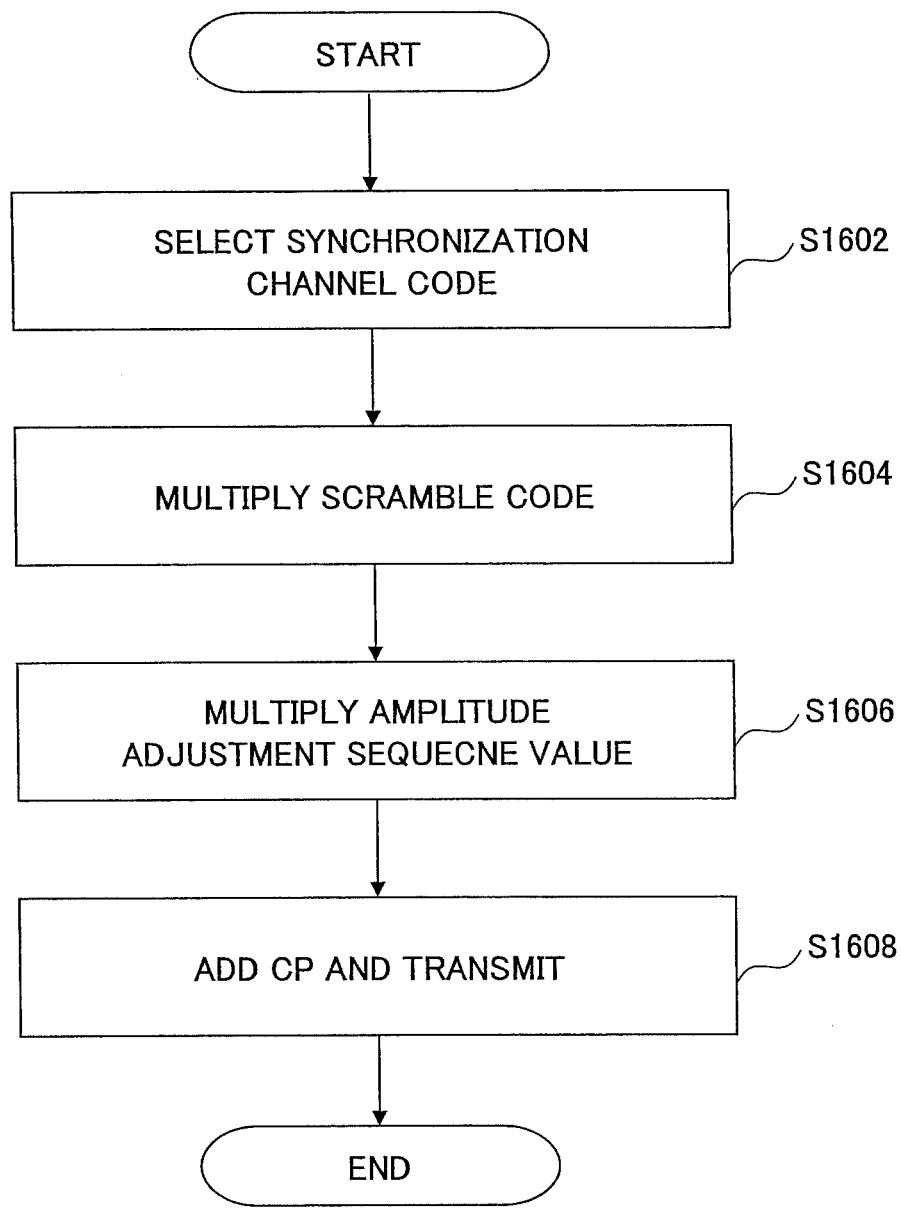
FIG. 28 is a flowchart illustrating an exemplary operation of a transmitter according to one embodiment of the present invention.

An exemplary operation of the transmitter 10 according to this embodiment will be described with reference to FIG. 28.

The transmitter 10 uses the synchronization signal data generator 121 to select a synchronization channel code number based on the scramble code and the transmission scheme, such as unicast or multicast, of the synchronization channel (step S1602).

Then, the transmitter 10 multiplies the synchronization signal symbol with the scramble code in the scramble code group number corresponding to the synchronization channel code (step S1604).

The transmitter 10 multiplies the synchronization signal with an amplitude adjustment sequence value (step S1606).

Finally, the transmitter 10 adds a CP corresponding to the synchronization channel code number to the multiplied synchronization signal, and transmits the synchronization signal with the CP (step S1608).

Then, exemplary operations of the receiver 20 according to this embodiment will be described in two cases where the scramble code is classified or not classified.

Figure 29A:
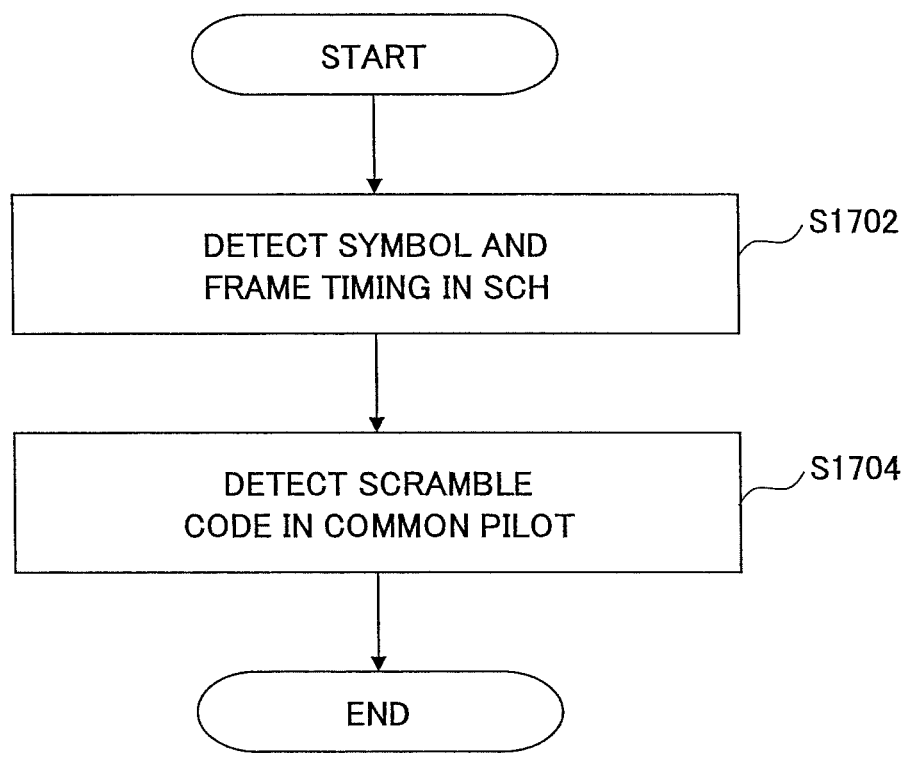
FIG. 29A is a flowchart illustrating an exemplary operation of a receiver according to one embodiment of the present invention.

First, the case where the scramble code is not classified will be described with reference to FIG. 29A.

The timing detection circuit 204 detects the symbol and frame timing for the synchronization channel (step S1702)

The timing detection circuit 204 detects the scramble code (or cell ID) for the common pilot (step S1704).

Figure 29B:
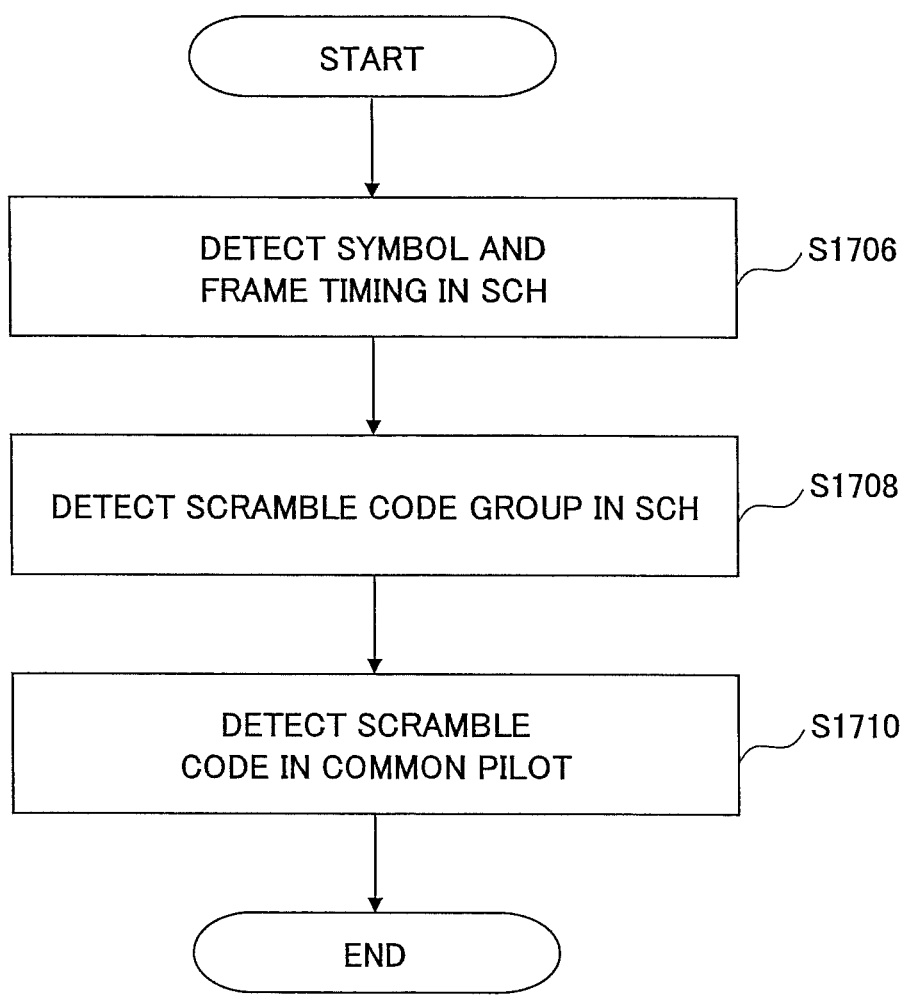
FIG. 29B is a flowchart illustrating an exemplary operation of a receiver according to one embodiment of the present invention.

Then, the case where the scramble code is classified will be described with reference to FIG. 29B.

The timing detection circuit 204 detects the symbol and frame timing for the synchronization channel (step S1706)

The timing detection circuit 204 detects the scramble code group (or cell ID group) for the synchronization channel (step S170B).

The timing detection circuit 204 detects the scramble code for the common pilot (step S1710).

For example, the timing detection circuit 204 detects correlation between reference signals by conducting integration of the phase difference between the reference signals. Since the interval between subcarriers of the reference signals is large, the scramble code is detected by conducting integration on the phase difference between the subcarriers.

Also, integration may be performed on the phase difference code inverted depending on a predetermined scramble code pattern. In this case, when the scramble code matches, a greater correlation value can be obtained.

For example, the cell structure is detected in S-SCH, and if the cell structure is a 1 sector structure, the above-mentioned correlation scheme is used for the detection.

Figure 29C:
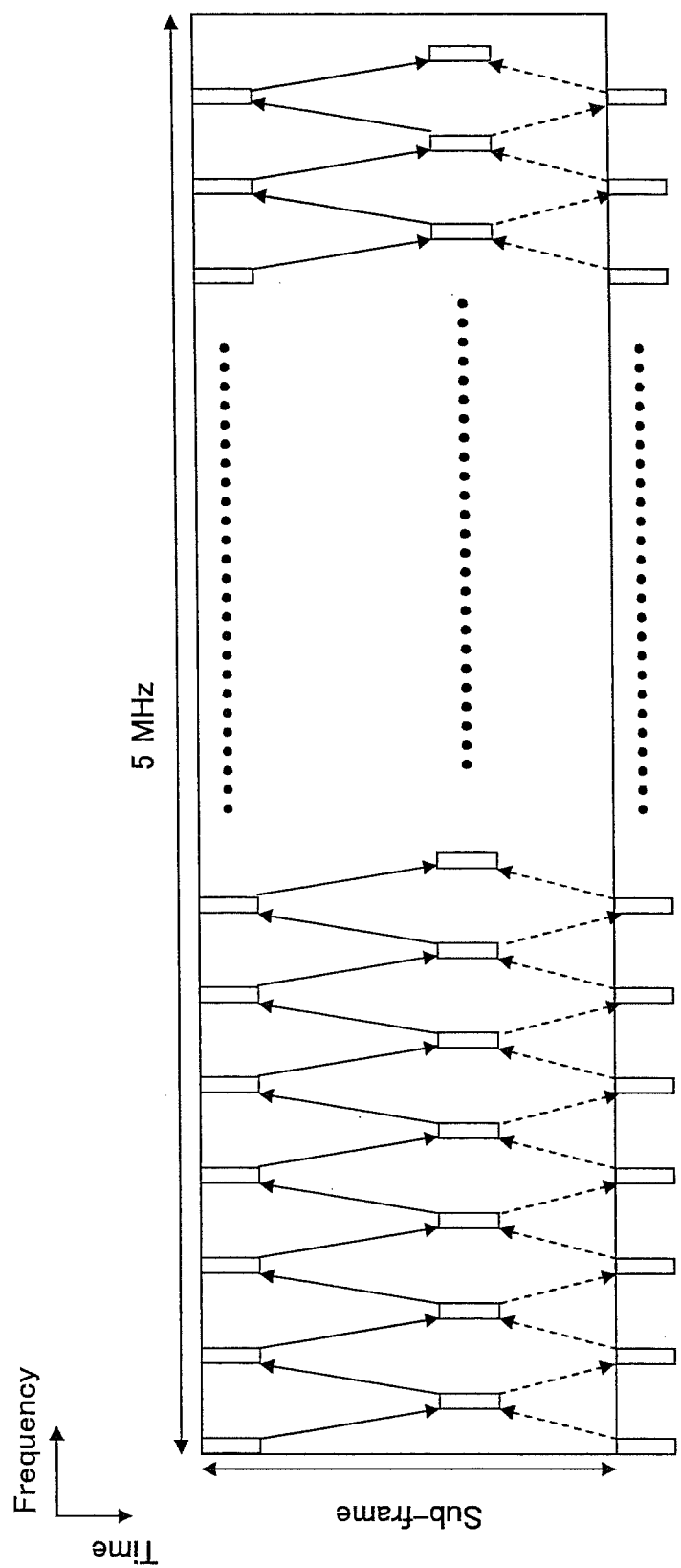
FIG. 29C is a schematic diagram illustrating exemplary cell ID detection by a reference signal.

As illustrated in FIG. 29C, the scramble code may be detected by performing integration on the phase difference between subcarriers in the same subframe. In addition, as illustrated in dotted lines, the scramble code may be detected by performing the phase difference between subcarriers in different subframes.

Figure 29D:
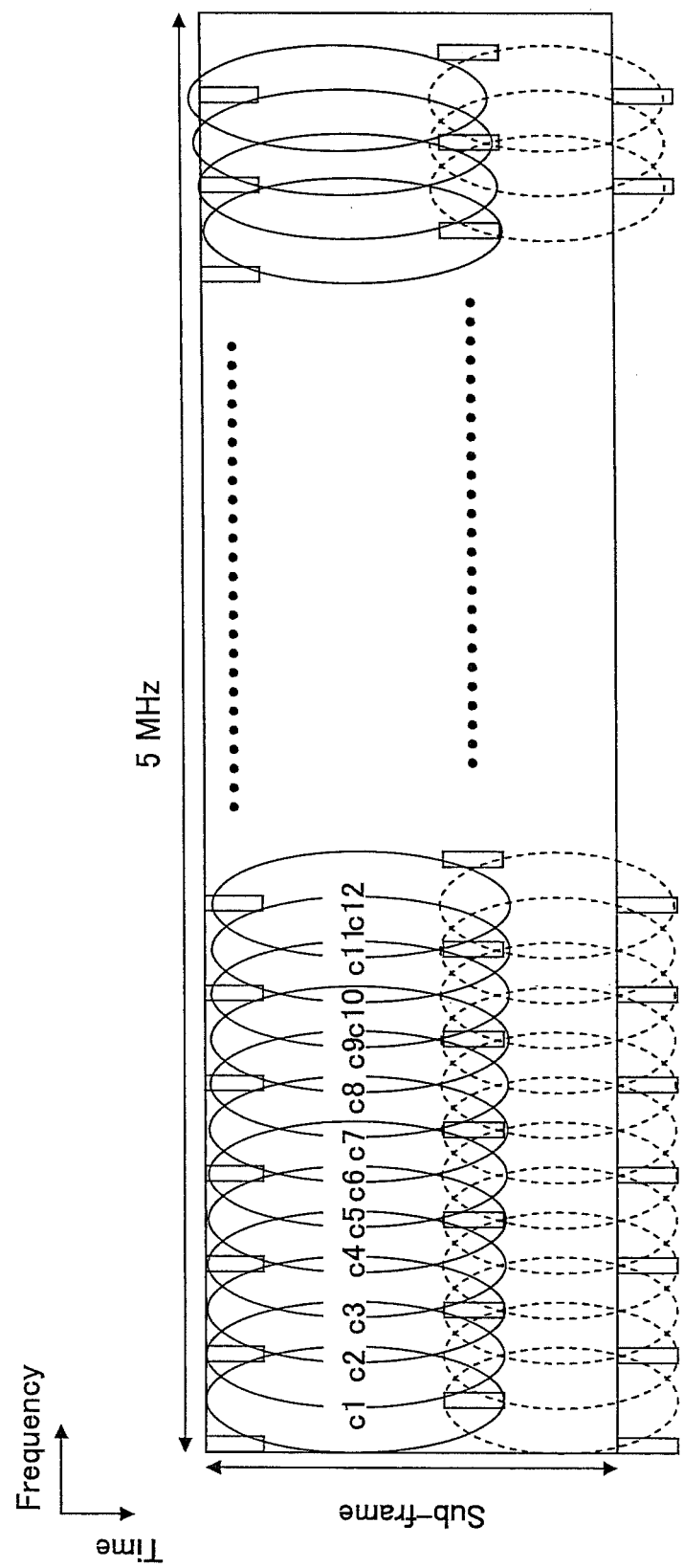
FIG. 29D is a schematic diagram illustrating exemplary cell ID detection by a reference signal.

Also, in the case where a inter-sector orthogonal pilot is applied, for example, if a 3 sector structure is detected as a result of detection of the cell structure in S-SCH, an orthogonal pattern is configured in three adjacent subcarriers. Thus, the reference signal for a supposed sector is extracted by performing coherent addition depending on an orthogonal pilot pattern in the three adjacent subcarriers as illustrated in FIG. 29D. As a result, c1, c2, c3, can be extracted as reference signals.

Then, for the reference signals c1, c2, c3, . . . , the scramble code is detected by performing integration on the phase difference between adjacent blocks depending on the scramble code pattern.

As illustrated in FIG. 29D, the reference signal for a supposed sector may be extracted by performing the coherent addition in three adjacent subcarriers in the same subframe depending on an orthogonal pilot pattern. Alternatively, as illustrated in dotted lines, the reference signal for the supposed sector may be extracted by performing the coherent addition in three adjacent subcarriers in different frames depending on an orthogonal pilot pattern.

An exemplary procedure for cell search will be described with reference to FIG. 29E.

In the cell search, carrier frequency to be connected, reception timing of a cell to be connected such as FFT timing and frame timing, and a scramble code for a cell to be connected are detected.

The reception timing can be detected even in a guard interval. However, the timing detection accuracy of the cell search in a handover target may become worse. In addition, the carrier frequency cannot be detected in the guard interval accurately and synchronously. A large correlation value may be detected in misaligned frequency. For this reason, it is desirable to detect timing in the synchronization channel.

The timing detection circuit 204 detects the carrier frequency (step S2502).

The timing detection circuit 204 detects the reception timing (symbol level) (step S2504).

Here, the steps S2502 and S2504 may be carried out at the same time. In this case, the primary synchronization channel may be used. Also, since an FFT operation has large complexity in a frequency range, temporal operations may be desirable. Also, the amount of operations can be reduced through preliminary detection based on correlation detection by the guard interval.

The timing detection circuit 204 detects reception frame timing (step S2506). For example, if the synchronization channel is arranged in a single portion in each frame, not only the reception timing but also a received frame is detected.

On the other hand, if the synchronization channel is arranged in several portions in each frame, the received frame must be detected after detection of the reception timing. The secondary synchronization channel may be used to detect the received frame.

The timing detection circuit 204 identifies the scramble code group (step S2508).

Here, the steps S2506 and S2508 may be carried out at the same time. In this case, if the synchronization channel transmission period is a frame period, the frame timing detection may be unnecessary. Also, the secondary synchronization channel may be used in these operations. Also, the operations may be carried out in a frequency range or in a time range.

Then, the scramble code is identified (step S2510)

Figure 29F:
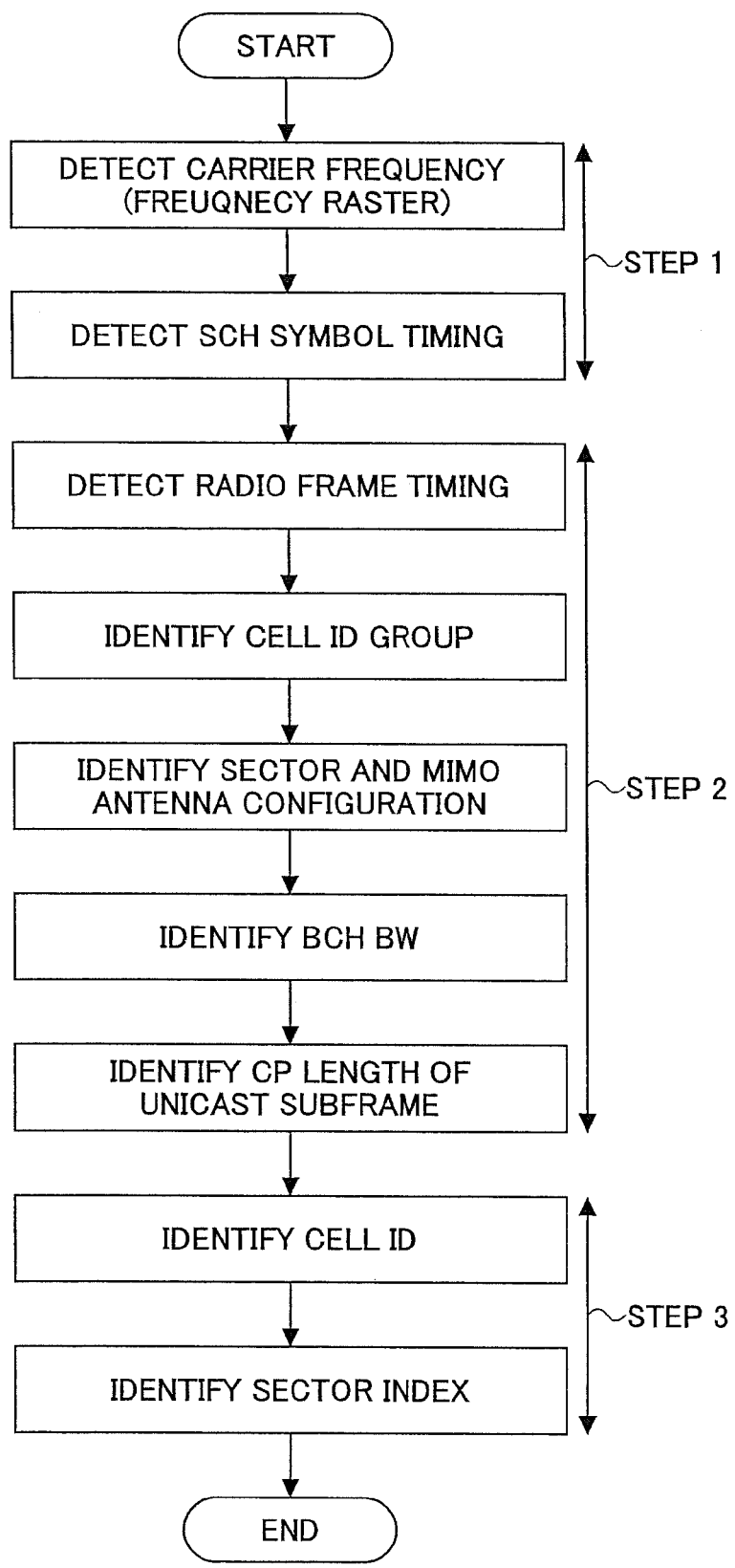
FIG. 29F is a flowchart illustrating an exemplary operation of a receiver according to one embodiment of the present invention.

As the procedure of the cell search, as illustrated in FIG. 29F, the frequency synchronization and the symbol timing may be detected, and then the frame timing, the cell ID group (scramble code group), a sector, the number of transmission antennas, the BCH transmission bandwidth and the CP length may be detected. Subsequently, the cell ID (scramble code group) and the sector may be detected.

In these operations, the common pilot channel may be used. Also, the operations may be carried out in a frequency range or in a time range.

Figure 30:
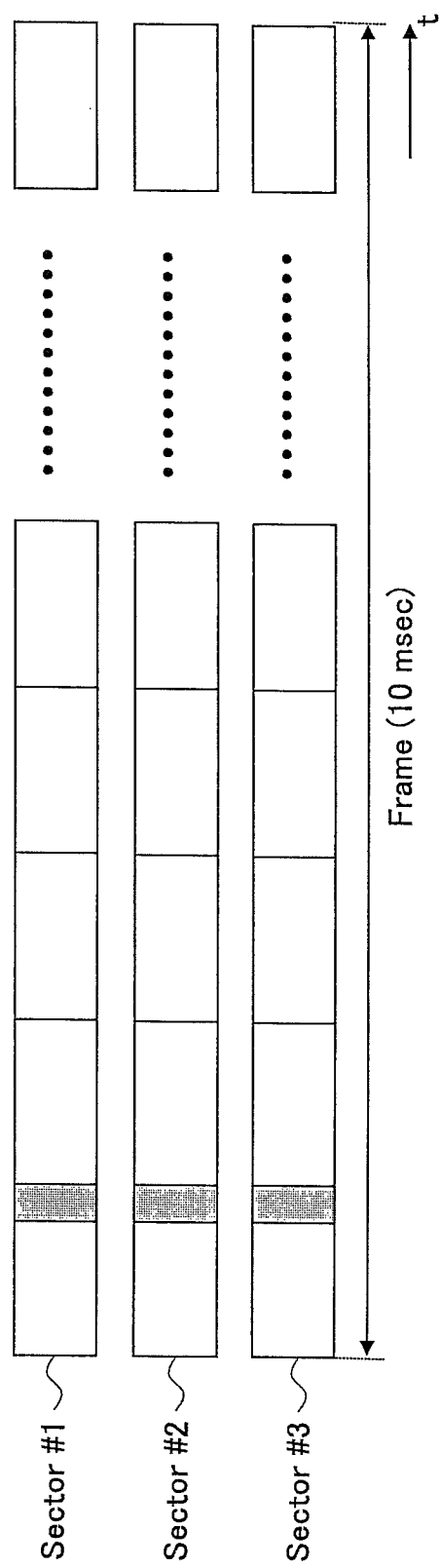
FIG. 30 is a schematic diagram illustrating an exemplary synchronization channel transmission scheme in each sector.

An exemplary mapping of the synchronization channel between different sectors will be described with reference to FIG. 30.

For example, if a cell to cover a single base station consists of three sectors, the frame timing may be made uniform between the sectors.

In W-CDMA, the timing is not uniform over the sectors, and the scramble code may differ for the different sectors. Thus, the secondary synchronization channel may also not be transmitted uniformly over the sectors.

In this embodiment, the primary synchronization channel has uniform frame timing over different sectors. Since the frame timing is common to the sectors, the frame timing can be effectively detected without interference of the primary synchronization channel for other sectors.

Also, in this embodiment, the secondary synchronization channel is defined in each scramble code group. Thus, the same scramble code is used in a single base station, and the same scramble code group is also identified in a pilot pattern. Thus, the secondary synchronization channel also has uniform frame timing over different sectors.

INDUSTRIAL APPLICABILITY

A transmitter, a receiver, a mobile communication system and a synchronization channel transmission method according to the present invention are applicable to radio communication systems.

The invention claimed is:

1. A transmitter comprising:
   a generation unit configured to generate multiple OFDM symbols included in a predefined time unit; and
   a transmitting unit configured to transmit the multiple OFDM symbols generated at the generation unit,
   wherein the generation unit arranges a primary synchronization channel at an end OFDM symbol in the predefined time unit, the primary synchronization channel being generated based on one sequence, and a secondary synchronization channel, where two types of sequences are alternately arranged in a frequency domain, at an OFDM symbol preceding the OFDM symbol where the primary synchronization channel is arranged, and a cyclic prefix is arranged for each of the multiple OFDM symbols, and any of specified different cyclic prefix lengths is used.

2. The transmitter as claimed in claim 1, wherein the generation unit uses a longer cyclic prefix for a multicast OFDM symbol than for a unicast OFDM symbol.

3. A transmitting method comprising the steps of:
generating multiple OFDM symbols included in a predefined time unit; and
transmitting the generated multiple OFDM symbols,
wherein the generating step comprises arranging a primary synchronization channel at an end OFDM symbol in the predefined time unit, the primary synchronization channel being generated based on one sequence, and a secondary synchronization channel, where two types of sequences are alternately arranged in a frequency domain, at an OFDM symbol preceding the OFDM symbol where the primary synchronization channel is arranged, and a cyclic prefix is arranged for each of the multiple OFDM symbols, and any of specified different cyclic prefix lengths is used.

4. The transmitting method as claimed in claim 3, wherein the generating step comprises using a longer cyclic prefix for a multicast OFDM symbol than for a unicast OFDM symbol.

* * * * *